Dec. 7, 1965  J. M. COURI  3,222,057
APPARATUS AND METHOD FOR CONTROLLING AND RECEIVING
AND/OR DISPENSING PAPER MONEY
Filed Nov. 29, 1961  13 Sheets-Sheet 1

INVENTOR.
Joseph M. Couri
BY
ATTORNEYS

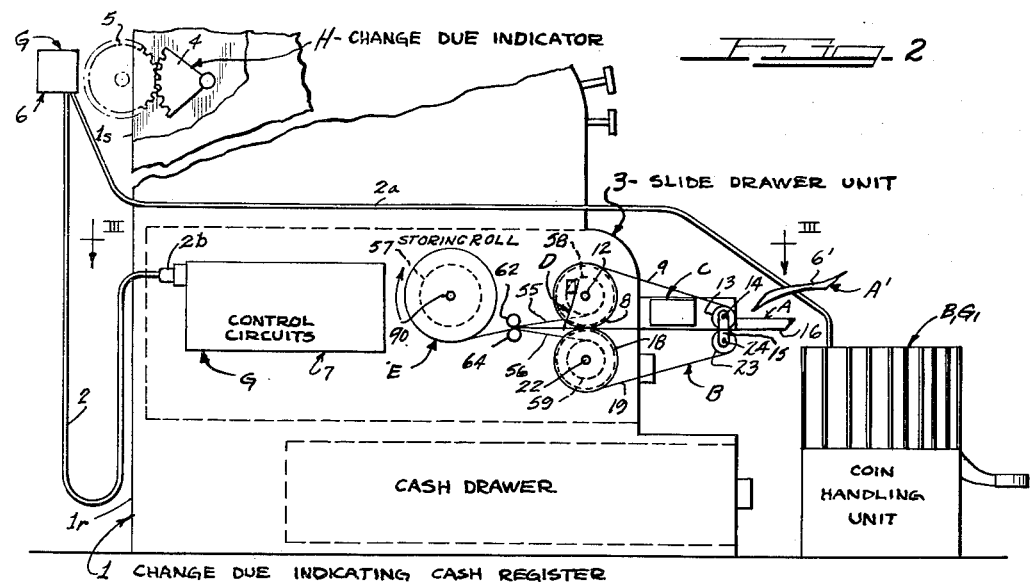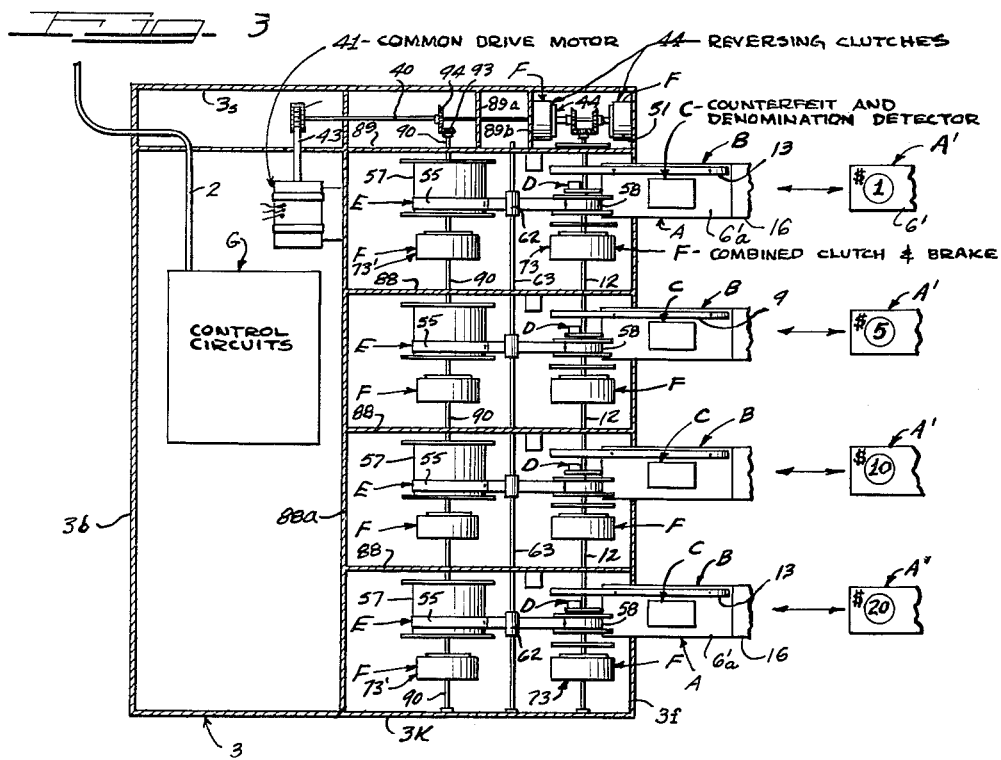

Dec. 7, 1965 J. M. COURI 3,222,057
APPARATUS AND METHOD FOR CONTROLLING AND RECEIVING
AND/OR DISPENSING PAPER MONEY
Filed Nov. 29, 1961 13 Sheets-Sheet 3
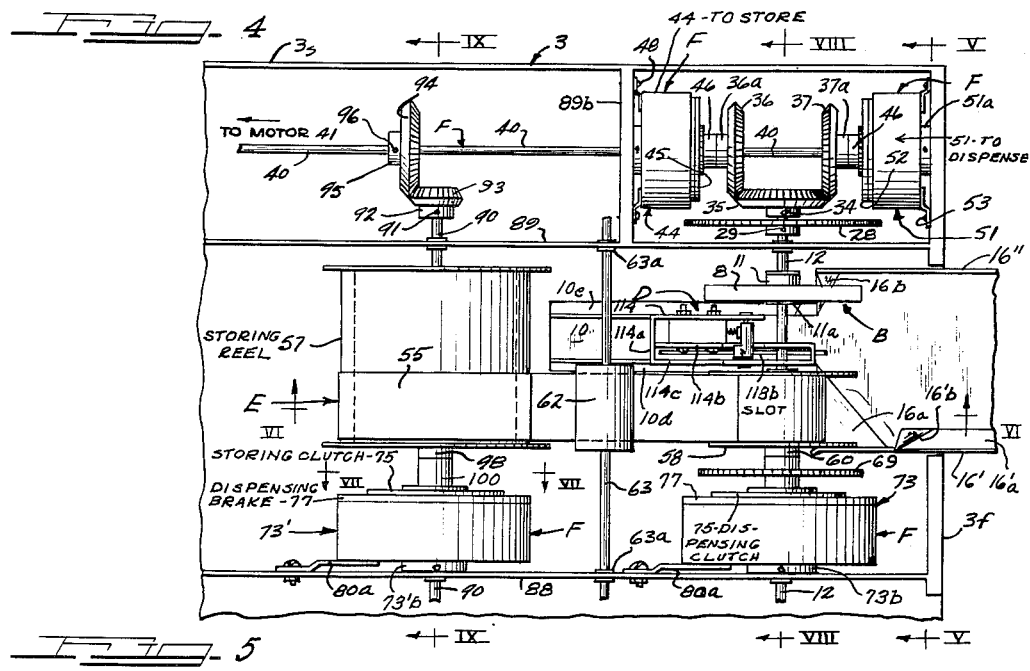
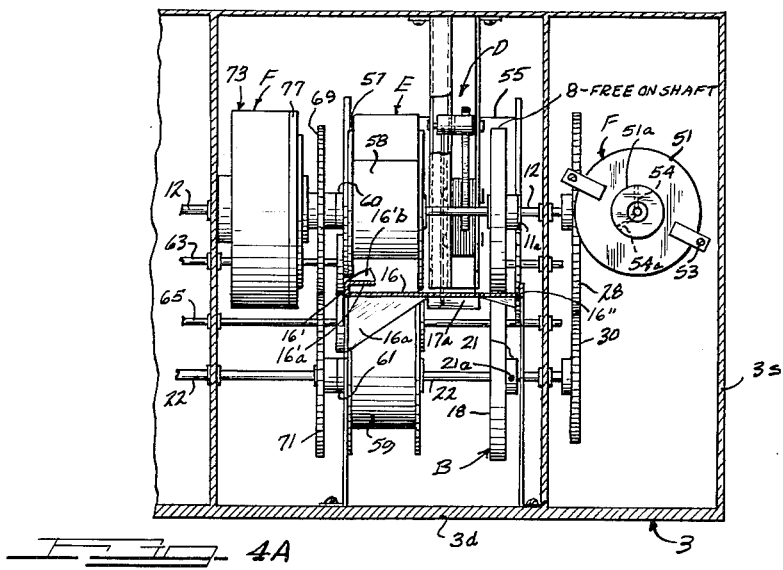
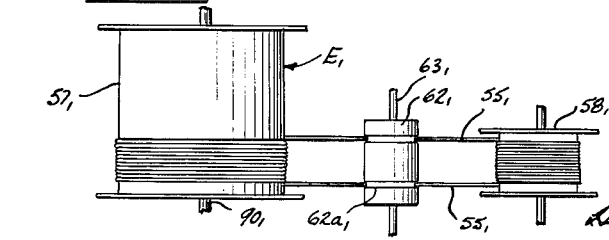
INVENTOR.
Joseph M. Couri
BY
ATTORNEYS

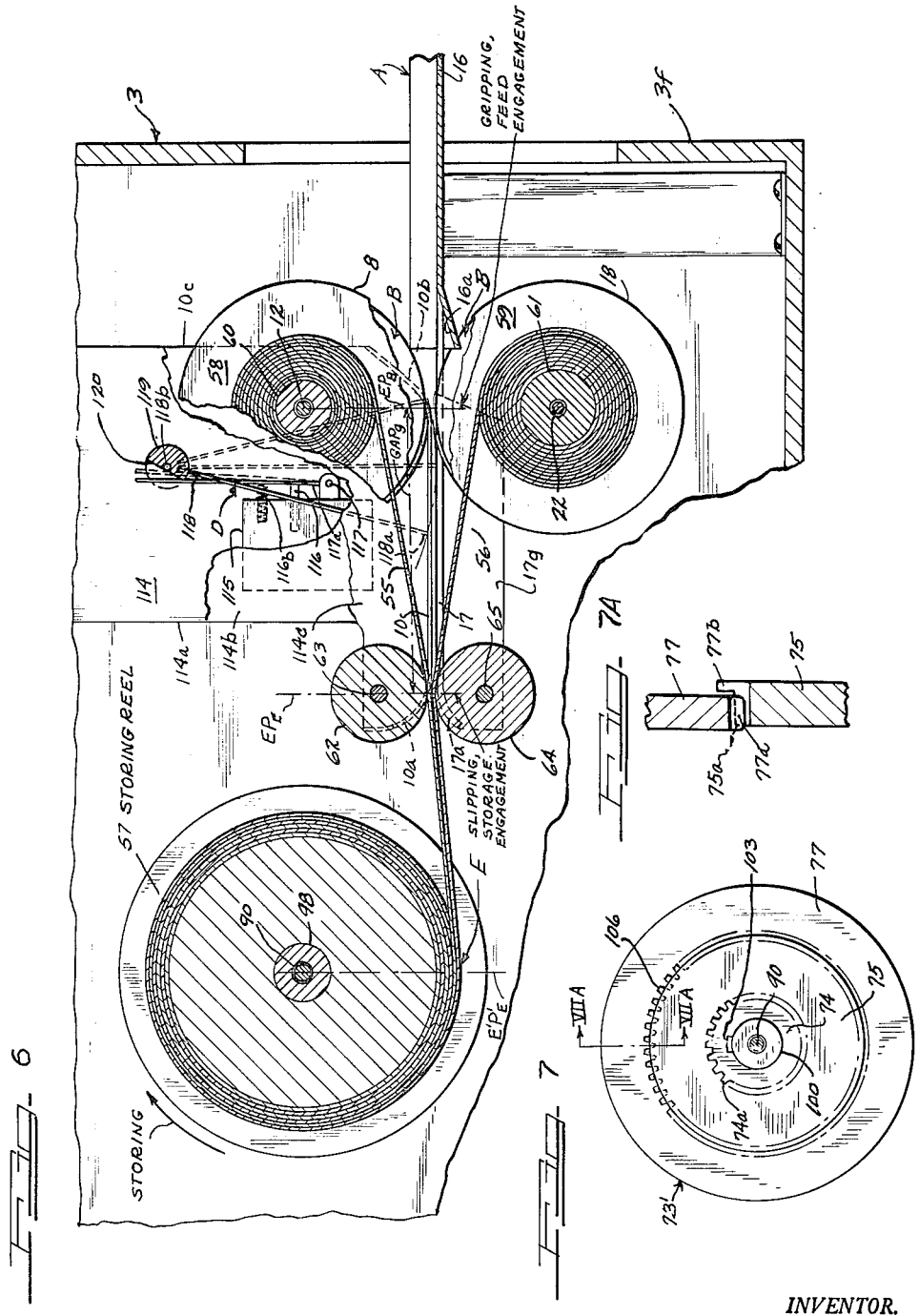

Dec. 7, 1965 J. M. COURI 3,222,057
APPARATUS AND METHOD FOR CONTROLLING AND RECEIVING
AND/OR DISPENSING PAPER MONEY
Filed Nov. 29, 1961 13 Sheets-Sheet 5
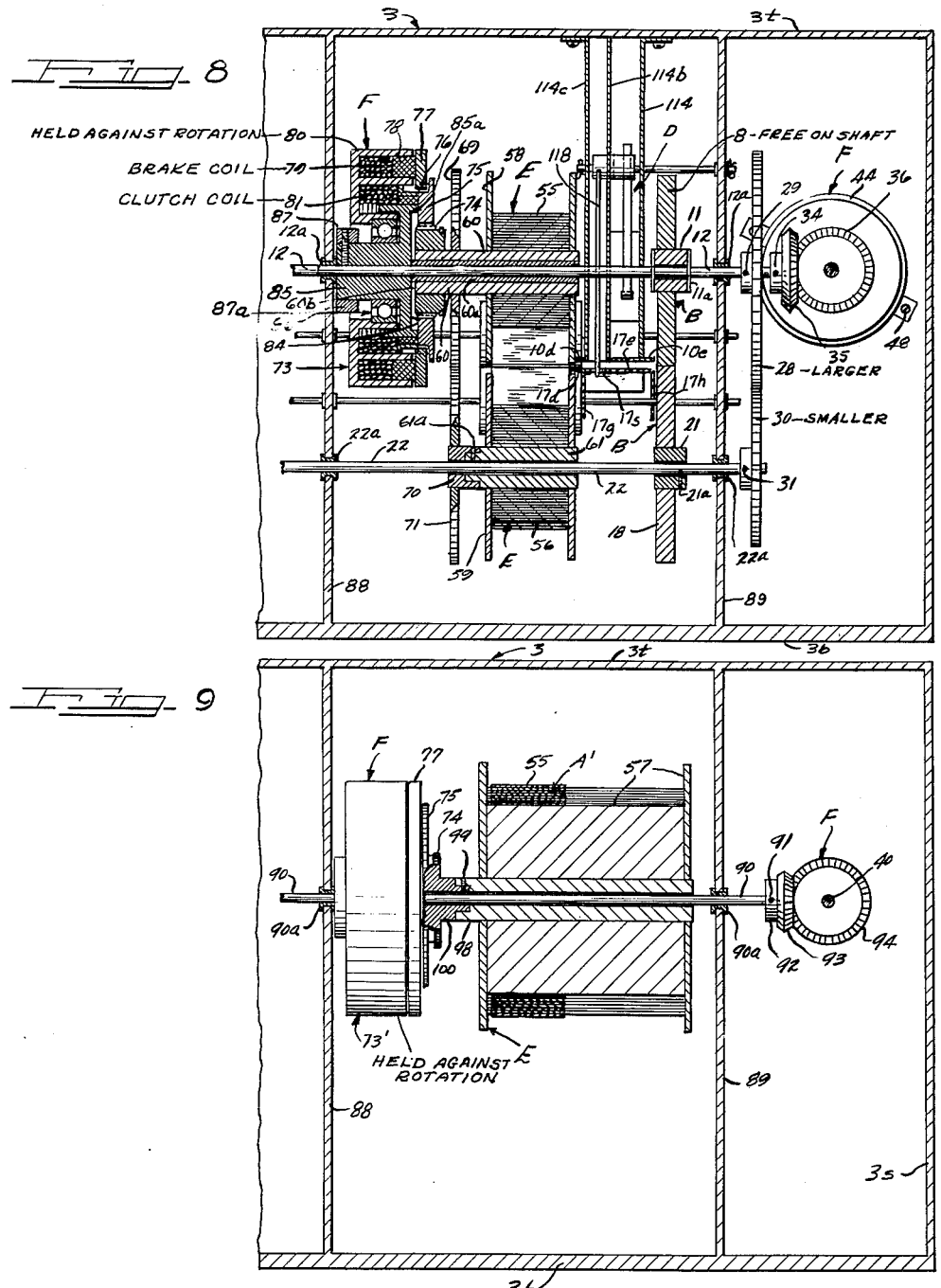

Dec. 7, 1965  J. M. COURI  3,222,057
APPARATUS AND METHOD FOR CONTROLLING AND RECEIVING
AND/OR DISPENSING PAPER MONEY
Filed Nov. 29, 1961  13 Sheets-Sheet 6
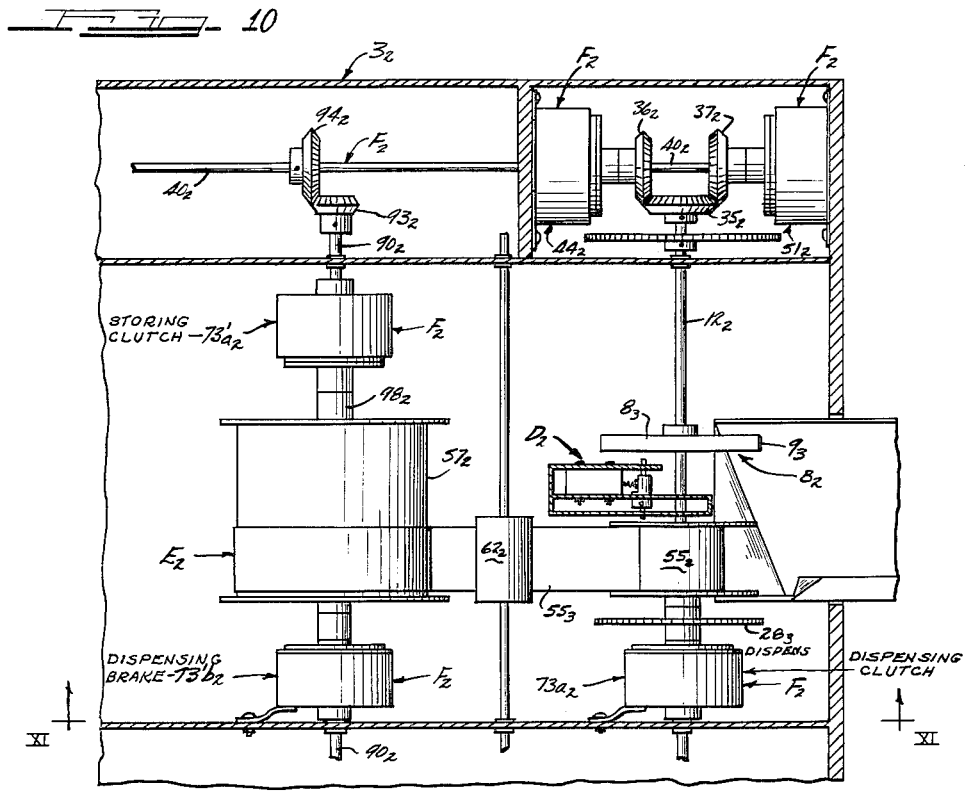
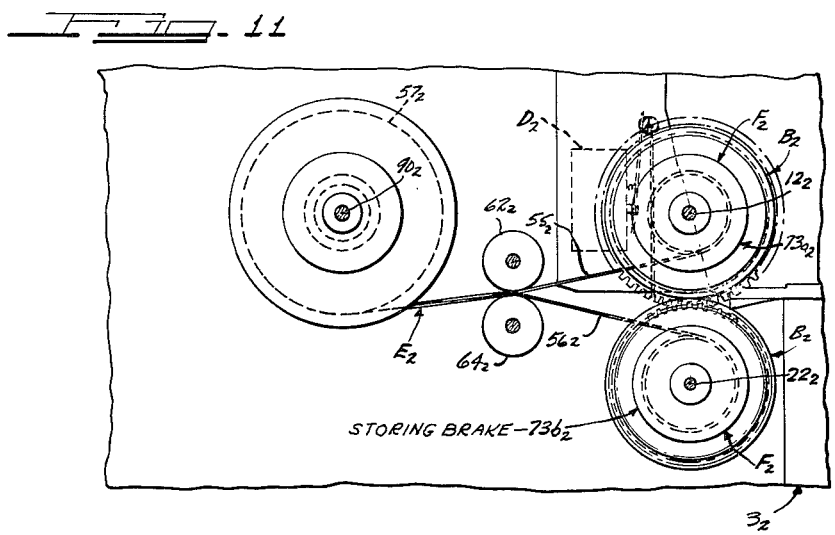
INVENTOR.
Joseph M. Couri
BY
ATTORNEYS

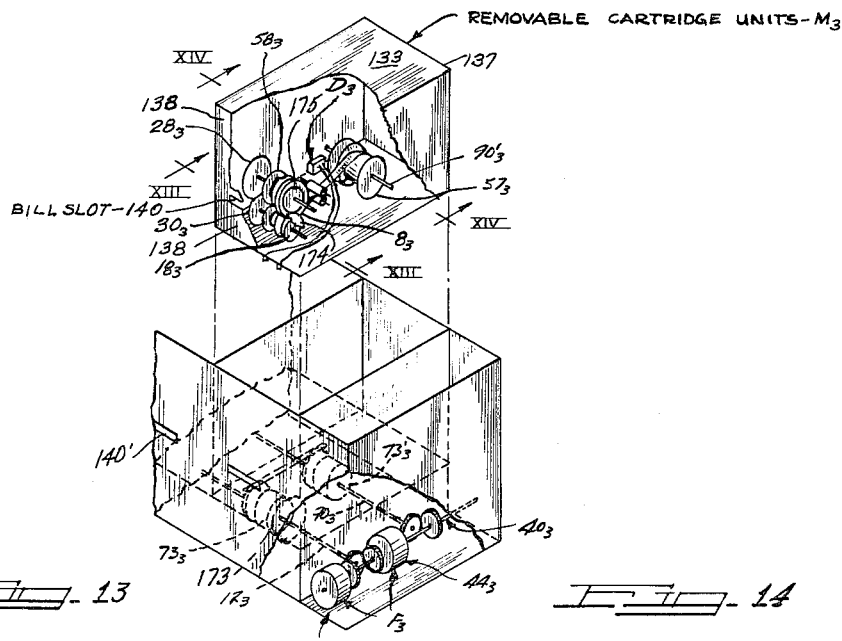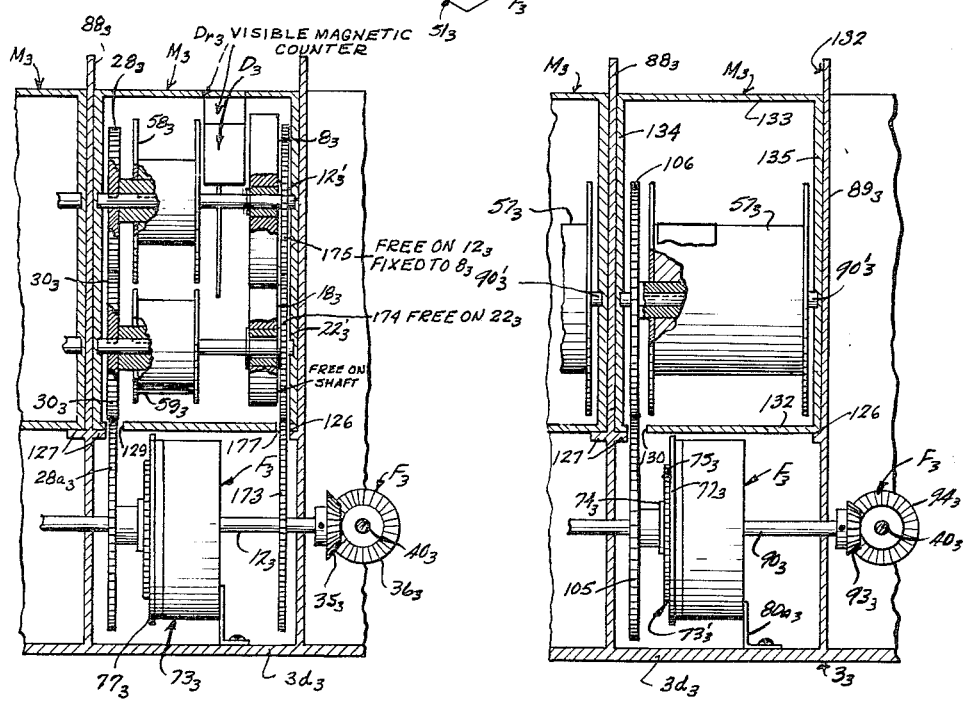

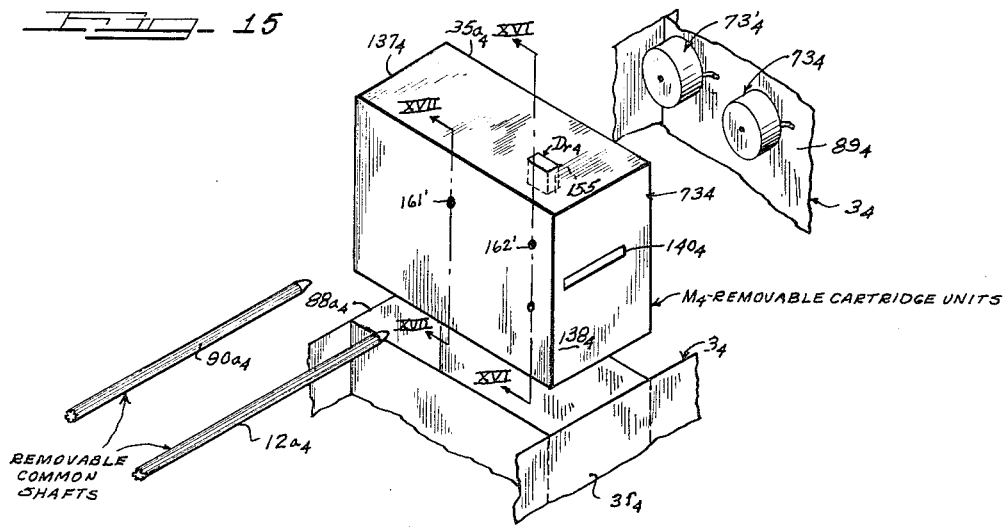
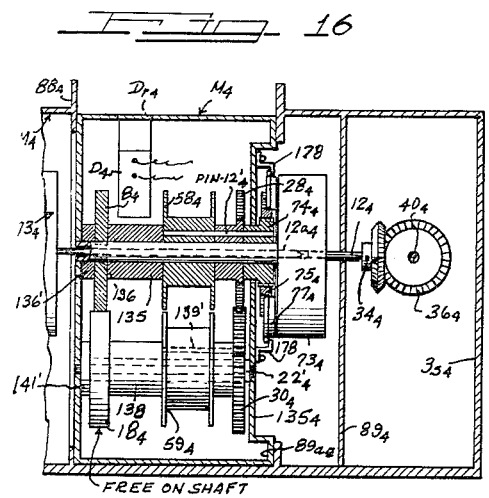
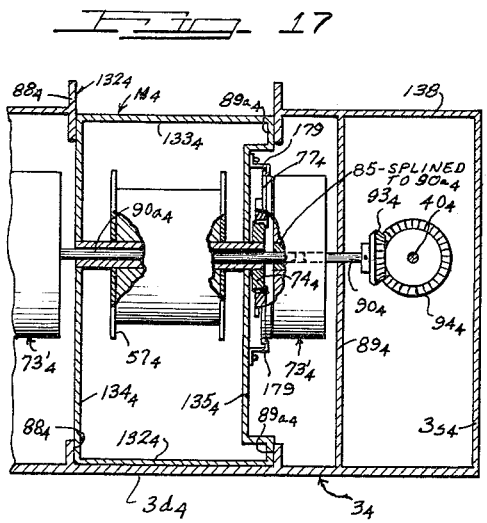

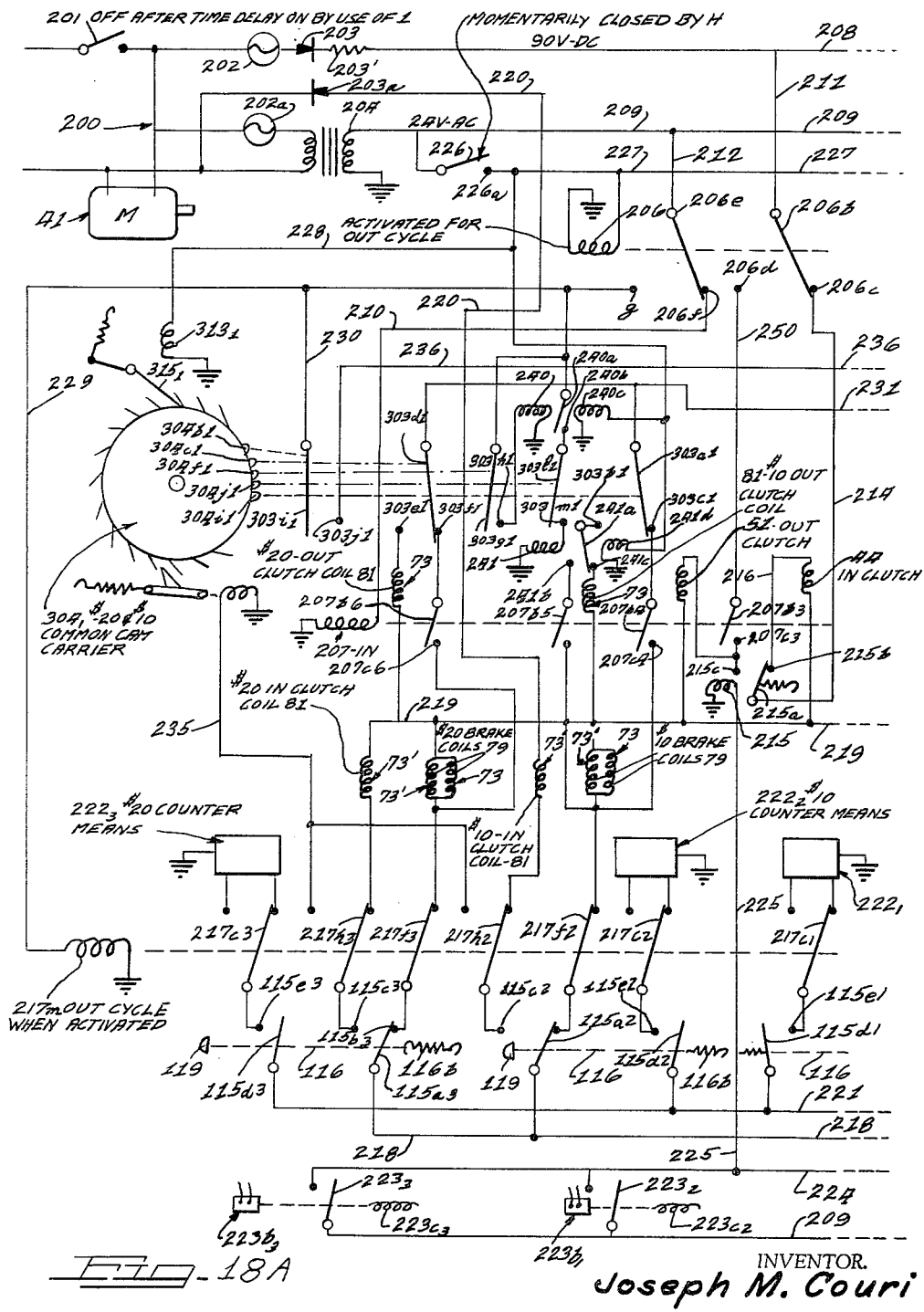

INVENTOR.
Joseph M. Couri

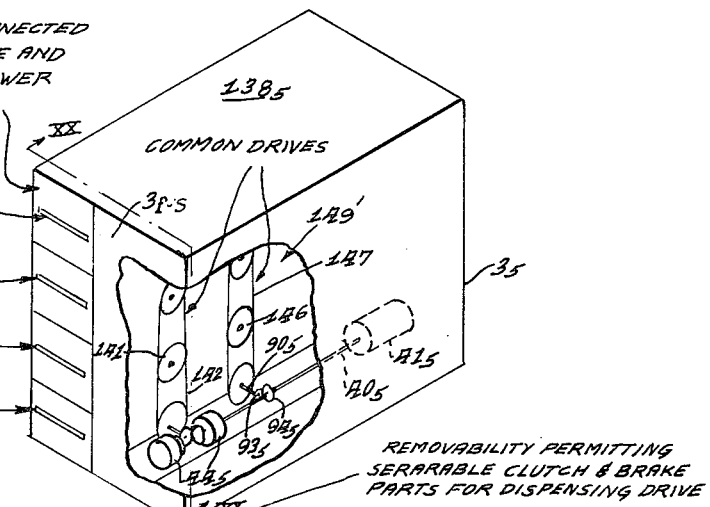
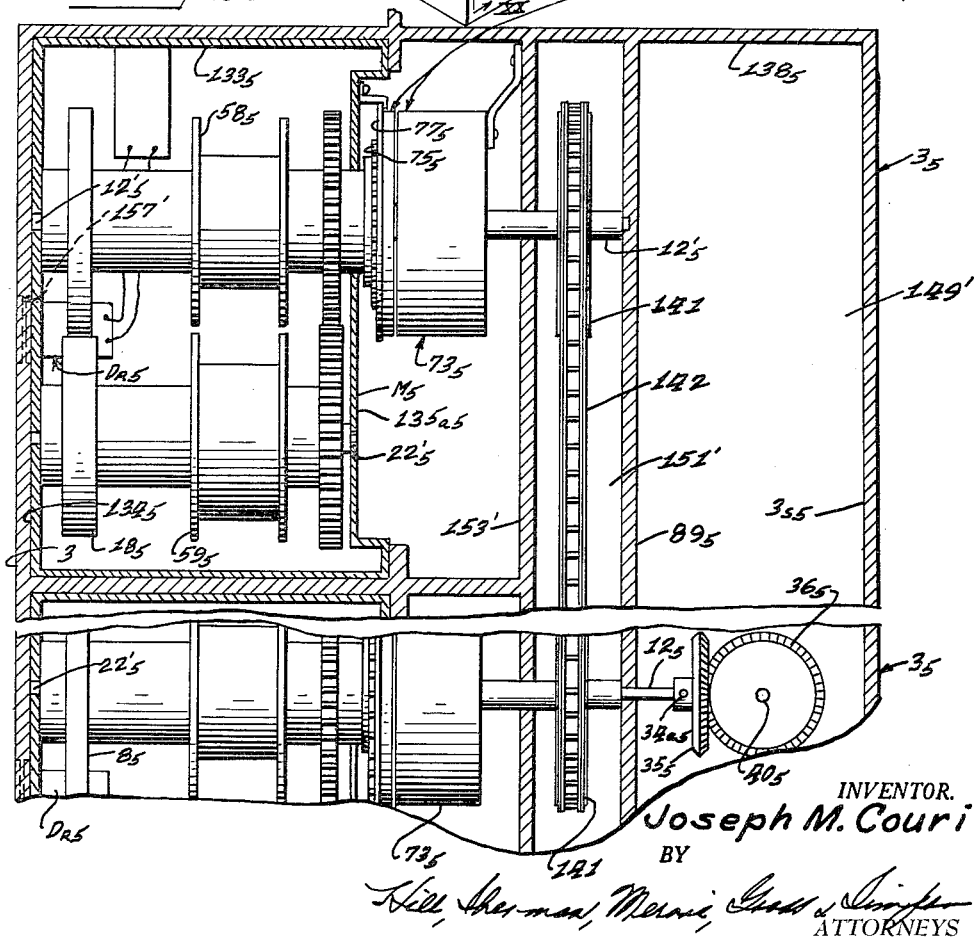

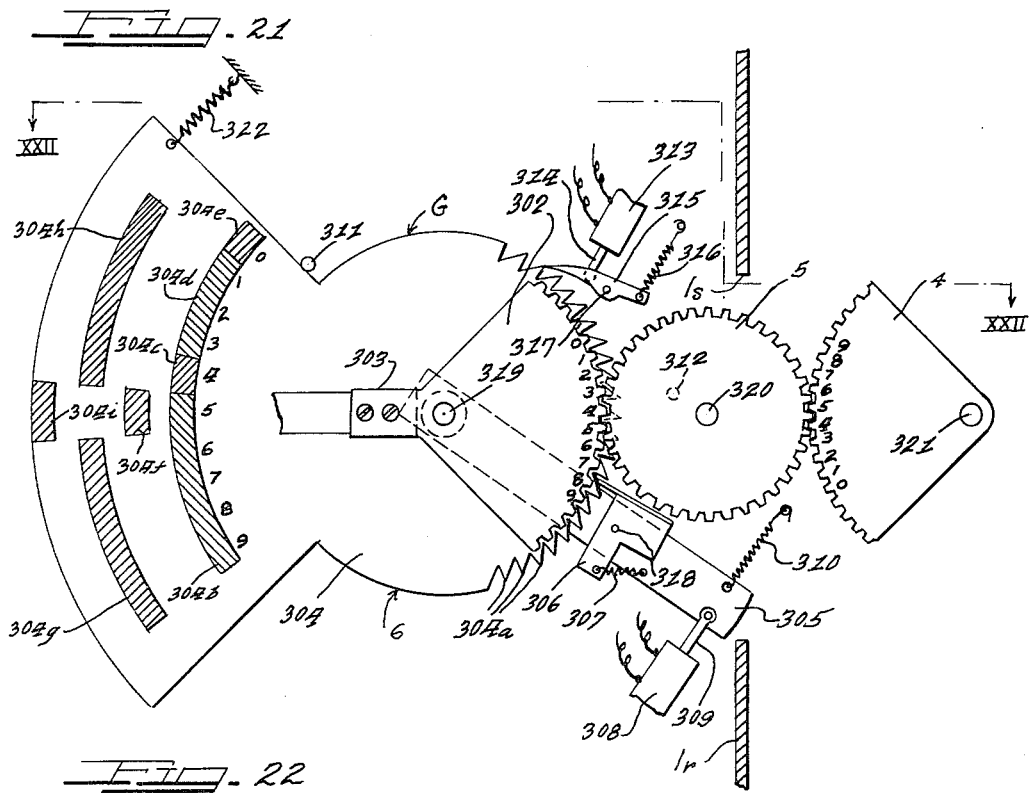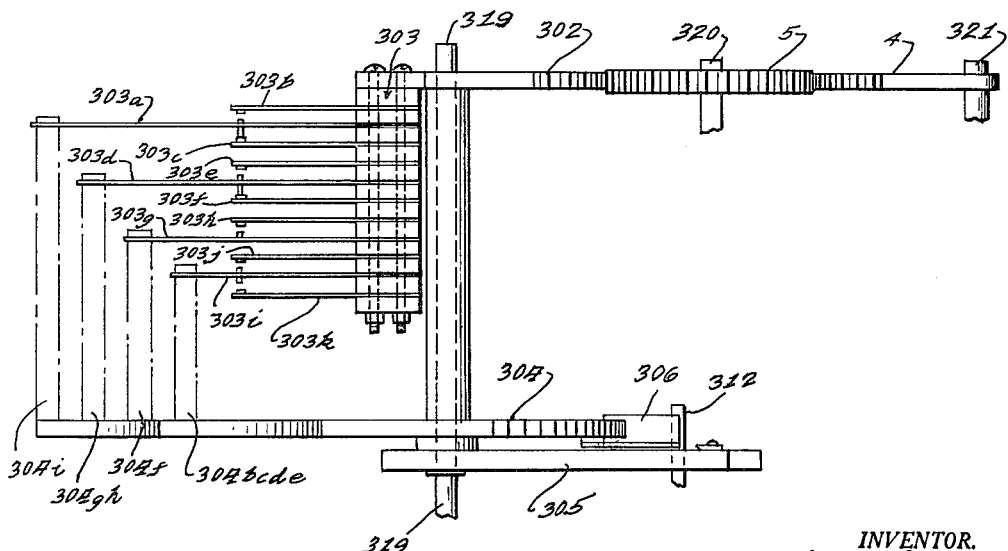

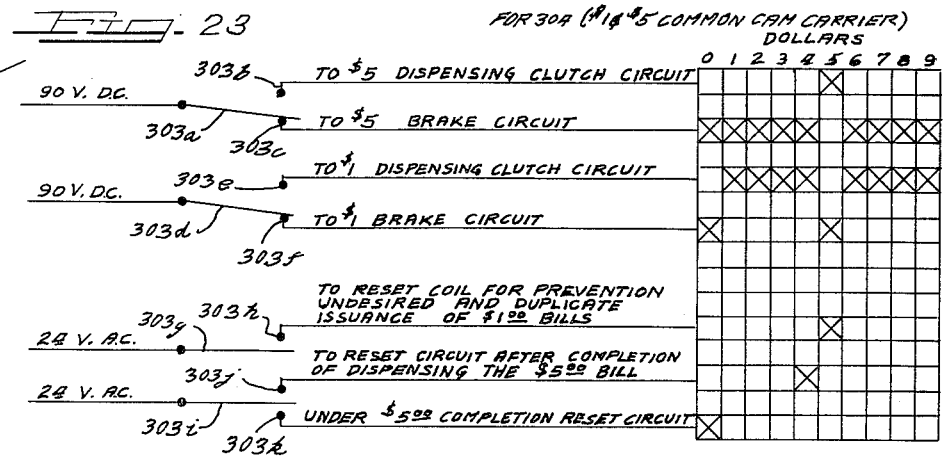
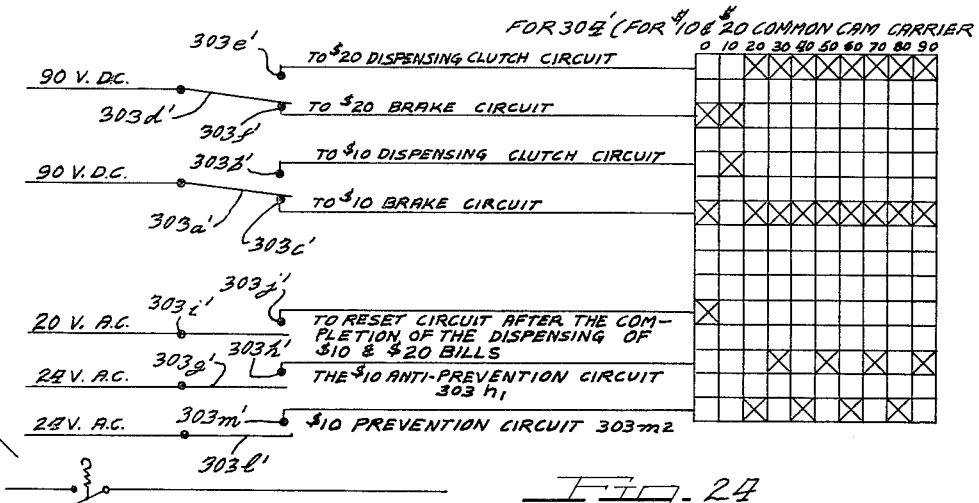
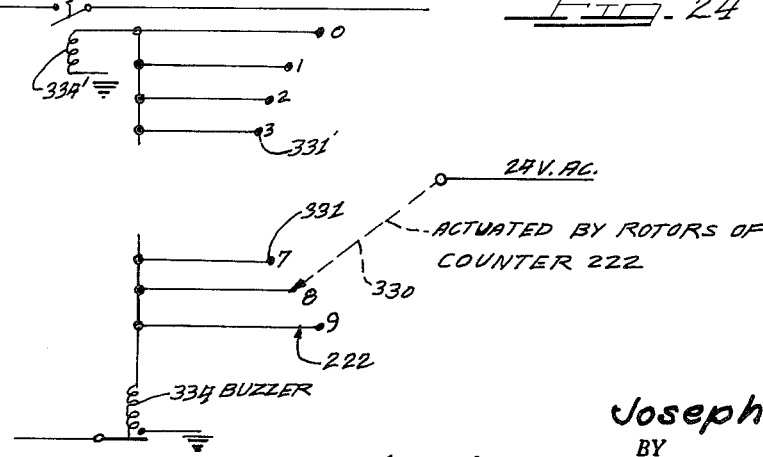

United States Patent Office 3,222,057
Patented Dec. 7, 1965

3,222,057
APPARATUS AND METHOD FOR CONTROLLING AND RECEIVING AND/OR DISPENSING PAPER MONEY
Joseph M. Couri, 1002 W. St. James St., Peoria, Ill.
Filed Nov. 29, 1961, Ser. No. 155,774
40 Claims. (Cl. 271—3)

This invention relates to an improved system, or to an improved apparatus and closely related method, for the mechanical and more reliable, simpler and faster handling and controlling of normal used paper currency in financial transactions and, more particularly, for the improved controlling and storing and/or dispensing of such currency bills into or out of compact storage units wherein such bills are in an elongated series line or one after the other but separated to prevent any overlapping or especially wherein such storing is by rotating, spirally rolled-up storage paths (preferably with one such storage unit for each denomination of bills handled) with a selectively and rapidly reversible action for each and the bills being transferred to or from feeding and guiding paths acting between such storing paths and the person who is paying in or receiving money.

This invention is broadly intended for use in any or all of the various different or possible applications, types of financial transactions, or uses other than the illustrated combination with a change due showing type of cash register, all as will be apparent to those skilled in this and related arts.

It has long been desired to provide a practical and commercial feasible system (or method and apparatus) for the rapid, efficient or relatively foolproof and yet simple controlling and mechanical handling of normal paper money and there have been numerous prior proposals or attempts to this end. As far as I have been able to determine, all such prior proposals have been unsuccessful and are more or less impractical due primarily to their failures to appreciate, much less solve, the problems peculiar to normal used paper money in actual use and under normal service and customer conditions. This last includes, but is not limited to, such difficulties and problems as are presented by worn, dogeared, crinkled, pulpy or even torn used paper money. This last also includes such difficulties as the presenting of such money in folded condition by the customer, the sticking together of two or more bills in a wholly or partly overlapping condition due to various causes and, in general, the lack of any actually usable uniformity in thickness or other dimensions and the flimsiness or lack of weight or dimensional rigidity in normal currency bills. While it is not feasible to here discuss or even mention a significant part of all of the numerous prior proposals or attempts seeking to solve such paper money problems, yet it may be noted that many were based on highly impractical and complex approaches wherein it was attempted to move paper money into or out of storage units such as stacks, bundles or like groupings having an undesirable overlapping engagement of bills and/or a lack of the required separation of the flimsy, nondimensionally accurate, nonrigid and relatively weightless bills (which are hence difficult indeed to handle mechanically with the required simplicity, reliability and speed, particularly by methods commonly used for other objects such as stacking, gravity or other usual mechanical feeds, edge ejecting or other such methods or means used for the dispensing of new and uniform thin paper). Other prior approaches were often simply too complex to be commerically feasible and, in general, all have lacked one or more of the essential abilities to cope with the special problems inherent in used paper money.

Some few of these prior proposals have attempted to store and handle paper money into and/or out of spiral rolls of a flexible tape or the like and per se generally like storage units alone as they are disclosed herein. However, such prior roll-up types have been deficient and unsuccessful for various reasons which will be more apparent after a consideration of the following more detailed description of this invention. It may be noted here that such prior roll-up storage proposals have been unduly complex, have inaccurate or insufficient control means, have been unduly slow and inaccurate in operation (due in considerable part to high inertia as by the attempt to rapidly stop and start an always connected and heavy drive) and, particularly, have not included the important, independent or separately rotatable and reversible feeding or the like as hereinafter disclosed in more detail. Such prior roll-up proposals have also lacked other important combinations of this invention such as the ability to remove a loaded storage unit and the always accurate and yet simple stop-start computing and control system effectively integrated to cooperate with such a rotary and roll-up type operation.

The importance and long felt need for this present invention may also be further illustrated by the successive improvements, increasing automaticity, and the performance of additional clerk relieving operations, which have occurred in cash registers for use in stores and particularly for use in modern type supermarkets or the like. This particular illustration is used here since the following more detailed and exemplary description of this invention is particularly described and adapted for such a use. Thus, in this constant and increasing striving towards more accuracy, speed (less customer waiting time) and reduction in clerk labor cost, cash registers have advanced from the old single sale type (only one amount per transaction and requiring pencil and paper addition of the various items) through the addition of a separate adding machine for totaling of purchases, the more specialized adding or item totalizing type also giving a departmental breakdown such as meat, groceries, etc., then the change due computing and indicating type also showing the amount tendered in payment to thus relieve the clerk of these computations and reduce errors, and last (but now a number of years old in this highly competitive and rapidly moving field) the combination with the change due indicating type of cash register of an automatic coin change dispenser and/or receiver (for example, as used in vending machines) electrically controlled by the coin change due part of the change due indicator of such a cash register to save time and also eliminate clerical error in the dispensing of coin change. The fact that this last step in cash register combinations or development has not yet commercially included a practical paper money mechanical handling section has not been accidental or fortuitous since, as noted above, there have been numerous commercially unsuccessful attempts to meet this long felt and pressing need.

As far as I have been able to determine, this impasse or these failures to meet these needs have been mainly due to the failures in the proper appreciation and identification (as a key part of the problem solution) of the important problems or difficulties inherent in the mechanical handling (receiving and/or dispensing) as well as the controlling (counting, verifying, stopping and starting, computing, etc.) of normal, used paper money in addition to the failures in the provision of sufficiently simple and practically reliable or foolproof methods or mechanisms for such purposes.

While the several aspects and embodiments of this invention are shown and described hereinafter as part of a system adapted to use in financial transaction in retail stores and, more particularly, in combination with, and controlled by, the now well known change due to computing and indicating type of cash register cooperating in the handling of the two types of money with a suitable, automatic type, coin dispenser or a suitable coin receiving and/or dispensing device (either of which, including their control by the computing and change due indicator of a cash register or the like, are well known to those skilled in this art and need no further disclosure here), yet this particular description and use are intended to be only exemplary and it is again noted that various other specialized arrangements or combinations using important features hereof may be provided for other types of financial transactions as will be well understood by those skilled in this and related arts.

As only a few of the many possible examples, the following are noted. The bills received may be verified as to amount (as well as for genuineness and proper unfolded condition and the like) and matched against the amount indicated as due to be paid with the return of the tendered bills to the customer (as by a quick reversal of the separate feed as disclosed hereinafter) if the total amount tendered is insufficient in amount or otherwise improper. Also the amount due from the customer or the amount of the change due to the customer may be supplied electrically from a remote source. A money handling system using this invention may include its own computing sections for determining the total amount due as well as the amount of change due to the customer or other figures needed and in such case, combination with a cash register or the like is not needed. For uses such as a banking type transaction, vending machines with no clerk or, more specifically, the selling of items such as race track betting tickets (where for any such case, the rapidity, accuracy, savings in clerical wages and other useful features of this invention are particularly desired as well as the reduction in theft danger by the removal of storage units when they are indicated as filled and to be transferred to a safe depository according to another feature of this invention) this invention may be made fully or more nearly fully automatic and the clerk eliminated since the customer need only punch for the value of merchandise or betting ticket desired and insert an adequate total sum of bills in payment thereof.

Accordingly the primary and more general objects of this invention reside in the provision of adequate appreciation or a correlating analysis of such special problems inherent in the handling and controlling of normal used paper money together with the resulting inventive solutions to meet and solve the above discussed needs and difficulties.

Another object of this invention is to be found in the provision of a system for the rotary handling of normal used paper money into and out of compact storage units in a line or series of bills and, particularly, thus into and out of a rotary means moving the bills into or out of storage (especially a spirally rolled up type), by an independently operatable and separately actuated rotary feed, and more particularly the provision of a more compact apparatus and in which shafts are eliminated by having at least one rotary feed axial on the same shaft with at least one unrolling reel for a flexible spiral and with a gap between storing and feeding engagements and a bill detector in such a gap or space.

A further important object hereof is the provision of a practical system for the automatic type controlling and handling of normal paper money wherein there is a common, and normally always running, common drive for a plurality of independently and rapidly actuatable and low inertia, stop-start, rotary bill storage units and their cooperating feed units which are separately actuated in synchronism for bill motions in either direction.

Another and somewhat more detailed object hereof resides in the provision of a system of this general type which a plurality of different denominations of bills may be dispensed, or even received, simultaneously and, more particularly, such an apparatus including a common and normally running drive for a plurality of quickly reversible feeds each cooperating with its own separately controlled rotary bill storage means.

Another object of this invention is to be found in the provision of a system for the rotary feeding of normal used paper money in and/or out of compact and preferably rotary storage while always maintaining said money in a line series of separated or nonoverlappingly engaged bills together with the separation of said bills while going in or out especially by a change in their speeds and with a short duration slippage between the two engaging speeds to aid such separation.

Another object hereof resides in the provision of a system for the simultaneous receiving and/or paying out of a plurality of different denominations of normal used currency bills, each from its own separate and rotary storing by independently operable rotary feeding and preferably with a controlling bill detecting during such feeding and particularly during both receiving and dispensing.

Another more detailed object hereof resides in the provision of a system for the controlling and mechanical handling of normal used paper money in succession wherein any improper bill being received by a separate rotary feed is verified as to its propriety while it is being fed and is rapidly reversed and rejected by said feed before it is counted or stored.

Other important objects hereof relate to the provision of a system for controlling and handling normal used paper money into or out of separate and removable storage units and, particularly, wherein such removable storage units are of a rotary and, more specifically, of the roll-up type with one for each denomination of bills handled and preferably with each such removable unit including separately actuatable feed means and including removability permitting drives, said removability of such storage units providing for theft danger reduction, permitting easy replacement in lieu of repairs, or providing for rapid replenishment of money supply when needed.

A more detailed object hereof relates to the provision of an improved combined rotary clutch and brake unit of the magnetic type both per se and in combination in a paper money handling apparatus of the roll-up type including separately actuatable feed means.

Still another and more detailed object hereof resides in the provision of an improved mechanical paper money handling apparatus of the type wherein the paper money has a stop-start operation while always maintained in series of bills together with an improved and closely cooperating computing and controlling means and, more particularly, wherein such controlling means includes the dual use of a single paper currency change due count off unit or cam carrier member for a plurality of different denominations of bills.

Still other objects of this invention are to be found in the provision of a normal used paper money dispensing and/or receiving apparatus, all of whose money engageing and handling or moving elements are of the rotary type and, more particularly, such an apparatus wherein there is an improved rotary money storing means particularly including a double wound spiral of two tapes with means to prevent unequal tensions between said double wound tapes with resulting looseness in their flexible confining of the bills and also wherein such rotary elements have low inertia, are readily stopped by separate brakes for each direction and are started rapidly by separate clutch means for each direction from a common rotary drive particularly a drive including only a single unidirectional electric motor.

Another and more specific object hereof resides in the provision of mechanical paper money handling apparatus including a spiral roll-up storage type of storing or unstoring unit including a plus and minus and always accurate counter to always show the number of bills of a given denomination then in said unit, and more particularly, such units which are readily removable.

Another and somewhat more specific object hereof relates to the provision of a paper money handling apparatus having separate, money moving, storing means and money moving feed menas which is synchronized and controlled to be already running ready to receive and move money manually inserted during storing or money dispensed by said storing means, and more particularly, the controlling and synchronization of such means by the detecting of each such bill during its feed travel.

Another object hereof relates to the provision of improved controlling and electrical circuit means for systems of the type disclosed.

A further object hereof is to be found in the provision of means to prevent trailing and overrun or looseness in the stop-start operation of a spirally coiled elongated flexible member for the storing or dispensing of paper money by clutches at each end thereof for a tension drive and especially an improved stopping by brakes at each end of such a flexible member or members.

Other and more detailed objects hereof relate to the provision of an improved mechanical detector for the edges of moving sheets and, more particularly, such a mechanical bill edge detector in combination with and acting during the rotary feeding of filmsy paper money, effectively stiffened by confinement between guides.

A further more detailed object hereof resides in the provision of an improved and dual purpose means to count off preselected numbers of two different groups of objects and more particularly to such means in a common multi-cam carrier especially in combination with the controls for the handling of paper money.

Further and important objects hereof relate to the guidance of each of a line of currency bills while they are being rotatively engaged and fed into or out of a rotary storing or unstoring means with such guidance being alongside of and throughout bill travel during such feeding engagement and especially overlapping into such rotary storing and starting in advance of such feeding and, more particularly, where such guidance is continuous from the time a bill is first feedingly engaged until it is rotatively stored or vice versa changes across a gap from flattening and straightening out confinement between fixed slide guides to a flexible guiding confinement between flexible tapes or the like.

Another and more specific object hereof relates to the provision of means to straighten out or flatten paper money bills while they are being dispensed or received into a money handling or storing device.

The foregoing and other important or desirable features or other advantages of this invention will be more apparent from a consideration of the following detailed description, when considered in conjunction with the accompanying drawings, illustrating preferred embodiments of the present invention, and wherein like reference numerals and characters refer to like and corresponding parts throughout the several views.

In the drawings:

FIGURE 2 is a partly schematic view more specifically illustrating the embodiment of FIGURE 1 and including a conventional cash register;

FIGURE 3 is a sectional view taken on the line III—III of FIGURE 2;

FIGURE 4 is an enlarged scale view like FIGURE 3, but with the feed belts omitted;

FIGURE 4A is a view like FIGURE 4 but showing a modification in which cords or the like are used in lieu of the rolled up strips or tapes of the other figures.

FIGURE 5 is a section taken on the line V—V of FIGURE 4;

FIGURE 6 is an enlarged sectional view taken on the line VI—VI of FIGURE 4;

FIGURE 7 is an enlarged sectional view taken on the line VII—VII of FIGURE 4;

FIGURE 7A is an enlarged detail and sectional view taken on the line VIIA—VIIA of FIGURE 7;

FIGURE 8 is an enlarged section taken on the line VIII—VIII of FIGURE 4;

FIGURE 9 is an enlarged section taken on the line IX—IX of FIGURE 4;

FIGURE 10 is a view like FIGURE 4 but showing a modification using separate or noncombined clutches and brakes;

FIGURE 11 is a section taken on the line XI—XI of FIGURE 10;

FIGURE 12 is a perspective showing another modification comprising a first form having removal magazines or cartridges for storing or dispensing different denominations of paper money;

FIGURE 13 is an enlarged section taken on the line XIII—XIII of FIGURE 12;

FIGURE 14 is an enlarged section taken on the line XIV—XIV of FIGURE 12;

FIGURE 15 is a perspective showing another modification or a second form having removable magazine or cartridge units for the storing or dispensing of different denominations of paper money;

FIGURE 16 is a section taken on the line XVI—XVI of FIGURE 15;

FIGURE 17 is a section taken on the line XVII—XVII of FIGURE 15;

FIGURES 18A and 18B (to be considered together) show a schematic view of the controls and certain actuated parts in a related circuit diagram, for all forms hereof;

FIGURE 19 is a perspective view showing another modification comprising a vertical stack or parallel shafts arrangement of the units for the several denominations of bills and also showing still another or third form having removal catridge units, magazines or the like for the storing or dispensing of different denominations of paper money;

FIGURE 20 is an enlarged section taken on the line XX—XX of FIGURE 19;

FIGURE 21 is a partially schematic and enlarged side or elevational view of FIGURE 2 showing units H and G (and its common cam carriers 6) thereof to a larger scale and is to be considered as part of the circuit of FIGURES 18A and 18B;

FIGURE 22 is a plan and sectional view taken on the line XXII—XXII of FIGURE 21;

FIGURE 23 is a table showing the relationships for the one dollar and the five dollar common cam carrier of FIGURES 21 and 22 and also for the similar ten dollar and twenty dollar common cam carrier and is to be considered as part of the disclosure relating to the circuit and controlling of FIGURES 18A and 18B;

FIGURE 24 is a partly schematic view showing a replenishment needed warning means and is to be considered as a part of the circuit of FIGURES 18A and 18B.

*General description of the method and apparatus of this invention*

Figure 1:
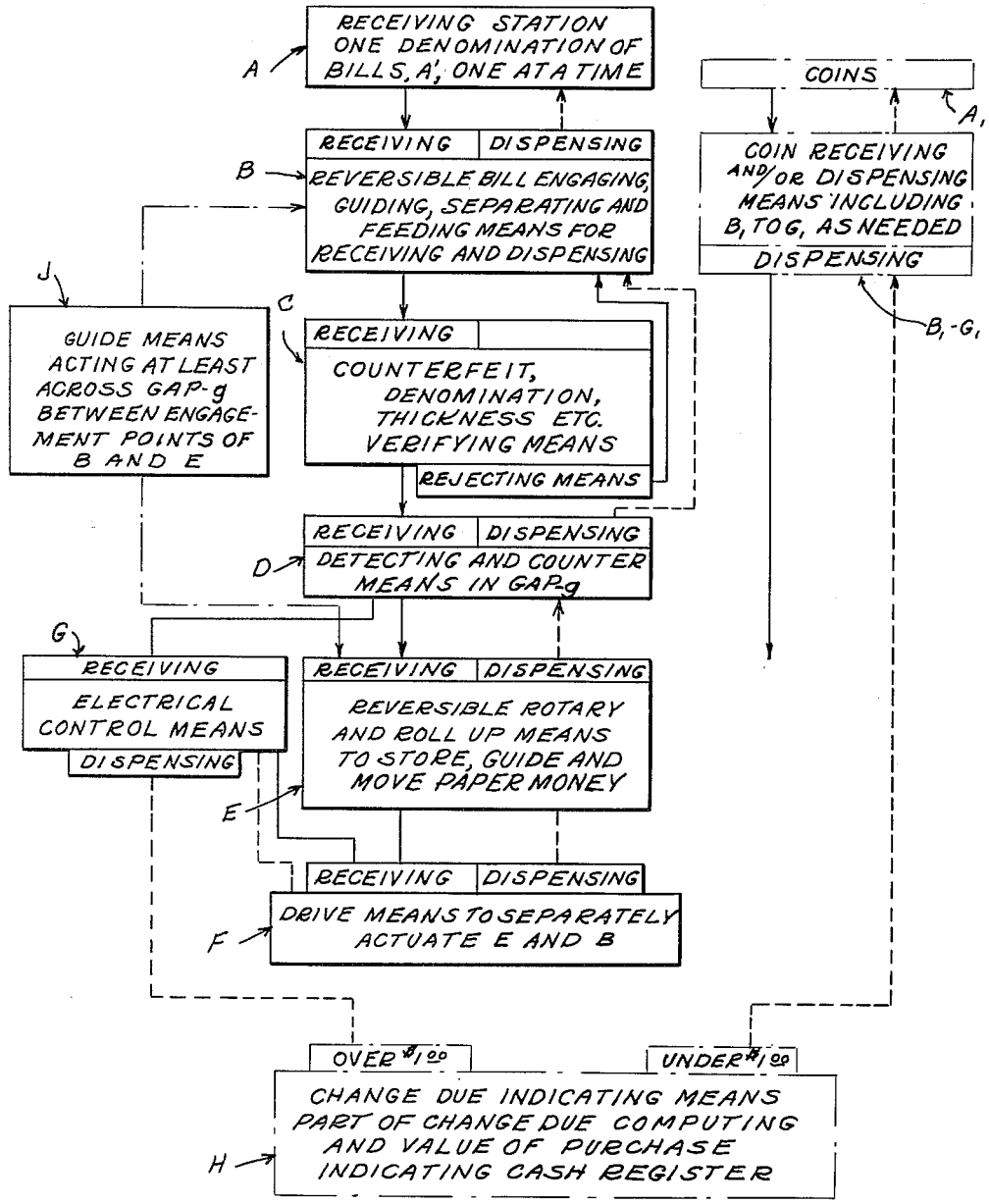
FIGURE 1 is a flow block type of diagram showing schematically important features of the arrangement and operation of one embodiment of my invention.

The block and flow type, schematic diagram or chart of FIGURE 1 generally illustrates the method and apparatus with its several interrelationships for certain broader aspects of this invention, which is here indicated as being in operative association or combination with a change due indicating and value of purchase showing type of cash register H which is well known to those skilled in this art and hence need not be further described herein except to note that it should have usable change due indicating means, for example, such as the illustrated gear sectors 4 to show the amount of change due in terms of currency bills of different denominations.

As shown in FIGURE 1 (which only broadly illustrates the method steps and arrangement for only one of each denomination of bills to be handled), A' indicates a proper denomination of bill in flat and unfolded form to be fed edgewise (and preferably, but not necessarily, lengthwise) into a suitable receiving and/or dispensing station indicated by A, which may be a flat platform or table forming a wider or full width extension, or the like, and which is located at the receiving and dispensing end of B which is a reversible mechanical, moving feed means also engaging and guiding bills for that denomination during their entry and exit. Preferably, this feed means B is continuously running in normal use, is of the rotary type and is separately or independently controlled with respect to the hereinafter disclosed storing means.

A and B are associated with a separate and independently controlled storing means E, preferably of these rotary type and these three and their drive means constitute the handling means which cooperate with a suitable controlling system to provide the desired or proper independent controls for reversible B and E and broadly including all detecting means or the like such as C and D. However, C and D are, for convenience, discussed in connection with the handling of the bills.

The rotary storing means E comprises broadly the previously known elongated flexible member wound between a currency storing spiral or reel and an unstoring spiral or reel. However, here E also includes new and improved associated drive connections and relationships. The storing spiral of each denomination unit is driven directly only in its storing direction while for its unstoring direction it is left free to turn (or unclutched) and driven by the tension in the flexible spiral member from the other spiral.

The converse is true in the unstoring direction drive in which the unstoring reel is driven directly or mechanically while the storing reel is then driven in reverse only by tension in the flexible elongated member. Preferably these two direct drives are by clutches from a single drive for the unit and from a common drive F for all the units. Also, these two directions of drive of E are each braked at the end of each currency receiving or dispensing period for one bill for accuracy and to prevent overrun. This braking should maintain tension in the elongated means so it may be applied at least or even only at the other spiral or to pull in tension on the elongated means.

The braking of the unstoring motion is similarly primarily by tension in the elongated member or tape and by braking on the storing roll. The brakes are held in between the bill by bill dispensing or receiving. The drive or clutch at one end of the tape is off or declutched generally only while the other end is being driven. Thus, no reversing means is essential for the two-way drive of E of each unit.

In contrast, the two-directional drive of B is reversed from the single drive to each unit (and specifically from the common drive for all the units) by reversing clutches, to thereby avoid the time lag of reversing the single electric motor and its common drive train (with their flywheel like inertia).

Block unit C here indicates any suitable and multifunction or combined, paper money verifying means of conventional and known types to determine whether or not it is counterfeit, to verify its proper denomination, check its thickness and to otherwise suitably verify its propriety. As indicated (by its bypassing and its absence of a DISPENSING legend in FIGURE 1) C is normally used, or normally operates, only during the receiving cycle or phase of operation. It is connected to a suitable rejecting means (preferably a means to instantly reverse the normally inwardly feeding or receiving feed means B) so that all improper bills are rapidly reversed in their mechanical feeding and fed back to the initial receiving station A.

Each proper or nonrejected bill received is successively fed in, or moved by this feed means B to and into the storing means E. More specifically, B only engages each bill to a position closely adjacent to, but spaced from the moving storing means E. Preferably, E is of a rotary type and more specifically is of a spiral roll-up type comprising at least one elongated, flexible member unwound from a storage reel or spool onto a money storing reel or spool and engaging and moving proper bills between its turns into spirally coiled storage or into a selectively and controlled, stopped started and reversed, spirally moving storage path adjacent to said means B. The rotary and roll-up storage means E is independently driven and reversed by the common drive means F to all under the control of G and as directed by H. It is quite desirable that B and E be of low weight and inertia and with closely adjacent, quick acting clutches and brakes so that they may be rapidly stopped, started or reversed for the rapid and always accurate handling of paper money in either direction without undesirable overrun or without undesirable time loss or delay in starting. B need not be quite so rapidly reversed although its fast action is desirable.

It is desired that such bills be handled and reversibly stored or unstored, while they are in a series or line, or flat unfolded bills which are edgewise spaced or have a slight but definite gap or spacing between them so that their edges along this line or series of successive bills may be definitely detected as well as counted, both as hereinafter disclosed. Any overlapping is objectable since it interferes with reliable and simple detecting for controlling and for counting.

The automatic, positive and reliable or foolproof separation of bills (and particularly of moving, mechanically fed bills) is an important feature of the method and apparatus of this invention. Such operation or such means are provided by a new relationship between (or in the transition between) feeding and storing or a combination of E and B to provide a means to always separate bills moving along in a series or line of bills by a positive jump or increase in bill speed between mechanical feeding and mechanical (and preferably rotary) storing. It is desirable that this separation occur in both directions of travel and also that the speed change be within a short time or through a short distance. It is also preferred that this separating be supplied by a reversible power feeding which (during storing) receives, engages, and accelerates the bills into a, preferably, uniform speed motion from the receiving station A where they are manually placed or inserted, normally one after the other by the person paying in money.

At this point, it should be noted that preferably (but not necessarily under all or broader aspects of this invention) there is normally a continuous engaging and inward feeding and guiding of bills by B. That is, preferably, the feed means B is continuously driven or continuously running in an inward feeding direction during the normal use of this method, system or apparatus or is at least suitably actuated for such inward feeding safely prior to its receiving bills as by the detection of such bills. It will be understood that this continuous inward feeding action will be briefly interrupted during the above described rapid reversal for rejection of an improper bill. Similarly, B is rapidly reversed to be always running to receive each dispensed bill during dispensing and here again, while the detection of each such unstored bill may start each B, yet it is preferred to reverse all B's of the several units by common reversing clutches from the common drive.

Preferably, bills are fed one at a time into the receiving station A and from thence are accelerated as they are engaged and fed by B, to thus provide a first operation or means to usually (but not always) separate bills if they are not manually inserted into the receiving station A too rapidly or too close together. It is also noted here that doubled bills, stacks of two or three superimposed or overlapped bills or other undesirable thicknesses will be detected by C and rapidly ejected by its rejecting means which, as noted above, rapidly reverses the feed means B. This same action could be used by E alone if there were no feed means B, but this would not work in all cases or where entering bills are too close together or are overlapped, and hence is insufficient.

The second or additional and foolproof bill separating action and means is preferably provided by the (preferably rotary) feed means and its speed relation to the (preferably rotary) storage or roll-up means E. Thus, during the receiving cycle of operation, the independently driven and controlled feed means B engages and moves the incoming bill at a linear speed which is adequately or materially less than the linear speed at the closely adjacent (but preferably slightly spaced away) point at which the roll-up means E engages the bill to move it into spirally rolled up storage. Thus, while the bill is drivingly engaged by both B and E, there is necessarily a temporary partial slippage of the bill between B and E and the bill accelerates or rapidly increases its speed during this short dual engagement or slippage period, as it is speeded up by the higher speed of E during this dual engagement period and (in some cases) for a short period thereafter while it is engaged only by E. This action is here considered on the basis of continuous motion of both B and E or considers only the effects of the speed differences or the speed jump even though there is here a stop-start action of the storing means in receiving, as hereinafter discussed in more detail. It may be noted here that the speed difference between B and E or the speed increase or jump in both storing and dispensing, does supply separation in both directions (or during both storing and dispensing) regardless of the hereinafter disclosed stop-start actions, since these, in general, neutralize each other. It will be understood that the separation during storing and during dispensing may be equal or they may be unequal.

While under the broader purview of this invention and as noted above, during storing, the rotation of E may be in effect, continuous or substantially so, if the incoming bills in B are close together (as by being manually fed into B very close together). These bills will be separated in E as hereinabove disclosed with the last bill in E running away from the next bill during its slippage period.

However, in most cases and in my preferred or normal operation, the feed means B runs continuously during this storing period while the storing means E stops and starts or is started by the leading edges of each bill at D and stopped by the trailing edge of each bill at end by D.

This normal stop-start operation during storing does not destroy or adversely affect the above described separating action since the stops and starts tend to cancel out in their effects. Even though the braking or stopping is more rapid than the acceleration of E (as is normal for braking as compared to accelerating) yet the next braking is the same so that these similar stops and starts cancel out and do not effect the speed jump caused by the separation of the bills.

During dispensing, B runs continuously and so does E for the time period to disperse the required number of bills from that unit, so that the above mentioned stop-start actions do not occur. Even if they did (as in certain other forms of this invention) they would cancel out as above so as not to affect the separation.

In either dispensing or storing and in my specific embodiments as disclosed, the main speed jump or acceleration occurs after the bill has left the dual engagement and is engaged and driven by only B or E as the case may be.

In my preferred form there is a small gap g between B and E (g is materially less than the length or dimension of the bill along its feed direction so that incoming bills are continuously and positively moved by the feed means B during the transit of its leading edge across this small gap). Preferably D is in gap g.

In addition to this separation of the incoming bills by their speed up between feeding and storing, it is to be noted that the bills are desirably (but not excessively or objectionably) actually stretched and straightened out by these frictional engagements. It will be understood that normally there would be some temporary partial slippage between the bill and either or both of the frictional engaging and driving surfaces of the feed means B or means E, thus to accommodate difference in speeds between B and E acting to speed up the bill and also to stretch it out, flatten it and straighten it in its direction of travel. In certain cases, a means such as B may be useful only or primarily for this straightening out or flattening. It is preferred that this slippage be substantially entirely at only one such engagement (as at E) to enhance the separation by reducing the slippage time as hereinafter explained.

It is also to be understood that these two different speeds, engaging points to speed up and straighten out incoming bills are in line along the length or feed direction to tension the incoming bills and so that there is no diagonal warping, twisting or the like on the bills during this action. In order to provide an adequate difference in the friction grips on the widely different types of paper money, which may be slippery, the bill engaging surfaces of B are preferably of an adequately high coefficient of friction (as by means of a surface of soft rubber, plastic or the like having an adequately high coefficient friction) while the tapes or ribbons of E have materially lower coefficient of friction surfaces. Particularly where two tapes are used (in double turns on the storing reel to provide a flexible confinement and guidance), they should be of low stretch and equally stretchable material and there should be means as hereinafter disclosed to prevent any undesired loosening in the confinement between the two tapes due to their double turn coiling on the storage reel.

A similar bill separating activity may be provided during dispensing. Also the feeding means may be running during dispensing, ready for bills from E as hereinafter described.

It is intended that the bill verifying be performed while the bill is being moved by the feed means B so that the detecting means C is preferably located intermediate the ends of the fixed path of motion by feed means B and before the bills reach E or even D which controls during both dispensing and storing as hereinafter described.

Within the broader purview of this invention, the controlling detecting means D is located to act only on bills which are to be stored or unstored in means E and not to detect or to count rejected bills. This detector D may also be connected to actuate a suitable counter of the plus and minus or adding and subtracting type. As will be understood by those skilled in this art, the detector D may be of various known types. These may include not only mechanical edge detectors, but also photocell means to interrupt a light beam, means to interrupt other forces or actions (such as air stream) by the edge of a bill or other such means well known in the art of detecting moving sheets, and particularly moving sheets of paper. However, I prefer to use a mechanical lever or finger engaged by the bill edge and (which is then effectively stiffened or braced by the above noted guiding confinement) operable in either direction for incoming or outgoing bills because of its low cost, simplicity and reliability and accordingly have illustrated such a form in the following more detailed figures, with this detecting arm located in the gap g between the engagement points for the feed means B and the storing means E to thereby achieve a simpler and more economical arrangement and improved operation as will be more fully apparent from the following detailed disclosure.

As indicated by block F, there is a drive means to separately or independently actuate E and B under the control of G and as directed by D and by H. Preferably, F is a unitary and common drive means, such as a suitable single electric motor, gears, shafting and clutches or the like. This common drive means is selectively clutched into the separately actuatable, low inertia and preferably rotary feed means B and/or to its associated storing means E to move the desired and selected number of bills one at a time into or out of the compact storage in a line or series of spaced apart bills in flat, single layer condition. Preferably suitable, quick acting clutches or the like (such as electromagnetic clutches) are used for this selective clutching action of F to B and to E. Further, it is preferred to rapidly and independently brake each end of the flexible spiral member of each E to a stand-still when it is declutched to prevent coasting and resulting overrun and inaccuracies in the counted one by one storing or dispensing of bills. This braking always includes at least the trailing end of each tape to prevent overrun as hereinafter disclosed.

In all modifications hereof, there are only three operating conditions for the driving means (reel 57 with its clutch and brake at 73' and reels 58, 59 with their clutch and brake at 73) at each end of E's flexible tapes. These three are braked (in between actuations in either direction) clutched in to be driven at the leading end of the tensioned elongated flexible means (for only one direction at each such end) and unclutched or free only while the other end is being driven.

Where double turn tapes are the like are used for E (as is preferred) they will have different travels or speeds at their unrolling ends due to their thickness and also due to the thickness of the stored bills and hence one tape will tend to be loose relative to the other which reduces the desired flexible confinements. This problem is solved here by providing a corresponding difference in speeds or travel between their unrolling reels ends as hereinafter disclosed in more detail.

The duration of the above noted temporary slip delay at one or both of B or E (and preferably at $EP_E$) is shortened by having one (and preferably the two feed rollers for B) with a higher effective friction by a higher engaging pressure and/or the above described higher coefficient of friction engaging surfaces and also by providing a greater speed difference between E and B.

The bill separating speed jump in both directions is provided by two different speed drives for the two directions of operation of one of B or E. Preferably (and as described above and in more detail below) there are two separate drives for the two ends of the coiled elongated flexible member or members of E and these two different speed drives drive the coiled tapes or the like faster than B (which is here substantially constant for its two directions) for storing and slower than B for dispensing. These two different speed drives may be provided in various suitable ways including the hereinafter disclosed difference in effective diameters between the storing reel and the unstoring reel or reels or the difference in the gearing for the drives to the two ends of the tapes or the like (both are illustrated for all embodiments). Other known arrangements may be used to provide or to permit drives of two different speeds in opposite directions for B or for E such as one way clutches or the other forms described herein.

The aforesaid rapid selective actuation of such clutches and brakes or the like is achieved by electrical controls G (including a suitable electric circuit) and with the required mechanical or electrical interconnections to C and to D to rapidly and selectively actuate the aforesaid clutches and brakes or the like. As indicated by its nonarrow lines, this control means G may operate in either a receiving phase or a dispensing phase to control the application of the drive means F for the aforesaid reversible actuations of B and of E.

In my preferred operation and during storing, E is started by D's detection of the leading end of each bill moving into it from B, held on while a bill is under D and turned off after the trailing end of the last bill while during dispensing, E is started by H acting through G for each bill to be given out and E is stopped by D's detection of the trailing end of each such bill. In each case, B is suitably controlled so that it is already running before each bill reaches it from either direction.

As noted above, suitable change due indicating means is provided as indicated by H. As hereinafter more specifically illustrated and disclosed, this is here provided by a conventional change due computing (and value of purchase indicating) cash register whose change due indicating means (for the number of currency bills due) are connected to actuate and control the electrical control means G. It will be understood that it is within the broad purview of this invention to provide a separate such change due computing means of any or suitable type for applications where this invention is intended to be employed as a complete unit without combining it with such a cash register or the like.

As intended to be indicated by FIGURE 1 and as will be understood by those skilled in this art, the total of verified bills received in payment, stored during a particular transaction and counted by part of G (all for each of the several denominations handled by systems like that shown in FIGURE 1) may be totalled by suitable adding means (as in G) and this total matched against the total amount of payment as shown to be due from the customer by the value of the purchase indicated by H with a connection to trigger the ejecting means of C to thereby rapidly reverse B and reject these paid in bill or bills if they are not adequate in amount, this last being another form of impropriety of the bills being received as they are scanned by the verifying means such as C).

Also indicated in FIGURE 1, it is intended that any suitable or presently known form of coin handling device be employed in combination with this invention to thereby make complete change both in bills and in coins and/or to receive both bills and/or to receive both bills and/or coins in payment. Since such coin handling or receiving and/or dispensing devices are in use and are well known, they are not described in any further detail except as to their association with the system or organization of this invention. Accordingly, suitable coin handling means forming the needed or required functions analogous to B to G inclusive for bills are intended to be illustrated by $B_1$–$G_1$ which receives coins from (or dispenses coins to) the receiving stations at $A_1$ for the separate denominations of coins, all interrelated with the value of the purchase and the amount of change due, as indicated.

While the system of this invention has been described and generally illustrated in its money receiving phase or action as shown by the solid lines with arrows for the incoming motion of the money and the solid lines without arrows for the controlling interconnections, yet it will be readily understood that the entire system or apparatus is rapidly or well known instantly, reversible so that it can briefly, for as long as needed, interrupt its money receiving action (and the preferably continuously inward motion of its feed B) to dispense as many bills of each denomination as are indicated as needed (by the computing and change due indicating H) to the customer or payee who receives them at the receiving station A. This paper currency dispensing action is illustrated by the dotted lines with arrows for the outward travel of the bills together with the dotted lines without arrows for the controlling interconnections between the several operative means. As shown here in FIGURE 1, by the bypassing of C by the dotted line for dispensing handling and the lack of a dispensing block in C, the verifying means C is not active during this dispensing operation. Normally it would not be needed in this paying out operation since this system pays on a last in, first out basis for the bills of a given denomination that it has verified, accepted, and stored. However, it is to be understood that means C (with its several verifying and protecting functions as noted above) may, if desired, be also employed during the dispensing cycle as a double verification or check on money paid out for other special purposes or in particular applications, all as will be appreciated by those skilled in this art.

A desirable feature of the method and apparatus of this invention is provided by the guide means J (shown by the dot-dash lines with arrows as preferably acting at least between the fed means B and the storing means E) to provide a rigid, fixed or stationary additional guiding (preferably on both sides for confinement) of the bills and along side of the feeding and guiding engagement of B and preferably partly overlapped so that it is also partly along side of the moving and guiding engagement of E. Thus, this fixed guiding means J provides guidance for at least part of the moving width of the successive bills while they are crossing the above noted gap between the beginning and end of the engagement for B and E. Additionally and preferably, the fixed guiding means J extends throughout the entire travel length of feed means B from its entry or exit to the receiving station A and also, preferably, part way into the storing or unstoring engaging and guiding by storing means E but not necessarily in all cases which preferably has two tapes to provide a flexible confinement and guidance. Thus the successive bills are always fixedly guided throughout their entire traveling lengths (or dimensions along their travel direction) as they are moved into or out of storage. This optional means J is shown as a separate block and to one side since it may be considered as acting only between B and E or (as mentioned above) it may be considered as acting throughout the travel length of B from A to, and overlappingly into, E.

In connection with this general description of the invention, it is to be noted that it is important, that the method and apparatus be capable of effectively handling and also controlling (including verifying, rejecting, counting and the like) normal, used paper money with all of its attendant problems and difficulties as noted above. To this end, it is desirable that the bills of given denomination be fed by separate means into and out of a compact storage in a continuously moving line, series or succession of such bills with none overlapping. Such apparatus must be simple, compact, economical to manufacture and relatively foolproof. Further it must be capable of being accurately controlled and of rapid stopping, starting and reversing so that it can handle paper money with the rapidity needed in various automatic or part automatic applications. It is is also desirable to have other additional and interrelated features such as a warning signal that replenishment is needed together with the above noted running inventory of the number of bills of a particular denomination in a particular storage unit as given by a plus and minus type of counter activated only by bills and entering or leaving the storage unit itself. The provision of suitable removable denomination units is desirable in many cases.

These several interrelated features are best supplied by a separate or independent rotary (and particularly a reversible) feed to or from a rotary (and particularly a roll-up or spirally coiled-up) rotary type of storage unit for each denomination of bills.

While the operation of this system is described in particular in the following disclosure as it is used in connection with a cash register and for a supermarket or like retail store, yet it will be understood (as noted above) that many and various other types of applications or combinations with other known accounting, banking or computing systems, or with automatic vending machines may be employed within the broader aspects of this invention.

In connection with FIGURE 1 or in such other applications, it will be understood that each denomination unit (for each denomination of bills to be handled) may be conveniently arranged adjacent to each other, as in a row, stack or other such arrangement. It will also be understood that while the control portions G and even H may be generally adjacent to the mechanical money handling parts B and E, yet, they may, if desired, be remote and electrically connected.

*Detailed description—currency handling*

FIGURES 2 and 3 illustrate one embodiment of the invention as shown in FIGURE 1, certain specific features and details being omitted for the sake of clarity. More detailed FIGURES 4, 5, 6, 7, 7A, 8 and 9 further illustrate the form of the invention as shown in FIGURES 2 and 3 but without the feed belts 9 and 19.

As shown in FIGURE 2, the change due indicating cash register designated as a whole by 1 is conventional or well known, so that it need not be further described except to note that it is here shown as having at its upper rear, a suitable plurality of gear sectors such as 4 (forming part of H) to indicate the number of currency bills due as change for the several denominations being handled.

A slot $1s$ is formed in the rear wall $1r$ of cash register 1 to permit suitably mounted drive means, such as the gears 5, to be mounted on this rear wall and engaged with the gear sectors 4, with these gears 5 extending into these suitable slots $1s$ as here indicated only schematically. Each gear 5 is separately connected to actuate an adjacent part of the electrical control means G which is here also designated as a whole by 6. A specific embodiment of this structure is shown in more detail in FIGURE 21. It will be understood that 5, 6 and their associated parts may be enclosed in a suitable, removable cover or housing, suitably secured as a rearward extension on the back of the cash register 1.

This separate or remote part 6 of the electrical control means G is operatively connected, as by the control cable or wires 2 to the remainder of the electrical control means G which is here also designated as a whole by 7 and located as shown. Similarly, it will be understood that a suitable coin handling unit $B_1G_1$ is connected by cable $2a$ to an electrical control means similar to 6, but operative for the several denominations of coins to be received or dispensed.

Since space or area, and particularly counter area, is at a premium in many locations (such as the checkout counter of a supermarket) the apparatus of this invention is here shown as associated in a stacked or vertical relation with the conventional cash register 1. To this end, the entire currency handling and controlling apparatus of this invention (with the exception of remote controlling part 6 and H) is preferably conveniently formed in one compact unit casing designated as a whole by 3. As shown, 3 comprises a slide drawer unit built into the cash register 1 below its keyboard and here illustrated as above the lower cash drawer (which may well be eliminated or replaced by 3 when using this invention). The open top box-like casing 3 may be removed or slid out for easy inspection and repair of the operative elements therein or for other purposes such as the ready removal or replacement of the hereinafter disclosed magazine or cartridge type currency storing units for the several denominations of bills handled.

By having the controlling motor energizing cable 2 or wires to connect into the removable unit 3 by a detachable means, such as the multiprong and separable electrical plug 2b, the entire unit 3 may be readily removed as a whole with all of its stored and counted money, as for deposit in a safe at the end of a business day or for replacement or for repair of this whole unit.

Thus, unit 3 comprises the means A to G with J, of FIGURE 1. This currency receiving station A (which may be of any suitable type) is here illustrated as located on the keyboard side wall of the cash register so that, in this case, the clerk or cashier would insert or receive the currency bills being handled and, in turn, receive them from, or give them to, the customer.

However, it is to be understood that this location or orientation for the currency receiving station A may be arranged to permit the customer to conveniently insert and to receive paper currency directly. For this purpose, the currency receiving station A would extend toward the customer and would be at the back or one of the sides of the cash register depending on the particular layout of the checkout counter, or the like. It is, of course, intended that slide drawer unit 3 be constructed to accommodate such different orientations or arrangements as needed in different locations. All this will be understood by those skilled in this art and thus needs no further or more detailed description here.

Turning again to FIGURES 2 and 3, the entering or leaving currency A′ includes the bill 6′ which is about to be inserted (or has just been removed) and the bill $6_a'$ which is here illustrated as engaged in the feed means B of each of the $1, $5, $10, and $20 denominations of bills handled by this particular embodiment. It will be understood that the apparatus may be arranged to deal with any needed or suitable number of denominations of bills by the same number of conveniently and adjacently arranged denomination units, preferably identical except as hereinafter noted as to their control means.

As shown in FIGURES 2 and 3, the several and generally identical denomination units are arranged in a row in the slide drawer unit 3. While this row is shown as side by side or horizontal, it will be apparent that it (and its shafts 12, 90, etc.) may as easily be vertical if upright bills are employed. However, it will be understood that other arrangements (conveniently permitting the common control G and the common drive F for the several units) may be employed as will be apparent to those skilled in this or in related arts. As only one example, attention is directed to the stacked or parallel shaft arrangement of these units as shown in FIGURES 19 and 20 and hereinafter described in more detail. This stacked arrangement may be desirable to save floor or counter area and where the use of vertical bills would be undesired.

In the following description, only one such unit (for one denomination of currency bills) will be described in detail and it is to be understood that the other denomination units are identical except as specifically noted.

The feed means B (separately or independently driven or mechanically reversed from the common drive means F under the selective control of the electrical control means G) for each denomination unit is illustrated as including the upper and lower feed rolls or rotors 8 and 18. In order to provide a longer and here straight engaging, feeding and guiding path, means such as the upper and lower belts 9 and 19 may be provided on the upper and lower rollers 8 and 18 respectively. The outer end of belt 9 is tensioned by, and runs over, the preferably smaller diameter roller or pulley 13 on the freely rotatable, suitably journalled and supported shaft 14. The lower belt 19 has the similar pulley 23 on the similar shaft 24. The preferably (but not necessarily) straight engaging region between the belts 9 and 19 is here shown as tangential to the intersection of the feed rollers 8 and 18 and as horizontally directed to form a straight line path into the hereinafter described beginning of the spiral roll-up storage path. These idler shafts 14 and 24 are shown as journalled in, and supported by, an end frame or bracket member 15 suitably mounted on 16 and the rest of the structure of unit 3.

The outwardly projecting and flat platform or table 16 provides one form of a stationary and bill receiving station A for the dispensing or receiving of bills of a given denomination for each unit. In this case, 16 forms an outward extension or continuation of the lowermost, normally fixed slide guide platform 17 which (as shown particularly in FIGURE 6) extends in axially (or in the inward feed direction) to its downwardly turned inner end 17a which prevents catching or snagging by moving bills. While 16 extends across the full width (or transverse dimension) of the entering or leaving bills yet, as shown particularly in FIGURE 4, 17 extends inward alongside, or to one side of, the feed means B (or alongside of its feed rotors 8 and 18 and also alongside of its belts 9 and 19 where they are employed and as shown in FIGURES 2 and 3 only).

The upper feed rotor 8 is fixed to its axially extending hub 11 which is, in turn, freely rotatable on the shaft 12. The suitable or known axially locating means 11a are provided on each side of 11 on shaft 12 and it is to be understood that similar such means may be employed to axially locate other such freely rotatable elements throughout the drawings hereof. The lower feed roller 18 is similarly fixed on its axially extending hub 21 which is, in turn, axially and nonrotatably held, as by set screw 21a, on the lower cross shaft 22 so that it is selectively driven as hereinafter described. While the feed means B may be provided by other or known arrangements (such as one feed roller or belt acting against a low friction, flat guide surface) yet the two interacting rotary feed means (such as the rollers 8 and 18 or the belts 9 and 19) are preferred. It is to be understood that the upper feed by 8 (or the belt 9) is driven by the lower feed roller 18 (or its belt 19) by a firmly engaged and nonslipping frictional drive.

While not essential in all forms or applications of this invention yet it is preferred (for a compact denomination unit and for economy in construction) to have the upper and lower rotary feed means coaxial with, and on the same shafts as, the winding off or tape storing reels here shown by the upper reel 58 and the lower reel 59, both of which are driven as hereinafter described.

While each E may comprise only one rolling up or unrolling spiral of a flexible elongated member (such as a tape or strip) to receive and store the succession bills between its turns, yet it is preferred to employ two interacting such flexible members to receive bills between them as the two flexible members strips or tapes are wound in a two turn spiral on the single or common storage reel or spool here shown by 57. Also while it is within the purview of certain broad aspects of this invention to have such flexible strips or tapes or the like, extend across the full width of the moving bills, yet it is here preferred that both the upper spiral strip 55 and the lower spiral strip 56 extend only part way across the transverse or width dimension of the moving bills (and preferably to one side thereof as shown) to thereby use the remainder of the width or transverse dimension of the bills for other purposes including the exposure to (or engagement by) a detector means D and the alongside and preferably upper and lower, guiding engagement by lower fixed guide 17 and by the corresponding and closely spaced upper fixed guide 10 having the curved up or non-snagging inner end 10a as shown in FIGURE 6.

It may be noted that for ease of illustration, the guide means 10 and 17 as well as other parts are not shown in the small scale illustrations of FIGURES 2 and 3, but are intended to be included there.

Thus, while both the upper spiral flexible strip 55 and the lower flexible spiral strip 56 are wound in double turn or two layer fashion onto the wider money storing spool 57 (having a width great enough for the width or transverse dimension of the stored bills) yet each of these two spiral strips are stored, or unwound from their own or individual storage spools such as upper reel 58 for upper strip 55 and the corresponding and similar reel 59 for the lower spiral strip 56. Preferably, and as noted above, 58 and 59 are coaxial with, and mounted on, the upper and lower shafts 12 and 22 which carry, respectively, the upper and lower rotary feed means B or 8 and 18.

This above referred to and preferred arrangement whereby the unrolling parts of E are coaxial with, and on the same shafts as, the feed rotors of B (that is, reels 58 and 59 being on feed drive shafts 12 and 22 instead of being on their own or separate shafts) not only provides a more compact arrangement but saves two shafts and their bearings, supports and the like. This arrangement is shown in all the illustrated embodiments hereof.

Also it is noted that it is preferred (but not essential) that the bills be stored lengthwise to provide narrower width reels and a more compact form for each unit.

Referring more specifically to the above referred to alongside, fixed end confining guides, it will be noted that 17 similarly has an antisnagging curved down inner end at 17a, both 10a and 17a being at or slightly inward from the engaging point for E at $EP_E$ but close to it to permit the free changing direction of the tapes as the amount of tapes on 57 changes.

As best shown in FIGURES 4 and 5, the full width outer end portion 16 of the continuous (or integral) lower guide has upturned sides 16" and 16' to engage the bill side edges to prevent swerving of entering or leaving bills. Additionally, side guide 16' (and also 16") may also be turned in as shown at 16'a to confine and flatten the bill sides between outer upper and lower guides (whose vertical spacing is here exaggerated for clarity of illustration as is the spacing between the rest of 10 and 17). The inner end 16'b of 16'a is curved or turned up to prevent bill snagging. It is to be understood that all other edges or ends of the fixed guide portions that might catch on bills are also so rounded off or curved.

These guides 10 and 17 are best shown in FIGURE 6 and their structure is intended to be essentially the same in all the modifications hereof (but is not repeated) except as noted. The outer ends of the several upper guide portions are also curved up to prevent bill catching as shown at 10a. The inner end of the outer full width lower guide portion 16 is also turned down or curved in front of both B and E (or in front of feed rollers 8–18 and reels 58, 59) as shown by 16a and 16b respectively, to thereby prevent catching of dispensed bills both as shown in FIGURE 4.

Both the upper and lower bill confining guides extend alongside of the engagements of B and E and from (or slightly in advance of and preferably gripping) the feed engagement point $EP_B$ (of FIGURE 6) across gap $g$ to the preferably relatively slipping storing engagement point $EP_E$ (or slightly beyond it) to thereby provide a fixed and confining guidance during feeding engagement of each bill and extending to (or beyond) the flexible confinement and guidance between tapes 55 and 56.

Both these guides extend across the full width of the bills except that they are suitably recessed or cut away for bill engagement by E and by B. Also the upper and lower guides are cut away or formed with narrow matching slots 10s and 17s (as best shown in FIGURE 8) with bill engaging and confining upper guide portions 10d and 10e and lower guide portions 17d and 17e close together on each side of the lower bill engaging end 118a of the detecting lever 118 of D. This provides an effective stiffening or bracing of the leading (and trailing) edges of flimsy bills while they are engaged by 118a (in either direction of their travel) to thus enhance the action of the mechanical type detector D. As also shown in FIGURES 4 and 8, the sides of the upper slot 10s (to enclose 118) may extend up and be suitably secured as shown and as described below.

The structure of upper guide 10 may be suitably connected to, or integral with, upright retaining walls enclosing the whole of D and suitably secured to the structure of 3. As shown in FIGURE 6, these walls include the rear wall 114, the intermediate and slot defining wall 114b and the front slot defining wall 114c with the inner end wall 114a connecting them as shown.

The reel 58 is freely rotatable on the shaft 12 since (as shown in FIGURE 8) its elongated or axially extended hub portion 60 has an inner, antifriction Oilite bearing insert 60a fixed therein and turning freely on shaft 12. This axially elongated hub 60, together with its axially elongated bearing insert 60a extends along shaft 12 and has the gear 69 fixed on this elongated extension of hub 60. The clutch and brake hub 74 of 73 is also fixed on the other end of this elongated extension hub 60 to drive it as hereinafter described. In this connection, it may be noted that the bearing insert 60a has another or double function since it extends axially along shaft 12 beyond the extension end of hub 60 so that 60a serves as a gap fixing spacer or stop as hereinafter described.

As shown in FIGURE 3 and in more detail in FIGURES 4 to 9, the slide drawer unit 3 comprises a suitably rigid and frame forming, boxlike casing preferably with an open top for easy access to the several elements therein.

This box 3 is compartmented by the cross partition wall 88a to form a rear space or compartment containing the control circuits G as shown in FIGURE 3. As also shown in this same FIGURE 3, the front to rear and rigidly connected partition wall 89 provides a side chamber or space containing drive shaft 40 with its associated reversing clutches F and other elements as shown. Shaft 40 is suitably journalled in, and supported by, partitions 89a and 89b. The several compartments for the plurality of denomination units are provided by partition 89 and the plurality of front to rear partitions 88. All shafts or pivots are suitably supported in conventional or suitable bearings in the several partitions or walls. This last is illustrated in more detail in FIGURE 8 which shows the mounting of shaft 12 in suitable bearing units 12a and shaft 22 in suitable bearing units 22a, both suitably secured in partitions 88 and 89. Similarly, FIGURE 9 shows the journalling of shaft 90 in suitable bearing units 90a in partitions 88 and 89. It is to be understood that other shafts and the like of this disclosure are intended to be similarly and suitably or conventionally journalled in bearings even though they are not specifically so illustrated for the sake of simplicity.

As best shown in FIGURE 8, smaller gear 30 (fixed by set screw 31 to shaft 22) meshes with, and is driven by, larger gear 28 fixed by said screw 29 on shaft 12. Set screw 34 in the hub of bevel gear 35 fixes it to shaft 12 to drive it selectively in either direction since bevel gear 35 engages the two bevel gears 36 and 37 (best shown in FIGURE 4). These two bevel gears 36 and 37 are each freely rotatable on the common drive shaft 40 but are selectively clutched to it for rotation in one direction or the other (or reversal) of the remaining drive train to shaft 12.

Accordingly and as shown in FIGURE 4, hub 36a is nonrotatably connected to the hub portion 46 forming an extension part of the clutch armature 45 of the conventional on-off rotary magnetic clutch designated as a whole by 44 and selectively driving shaft 12 in one direction. The nonrotatable, main body of clutch unit 44 is supported and held against rotation on partition 89b by suitable means such as the brackets 48. The preferably identical but reverse direction driving magnetic clutch designated as a whole by 51 has a rotary armature 52 with its hub 46 nonrotatably connected to the hub 37a of the bevel gear 37. 51 is similarly mounted on wall 3f by brackets such as 53. The common feed reversing clutches 44 and 51 are designated as part of the common drive means F which also includes the bevel gear 93 meshed with bevel gear 94 whose hub 95 is fixed by set screw 96 on the common drive shaft 40.

As shown in FIGURE 3, shaft 40 is driven by its worm wheel 42 engaging the worm on shaft 43 of a common motor M designated as a whole by 41, which is running in one direction during usual operation and is started and energized as hereinafter disclosed in connection with the electrical circuitry and the controlling. While the single electric motor M may be located and mounted in any suitable way, it is preferred that it be closely adjacent to the several currency units to reduce the length of its required drive train. To this end, it is shown as suitably mounted in the rear compartment with the control circuits G.

The single currency storing reel 57 forms part of the roll-up means E and is shown (in FIGURE 9) as being fixed to the axially elongated hub 98 which is suitably axially located on, but freely rotatable on, the cross shaft 90 which is fixed by set screw 91 to the hub 92 of bevel gear 93. Nonrotatable or drive transmitting means 99 connects the end of hub 98 to the hub extension 100 of the clutched or braked hub or inner part 74 of the clutch-brake unit 73' which is designated as forming part of F and is preferably identical with the clutch-brake unit 73 of FIGURE 8 and is similarly held by a suitable bracket 80a to partition 88 (see FIGURE 4). While it is to be understood separate clutch and brake units may be used to perform the functions of combined clutch and brake units (such as 73 and 73') yet I prefer to employ such unitary and combined clutch-brake units because of their space, weight, and cost saving. It is particularly important that they materially reduce the lengths of needed shafts and this last feature is especially useful in the hereinafter disclosed removable cartridge or magazine type units which are desirably as compact as feasible. It is also to be noted that this invention includes the features of my improved clutch-brake unit as hereinafter disclosed in more detail and as claimed.

Turning again to FIGURE 6, it will be noted that the upper and lower spiral strips 55 and 56 are relatively tightly pinched together or engaged into a money gripping engagement by the idler rollers 62 and 64 carried respectively by shafts 63 and 65 which may have a suitable but non-illustrated means for adjusting their spacing and the force with which these rollers are pressed together (as by well known forms of adjustable pressure springs). These two shafts 63 and 65 are suitably journalled in the partitions 88 and 89 as generally indicated in FIGURE 3. In this connection it is to be noted that not only shafts 63 and 65 but shaft 90 and the upper and lower shafts 12 and 22 are each continuous or unitary for the plurality of denomination units since they extend through the several currency denomination units shown as arranged in a side by side row in FIGURE 3. This reduces size, weight, cost and service difficulties and materially simplifies the common drive to shafts 90, 12 and 22, particularly in the form or embodiments of FIGURES 2 through 9 where there are no separately removable cartridge units for the several denominations of bills.

Referring again to FIGURE 8, it will be recalled that the output transmitting hub 74 of the brake clutch unit designated as a whole by 73 was described as rigidly (nonrotatably and axially) held on the end of the hub extension 60. In this connection it is to be noted that there may be two axially and nonrotatably connected together hub portions between the reel 58 on the one hand and the gears 69 and 74 on the other hand instead of the one piece extension as shown. This two piece form may be used to permit 73 to be made (or to be removed) as a unit with its hub 74. It is necessary that hub 74 be accurately spaced axially with respect to the corresponding axial end of the rotor portion 85 of unit 73. This rotor portion has a collar 87a which, with 85, is fixed by set screw 87 to shaft 12. This rotor 85 is shaped generally as shown in FIGURE 8 so that its outer periphery or extension forms the housing for a conventional roller or ball bearing unit designated as a whole by 86. This bearing 86 locates and permits the shaft 12 to rotate the radially inner rotor body 85 in the outer casing portion 80, which is suitably held against rotation as disclosed above. Body 80 is shaped as shown to contain the brake actuating solenoid coil 79 and the clutch actuating solenoid coil 81, each of which are suitably connected into the control circuit as shown and more fully described in connection with FIGURES 18A and 18B.

It is necessary that there be a gap as shown between 74 and the axial end of 85. This gap is maintained or spaced by the above noted end of bearing insert 60a. The hub 74 is outwardly splined at 74a to match corresponding female splines in the central bore through the clutch armature 75. This provides 75 with its required limited or slight axial freedom or motion along the splines 74a when clutch coil 81 is energized and its magnetic action pulls 75 over into suitable driving and frictional engagement with the end or the projecting portion 85a of the unitary rotor part 85 (which is fixed to shaft 12 to rotate therewith). Thus, the nonrotating or stationary clutch coil 81 (adjacent to and in a common housing with the brake solenoid coil 79) does not act to engage clutch armature 75 to itself but engages 75 with the rotating extension 85a to thereby clutch the gear 69 and the spool 58 to the selectively reversibly driven shaft 12. This structure is also shown in FIGURES 7 and 7A as well as in FIGURE 8.

FIGURES 7 and 7A show an end view of the substantially identical unit designated as a whole by 73' in FIGURE 4 which differs from 73 only in its inner armature hub extension 100 for armature 75 being connected as by pin 99 to the hub 98 (as shown in FIGURE 9) whereas the hub 74 of the clutch-brake unit 73 of FIGURE 8 is shown as secured on the extension 60.

The inner armature hub unit 74 of FIGURE 7 is otherwise like 74 of unit 73 and has the same intermeshing and axial sliding permitting spline 74a to slidably but nonrotatably connect it to the outer concentric clutch armature member 75. In unit 73', the armature 75 is on the hub 74 with extension 100 so that it is easy to axially locate it with respect to this hub by conventional means such as end stop supplying or axial motion preventing snap ring means in grooves which are well known and hence not illustrated here.

The outer periphery of 75 of units 73 and 73' is connected to the outer concentric armature or the brake armature 77 (for the brake solenoid coil 79) by rotation preventing but axial sliding motion permitting splines 77a. Excessive outward motion of 77 on 75 is prevented (or an axial end stop is provided) by radially longer spline teeth 77b cut or formed as extension of the inner, slidability permitting spline teeth 77a on 75 to thereby provide economically for a sturdy and practical end stop in this arrangement where other or conventional forms of end stop means would be difficult or impractical.

Accordingly, it will be apparent that the combined brake and clutch units 73 and 73' provide a compact and useful subcombination unit for other applications than its desirable use in the clutching and braking of currency handling means of the present invention.

In operation, energization of clutch coil 81 holds 75 in as described to drive 69 and 58 from shaft 12 while the energization of brake solenoid coil 79 engages and locks armature 77 to the stationary or nonrotating face of the stator casing 78 of unit 73 to thereby hold gear 69 and reel 58 against any motion or overrun and to stop them instantly. It will be appreciated the operation of unit 73' in FIGURE 9 similar except that it controls the driving of the spiral flexible means in its opposite direction and also serves to rapidly brake it and hold it in a fixed position in the reverse action.

Thus, brake-clutch unit 73 acts on the unstoring or dispensing shaft 12 so that the clutch 75 of 73 drives unstoring reels 58 and 59 only in their unstoring or dispensing direction while at least brake 77 of 73 is on during the rapid slowing of storing action. Both 58 and 59 are driven at the same speed by 75 of 73 through the equal diameter gears 69 and 71.

Clutch-brake unit 73' acts only on the storing shaft 90 to directly drive the storing reel 57 of FIGURE 9, as set forth herein. B or its rollers 8 and 18 are differently driven or separately and independently from the driving of E since B is not driven through (or affected by) the clutches or brakes of 73 and 73'. B is only rapidly reversed by the reversing clutches 44 and 51 which are common to all the denomination units. While B could be reversed by reversing electric motor 41, this would involve a time lag due to the inertia of the whole common drive train. B has a higher surface or linear speed than E during dispensing and a lower surface speed than E during storing to provide the bill separating speed jump since E is differently driven (i.e. at different speeds) in these two directions, as set forth in more detail in the operation portion of the handling section.

HANDLING

Verifying propriety of bills and rejecting

The verifying means C embodies means to determine whether each bill is counterfeit, of improper denomination, is folded or in multiple layers, or is otherwise improper or objectionable and is composed of elements or parts well known to those skilled in this art so that it is illustrated only by the one block designated as C even though it is intended to include the several necessary parts for its several functions as described above. Unit C is preferably located to act during the feeding, as shown in FIGURES 2 and 3. In case feed belts 9 and 19 are not used but only the feed rollers 8 and 18, unit C may be located in similar position to that illustrated in FIGURE 3 so that it reads each bill going through and while the leading edge portion of the bill has been engaged by B or is being fed by the feed rollers 8 and 18 and before reaching D or E. These rollers 8 and 18 can thus rapidly reject a bill and feed it back to the customer if such a bill is in any way improper. It will be understood that feed rollers 8 and 18 (or the belts 9 and 19) may have suitable, relatively high friction surfaces (such as soft rubber or the like, as well known to those skilled in this art) to thereby prevent undue slippage with respect to particularly slippery bills.

It will be noted that in FIGURES 2 and 3, unit C reads or acts on only part of the width of the bill alongside of the belts of the feed means B. However, in the similar usage in FIGURES 4 to 9 (where the belts 9 and 19 are not employed) unit C may act on or read across the entire width of the bill if desired. It is intended that C be located over the bill which is positioned on, and supported by, the platform table or guide surface 16. The upper flat and closely spaced guide surface 10 either does not extend out as far as unit C or has an opening therethrough of sufficient size to prevent its interference with unit C. Also unit C can be located below surface 16. For optical verification, a transparent portion may be provided in 16.

HANDLING

Detecting, counting and starting of E

In like manner, there is opening through, or an interruption in, the upper guide surface 10 to permit the suitable detecting and counting means, indicated as a whole by D, to examine or detect the bill or its edge. While, within the broader purview of this invention, such detecting means D may be of various known or suitable types and may in some cases be located in other positions or even combined with means C, yet it is preferred that means D be located to act only on bills that are not going to be rejected (having been passed by means C) so that they are moved into E from feed means B during their storage.

It is preferred to have D located as shown in the gap or space g indicated in FIGURE 6 between the last inward point of engagement of the roller or belts of the feed means B and the initial point of storing engagement of the flexible strips (located on the line through the shafts or centers of the pinching or tape engaging rollers 62 and 64).

It is particularly to be noted that the entire axial length or extent of each bill being moved through this gap g is continuously guided (and also confined) between the upper and lower relatively fixed or stationary guide surfaces 10 and 17 whose inner ends 10a and 17a are smoothly curved or turned out to prevent any snagging or catching of a bent up or torn bill during its dispensing motion out of the storage roll 57. Preferably the effective inner ends of these guide surfaces 10 and 17 are located at, or very slightly inward from, the point of engagement between rollers 62 and 64 to thereby permit the flexible members 55 and 56 and the entering or leaving bills to readily assume the proper direction so that they are always tangential to the spiral roll on reel 57 during its varying outside diameter as it changes from empty to full or vice versa.

As illustrated in FIGURES 4, 5, 6 and 8, the means D is specifically of a mechanical type engaging (and thereby counting) the leading edge of each entering or leaving bill (said bills being suitably spaced apart by foolproof means as noted above and in flat condition and in single file series or succession).

It is preferred that this means D (of whatever type) operate to detect both leading and trailing edges of both entering and leaving bills. In normal receiving operation, the feed means B is continuously running to grip, accelerate to substantially uniform speed, and advance successive bills as they are placed in the receiving station A (either by a customer in payment for a transaction or in order to replenish the store of money in that particular denomination unit).

During this time, while storing the roll-up means E is not rotating and is, in fact, held against turning by its brake means as set forth above. The detection of the leading edge of the advancing bill in the gap or space g by means D not only acts to count the bill (in plus fashion, as noted above) but also deenergizes the proper brake solenoid coil to take off the brake for E and energizes the proper clutch solenoid to drive the rotary, roll-up storage means E in its receiving or storing direction so that the low inertia roll-up means E is very rapidly started from the stored energy, flywheel of the continuously running common drive and thus is rapidly brought up to its rated speed which, during the receiving cycle, is higher than that of the linear fed speed of the bill. Thus E is brought up to this higher surface speed before the bill reaches it so that the successive bills being so engaged by E are thus separated with a slippage due to the speed difference as noted above.

When the trailing edge of a particular bill is detected, the means D goes from its "on" to its "off" condition to thereby rapidly stop the rotation of E and bill travel by deenergizing the receiving direction driving clutch for E and energizing its proper brake solenoid coil or coils to thereby rapidly stop E without undesired overrun. It will be noted the actual counting (or energization of a suitable counter means) may be done by either a signal at the leading edge of a particular bill or by the signal at its trailing edge.

In the dispensing action all feeds B are started in reverse, and simultaneously the feed means E is started (by the suitable electrical control means G) from its braked condition and rotates to move one bill at a time in its dispensing direction under the control of the electrical control means with the number of bills of that particular denomination to be dispensed being determined by the change due indicating means H. During this dispensing the bills are again counted and the number subtracted from the plus and minus type counter for that particular denomination unit. It may also be noted that the bills are also separated during this dispensing since the linear speed of the feed means B is higher than linear or bill speed of the roll-up means E during this dispensing action. A more detailed description and review of the receiving and dispensing actions as part of the handling is given below in this section and their relationship to the electrical control system G is given below in connection with the description in the controlling section.

It will thus be seen that for this type of receiving operation, it is desirable to have a detecting means D located in advance of the initial point of engagement of the entering bill by the storage or roll-up means E and also that the roll-up means E be of low inertia and rapidly and powerfully clutched into the common drive's instantly available high power (such as the flywheel stored energy of the normally continually running and relatively heavy common drive of this invention). This permits the roll-up means E to be sufficiently rapidly accelerated to come up to a surface speed which is higher than the surface speed of the feed means B for the receiving action and also permits a very compact device or apparatus wherein it is not essential to have any long time delay or any resulting long advance spacing of the detector means D in advance of the entering engagement point of roll-up means E. Thus, the feed means B may be positioned very close to the roll-up means E with only a very small or short space of gap *g* between them as illustrated. This spacing or gap *g* may be in the order of two to three inches or less.

In applications where it may not be desired to realize the benefits of compactness, lower cost and the other advantages resulting from having the feed rollers for B coaxial with (or on the same shafts as) the roll-off or tape storing spools then separate and offset shafts may be provided for 58 and 59. In such a case the feed may be effectively ahead of the detector D and the storing reel of E with the detector means such as D acting at the start of, in advance of, the rolling up engagement. In such a case it would not be difficult to have the very desirable starting up from a standstill of the roll-up storage means E for each entering bill, as provided by the preferred form of this invention.

It is also to be noted that the means D performs two different functions. First, it detects the leading and trailing edges of successive bills moving in either direction to start and also to stop the drive or rotation of the storage means during the receiving action. Secondly, D (and its associated count recorder) counts the successive bills in a plus and minus (or add and substract) fashion for receiving and dispensing respectively to thereby maintain an accurate running balance of the net count for each denomination unit. It is to be understood that separate units or devices may be provided for these two different functions if desired and that they may be differently located and/or actuated if desired within the broader purview of this invention.

Turning to the specific structure of the preferred mechanical form of bill detector D, it will be seen that this improved unit, which is independently useful for other applications than those taught herein or as a subcombination under this invention, comprises (as best seen in FIGURE 6) the preferably vertical, upwardly suspended or pivoted, swinging gate or lever 118. Its lower, active end 118a extends slightly below the path of entering or leaving bills to be engaged and swung by their leading edges and released to swing back as their trailing edges pass out from underneath the swung over lever 118 in its two slots. As shown, this detecting lever or the like is swingable in either of two directions from a center or inactive position to which it is normally biased by 116b acting on the compounding lever 117a through the cam means 119–120. The entire unit D is secured and mounted in any desired or suitable fashion or as described above, by the provision of the upright walls of sheet metal or the like, suitably spaced apart transverse to the travel direction of the bills and as shown at 114, 114b and 114c to thus provide a mounting frame with the slots as described. The walls 114 and 114c may be extended as shown in FIGURE 6, to provide bearings for the shaft 63. (Shaft 65 is similarly supported in bearings in walls 17g and 17h extend down from (and stiffening) 17d and 17e.)

Suitably mounted in this frame 114-114b is the case 115 of a conventional microswitch unit (which need not be further described here since it is well known to all those skilled in this or related arts). A suitable plunger 116 extends into casing 115 to actuate its contacts which are not shown here but are in circuit 200 as shown. D thereby indicates (by suitable wire connections to the electrical control means G) the time period during which a bill is passing under D and holding it in its on position for controlling and also for counting as hereinafter described. 115 has a suitable clamp or bracket providing a journal for pivot 117 for the lower end of the second or compounding lever 117a. The upper end of this sensitivity increasing lever 117a is cammingly engaged by either the upper or lower edge of the two-way swingable camming surface 120 formed on the actuator or cam member 119. This actuator or cam 119 is rotatably swingable about the axis of pivot or shaft 118b, which is, in turn, suitably journalled in the upright plates 114 and 114c. The upper end of the detecting lever 118 is pivoted about the same shaft or axis 118b and has its upper end fixed relative to 119 to swing therewith (as by having 118 suitably secured relative to 119). Thus, the bill caused swinging of 118 in either direction from its biased inactive or central position for either receiving or dispensing of bills will cause 120 to swing in the same direction. These switches in 115, then, are actuated in the same way by the bill actuated swinging of 118 in either direction from its inactive center position during the transit of a bill for receiving as well as for dispensing and also thus provides for the counting of entering or leaving bills without distinction.

The plus or minus action of the counting recorder of 200, depending on whether the bills are entering or leaving storage, is generally by a mechanical switching from the reversing by clutches 44–51 and more particularly described in connection with FIGURES 18A and 18B.

As described above, the effectiveness of this mechanical detector, especially for flimsy bills, is materially enhanced by the confining engagement on each face of the bill and along its path as its edge is engaged by (or disengaged from) the lower end 118a of lever 118.

HANDLING

*Operation with only broadly detecting, control and counting*

In normal use and in all illustrated forms hereof, it is preferred as a desirable and important feature (but it is not essential under the broader aspects hereof) that the one directional motor 41 be running and that all feed means B (the four illustrated) be rotating in their receiving directions while awaiting (or in between) the manual placing of bills in any one or more of the receiving stations A (or the manual insertion of bills directly in between feed rollers 8 and 18 of any denomination unit or section). During this time, the clutches 75 (by coils 81) of each brake-clutch 73' are not engaged and preferably the associated brakes 77 (by coils 79) of units 73 (and also 73', if desired, but secondarily) are engaged or on, to stop or hold the storing means E (gears 69 and 71 and reels or spools 58, 59) stationary mainly by tension in tapes 55 and 56. As noted here, all of the feed means B are suitably mechancally driven in their receiving directions from the same common drive, as by the engagement of the proper reversing clutch (such as 44) to drive from larger gear 28 to smaller (and hence faster) gear 30 relatively fixed to, and driving, lower feed roller 18, the upper feed roller 8 being freely rotatable on its shaft 12 (as indicated by its legends in FIGURES 5 and 8) so that it is not driven by its own shaft but only frictionally by 18 (acting through the bill, if any, and also through the optional belts 19 and 9 in FIGURES 2 and 3).

Rollers 8 and 18 may be identical in the form of FIGURES 1 to 9 (to reduce costs and the number of service parts) and undesirable continuous slippage or frictional rubbing between them is prevented by 8 being free on its shaft. It is to be noted that unequal gears 28 and 30 turn at different speeds so that 8 is not drivingly connected to coaxial gear 28.

Upon entry into receiving station A, feed engagement and rapid acceleration up to a substantially uniform linear speed of each successive bill A' by each rotary feed means B (all or any number may so operate simultaneously as needed), only each verified (by C) and nonrejected bill is moved past and suitably detected by indicator D (to additively count it for each denomination as by the hereinafter described counters 222 and the like of FIGURE 18 and also, if desired, by Dr of FIGURES 12 to 17 and 19, 20). Each E (of each unit) is in effect individually started by a verified bill moving in only B by the action of D. Indicator D also then rapidly starts rotary storage means E in its storing direction to quickly engage the leading edge portion of each such verified, counted and already moving (mechanically fed) bill while E and preceding bills rotate at a higher (and preferably at a speed which is substantially uniform except for the effects of the changing effective diameter of the spiral storage coil) linear speed than the incoming bills speed, thus providing the essential and important mechanical separation of successive and already moving such bills, even if the payer or customer should manually enter them too close together or, in fact, actually or partly overlapping. The storing means E is driven in two ways and at two different speeds for its two directions of motion. Its linear speed during this storing is higher than the feed linear speed due to the higher speed driving of E here by the always higher effective coil diameter on reel 57, or by the other means described.

It may again be noted that any multiple thickness condition of bills fed by B will be detected by C and ejected. This last includes any folded bills or wholly or excessively overlapped bills that the B to E speed jump cannot separate. A sales advantage here is that multiple overlapped bills inadvertently inserted by a customer are rejected.

While there is a desirable bill separating action by the already running feed means B for normally manually fed bills, this alone is not adequate as it will (as noted above) be unable to separate bills manually fed in too close together or partly overlapped. All such difficulties are solved by the positive, mechanical and foolproof separation due to the above noted speed jump. Further, this separation is controlled (by its first speed difference) so that the bills are not excessively separated which would waste available storage roll space. The effective starting of each E by a proper bill fed by B packs the bills to the desired minimum spacing in E and saves waste space in E which would occur if there were wide or irregular such spacings between successive bills.

It is important to note that there is continuous or "alongside" guidance of the successive moving bills during all of the aforesaid actions to also straighten the bills, hold them flat and prevent them from twisting or turning. Such guidance is particularly important across gap g when it is used. It is also desirable that detector D be in gap g between engaging regions of B and E, when B and E are spaced as shown to permit the use of the same shafts for a feeding rotor and for an unrolling reel.

Considering the above storing actions more specifically and particularly in relation to FIGURES 4 to 9 inclusive, it is noted that (all B's being running as aforesaid) the detection of the leading edge of the entering, verified bill by D electrically (and as hereinafter disclosed in more detail) deenergizes and releases the braking and energizes clutch coil 81 to engage clutch armature 75 of each of these same combined units 73', to thereby rapidly start the low inertia E or the storing reel 57 (and by tension through tapes 55 and 56, the unclutched and unbraked tape reels 58 and 59 respectively are rotated in their unrolling directions). The several denomination units can operate simultaneously. Bills being received and mechanically stored are detected as aforesaid and one at a time while they are in substantially uniform and mechanically fed motion and in a series or line in close but spaced edge to edge, although they are also so controlled (as hereinafter set forth) as to be verified, rejected if necessary, and counted, all one at a time. The detection of the trailing edge of each bill starts to stop the storing motion of E and stops E for the last bill inserted in any case. E may stop for each bill or only for the last of rapidly inserted bills. E is stopped by deenergizing of storing clutch 75 of 73' and braking includes energizing of brake 77 of 73.

Now considering the above noted dispensing or unstoring actions of this same type of system, it is first to be noted that all (or each needed one of the same rotary storage means E are quickly driven in reverse directions to successively dispense, one at a time, only the number of bills of each particular denomination as called for by the change due indicating means H acting through the hereinafter described electrical control means G while the rotary feed means B is suitably started (or is suitably kept running only for such a succession of dispensed bills) by G and its related parts safely in advance of each dispensed bill reaching B. This may include starting of B by the detection by D of the leading edges of each bill moving in the dispensing direction, in a fashion similar to the above described storing action or (as preferred) by the reversal of clutches 44–51 to reverse all B's of all units simultaneously at the start of the dispensing phase and during its required time period as determined by D's detection of the trailing edge of the last dispensing bill called for by H to thereby shift B back to receiving.

Verification by C is normally not needed for the last in-first out type of handling of each denomination as presently preferred so that C and the rejecting action (as indicated in FIGURE 1) may be inactive except in other special or different applications. Feed means B then delivers the selectively dispensed bills of each denomination to the respective receiving stations A for removal by the customer or the like.

Next considering the above dispensing actions more specifically, and in relation to FIGURES 4 to 9 inclusive, it is again noted that H through G stops and reverses the above noted inward feeding of all feed means B (by reversal of clutches 44–51 during the entire dispensing operation by all units) when H indicates the proper number of bills of each denomination to be dispensed as change due.

At this time, G causes E (only for each denomination unit as needed) to go from its then brake held stationary condition into a one bill at a time, series of bill length, dispensing or unstoring direction drive increments to thereby dispense the number of bills of each denomination as called for by H. Particularly here, the braking of each E to be moved is released as by the deenergization of brake 77 of 73′ (and of 77 of 73 if it is also then in use) and clutch 75 of 73 (for each unit to dispense) is energized during successive time intervals for the dispensing of the required number of bills of that denomination. A plurality of denomination units may dispense simultaneously.

After this (or at the end of the dispensing for each denomination unit) its E is stopped and held by the deenergization of its unstoring clutch 75 of 73 and the energization of its brake, such as 77 of 73′ acting in tension on tapes 55 and 56 (plus brake 77 of 73 if desired).

When all required denominations have been thus dispensed, G causes the reversal of common clutches 44–51 to restore all feed means B (of all units) to their aforesaid receiving condition.

During such dispensing (in FIGURES 2 to 9) E's surface unstoring speed (of 55, 56 and A′) is materially lower than the corresponding storing speed and is also materially lower than the surface feed speed of B (which is the same during dispensing and storing here) to provide the desired, bill separating speed jump in this direction. This lower speed of E is here provided by its dispensing drive by any suitable means or by either or preferably both of the speed difference between spools 58–59 and feed rollers 8 and 18 and by the always effectively smaller (though varying) spiral coil diameters of the rolls on reels 58 and 59 as compared to the larger effective coil diameter on reel 57, and rollers 8–18.

It will also be noted that, during both storing or dispensing, the feed means B (rollers 8 and 18) for each denomination unit are already running in their proper directions and ready to receive either bills manually inserted at A or bills counted off and dispensed by E. While this desirable function may be achieved individually for each denomination unit under this invention, by using detector D to start B before each bill reaches it during dispensing and by a suitable extra detector acting on entering bills at A to start each B during storing, yet the above described common and simultaneous reversal of the feed means B for all units by reversing drive means (such as clutches 44–51) is preferred because of its simplicity and its resulting lower cost, less parts and service problems and the like.

It is to be noted that the foregoing and the verifying means C and the detecting means D (which may be combined if desired in certain applications hereof) together and with the rejecting means (or the rapid reversal or feed means B, and here specifically the reversal of all the B's upon the detection of an improper bill in any denomination unit by readily apparent reversing actuation of clutches 44–51 only during such rejection of all bills then being received to include the improper one) provide an operation and means whereby only desired or verified bills are received and stored into the E of each denomination unit in close, but adequate or safe, spacing to thereby conserve space and to provide a rapid and yet accurate dispensing or receiving (with the required counting in either direction for each unit).

In the specific system and apparatus disclosed for all forms hereof, it is preferred for the sake of the resulting simplicity, economy of structure, compactness and the like (but is not essential in all arrangements or applications of this invention), that all of the feed means B (for all units or sections) be simultaneously driven in one direction or the other, whenever motor 41 is running by any suitable reversing means such as the disengagement of the storing direction reversing clutch 51 and vice versa. However, it will be apparent that for other operations or in special arrangements, the feed means B may be declutched or stopped here as by declutching of both 44 and 51. As shown, this suitable reversing means (44–51) always provides either a receiving or storing phase wherein all the rotary feed means B are running ready to instantly engage and move bills to E for separation from receiving station A or else a dispensing phase or operation wherein all the rotary feed means B are running in their reverse or out direction ready to instantly engage (and also to speed up and separate) bills supplied from the adjacent storing means E under control of H acting through G. This reversing shift by 44–51 also reverses shaft 12 and the inner member or rotor 85 of 73 so that its clutch is ready to positively drive both unrolling reels 58 and 59 (directly and also through the identical gears 69 and 71 of FIGURE 8) in their unstoring or dispensing direction when called for by H through G and to tension both tapes 55 and 56 to thereby rotate 57 during this dispensing. Tapes 55 and 56 or their equivalents are always kept tensioned and prevented from uncoiling at either end by any overrun or the like in either direction in all operations under this invention.

It will be noted that the clutches of 73 and 73′ (as well as their brakes) act only on the two ends of feed means E (or their tapes). While the two-way mechanical reversing means 44–51 primarily reverses only feed means B and also provides the correct drive direction for 73 (but not for 73′) during its sole use in dispensing. This last function could, of course, be readily provided by other arrangements under this invention especially if feed means B were separate from the unrolling end of storing means E. This feed drive reversal (by 44–51) also acts to suitably reverse the reversible counter associated with each unit's detector D. This is more specifically disclosed in connection with FIGURES 18A and 18B.

In contrast to the always running feed means B (for all units) each storing means E is preferably normally (or in between its metered or bill by bill operation) held braked and hence fully stationary while ready for action. E is unbraked and clutched by 73′ bill by bill by D acting through G for storing. Similarly, E is unbraked and clutched by 73 for dispensing under a counted or bill by bill control of H acting through G. These two unbraking and clutching actions (for either direction) are preferably substantially simultaneous.

As noted above, it is important that each roll-up type rotary storage means be so braked (or always braked in a particular way) in stopping from either its storing direction (when 73′ is unclutched) or from its dispensing direction (when 73 is unclutched) to avoid any overrun of the trailing end, looseness or uncoiling of the elongated flexible spiral members (such as 55 and 56) at or by their immediately previously free or nonclutched trailing ends. Here it is to be noted that when 73′ is clutched in to drive E and 57 for storing, then 58 and 59 are free (and are driven only by tension in 55 and 56) since 73 is then unclutched and unbraked. The unit 73′ is similarly unclutched when 73 drives E in dispensing. It may be further noted that this problem of possible overrun arises from the fact that desirably here, each storing means E is idle and held braked in between its intermittent uses and that the flexible members such as 55 and 56 are only driven by tension at one end or the other for storing or dispensing.

To this end, or to meet this braking problem, it is preferred and important that when the tensioning drive at only one of either end of each flexible spiral member (such as 55 and 56) is released by electrically unclutching to stop either the storing or the dispensing action of E, then (and preferably substantially simultaneously) at least the other (or free end previously tape tension driven) end of each such flexible spiral member is electrically braked to thereby always maintain these flexible spiral members in tension and prevent their undesired overrun or free or uncontrolled uncoiling. Put another way, when clutch 75 of 73′ opens to stop the storing drive of E, then at least brake 77 of 73 goes on and stays on until the next action and, conversely, when clutch 75 of 73 is opened to stop dispensing by E, then at least the brake 77 of 73' of that same denomination unit goes on and stays on till the next action. This is also shown in more detail in FIGURES 18A and 18B as described below.

It may also be noted that in the specific arrangements shown (due to the simultaneous reversed drive to shafts 12 and 22 by 44–51) any incidental frictional driving on the just unclutched end (or on reel 57 in stopping of storing and similarly on reels 58 and 59 upon stopping of dispensing) will also tend to loosen or to reduce the tensioning of 55 and 56 during this braking of E from storing or from dispensing. Thus, actuation of both brakes (of 73 and of 73') in either such stopping is desirable and is used in the several forms shown. In other cases this dual braking may be employed only for its simiplicity or for more total braking, as long as the either ends of the spiral tapes are not permitted to overrun.

In FIGURES 1 and 9 (and similarly in all of the other modifications hereof), the effective winding or hub diameters of unrolling reels 58 and 59 are different. This is best shown by 60 as contrasted with 61 of FIGURE 6 wherein the larger diameter at 61 provides one means for giving a higher unrolling end speed to the outer tape 56 of the double wound pair, to thus simply provide for this above discussed problem.

As earlier discussed, the two ends of E or tapes 55 and 56 are here driven at higher and lower speeds then B (or rollers 8 and 18) for storing and dispensing respectively by both (or either if desired) of the difference in speeds by unequal gears 95–94 as contrasted with the equal gears at 35 with 36 and 37 and the difference in effective diameters between 57 as compared with 59 (and 58), and rollers 8 and 18.

Feed roller 8 is free on it shaft since it is frictionally driven by 18 through the smaller gear 30 and the larger gear 28. These gears 28 and 30 control the speed of rollers 8 and 18 while gears 69 and 71 control the speeds of the two unrolling reels.

The above discussed slippage at E or at $EP_E$ with the gripping at B or at $EP_B$ shown by legends in FIGURE 6 which also shows by legend that the storage engagement point may (in certain cases or if desired) be inward at $E'P'_E$ if the pinching rollers 62 and 64 are eliminated, as for a shorter device in which there is no flexible confinement of the entering bills prior to their final spiral coiling.

It may also be noted that in all the modifications shown, the storing reel (such as 57) is wide enough for the transverse dimension or width of the bills stored thereon while the unrolling reels (such as 58 and 59) do not store any bills and hence are only wide enough for their tapes 55 and 56.

In general and by way of review, it may be noted that in all the modifications shown herein, there are three controlled drive connections, two spaced apart, for the two ends of the tape or tapes on the like E and one (coaxial with the dispensing tape device) reversible drive connection for the feed roller or rollers of B. Also there are but two common drive trains for these three drives with these drive trains for these extending alongside of or through the line or row of adjacent units. In FIGURES 1 to 9, these drive trains are the common through shafts 90 and 12 and 22.

Each of the two drive connections for E has three conditions, clutched in and unbraked, braked and unclutched and unclutched and unbraked. In contrast, the one drive to B has two conditions or is reversibly driven in one direction or the other at all times.

As noted above, when two tapes or the like are used, the thicknesses of the tapes and similarly, the thicknesses of the stored bills will cause a progressively increasing difference in the tensions between the inner and outer tapes as the storage increases on the storage reel 57. Means are provided in manufacture or at the factory to solve this problem by providing correspondingly different speeds for the two tapes such as by the difference in starting diameters of between 60 and 61, a differential or by other arrangements which will be now obvious to those skilled in this art. It is to be noted that since in normal use the storage reel 57 is always rolled up with substantially uniformly spaced bills between its tape turns, that the bill thicknesses will act, in effect, like an increase in the tape thicknesses and that a single means may be provided to maintain the desired tight flexible confinement or the always substantially equal tensions between the two tapes. However, the bill thicknesses act only in the storing reel to provide an undesirable progressively increasing looseness or decrease in the flexibly confining bill moving engagement which is important here. Accordingly, another variation can provide additional means for this bill thickness problem such as a looseness in the factory fastening of tape 56 at its two ends and the coiling of this outer tape 56 on its unstoring reel 59 relative to the corresponding fastening and coiling of the inner tape 55 on its unstoring reel 58 to thus provide the desired extra space for the stored bills as the tapes wind on to storage reel 57.

HANDLING

Cords as roll-up elements—Modification

FIGURE 4A shows a variation or possible modification wherein the tapes or strips of the other figures may be replaced by other forms of elongated flexible means to be rolled up in a spiral such as feed cord or the like $55_1$ of FIGURE 4A. Here it is preferred to provide a pair of such cords $55_1$ to correspond to each paper strip. Where such cords or the like are used it is preferred that the engagement rollers 62 and 64 be suitably grooved as indicated at $62a_1$ to provide trasverse locating and guidance of these cords. FIGURE 4A is otherwise intended to be the same as the structure shown in FIGURE 4 so that neither its elements (which carry the same numbers with the subscript 1) nor its similar operation need be further described.

HANDLING

Separate clutch units and brake units for E—Modification

FIGURES 10 and 11 show another modification of the currency handling portions for one denomination unit and with part of the common drive. The structure here is intended to be the same as that shown in FIGURES 2 to 9 inclusive except as otherwise noted so that corresponding elements carry the same reference numerals with the subscript 2. In this modification, the preferred and combined clutch-brake units of the other forms hereof are replaced by separate and conventional clutch units and brake units. This requiring more shaft length or a greater width for each denomination unit, but employs readily commercially available or standard brake units and clutch units. In certain applications or arrangements, these separate brakes and clutches for E permit more flexibility in design or in operations. This replacement is indicated by the clutch $73'a_2$ for the shaft $90_2$ and located at one of its ends and the brake $73'b_2$ at the other end of the reel $57_2$ and acting to brake it. Shaft $12_2$ has the separate and conventional clutch $73a_2$. The braking function that would be performed by the combined clutch-brake 73 of FIGURE 4 is here given by conventional brake unit $73b_2$, as shown in FIGURE 11 on the lower but gear connected shaft $22_2$. The operation of this form of the invention (as shown in these FIGURES 10 and 11) is otherwise the same as that described in FIGURES 1 to 9 since the solenoid coils for the separate clutches and brakes are electrically hooked up like the coils in FIGURE 8.

HANDLING

*Separable gear pairs—First form of removable cartridge units*

FIGURES 12, 13 and 14 show another modification generally applicable to any of the forms or application of this invention wherein each of the several one denomination, paper money handling units are in a first form of removable cartridge or magazine units (retaining the operating general row arrangement and common drive of FIGURE 3) to thereby achieve the above discussed advantages of reducing the danger from theft by being able to place such paper money holding cartridge units in a safe depository at the end of the working day or one or more at a time during a working day in a store or the like when each cartridge unit becomes filled as indicated by the replenishment needed, signal means (as hereinafter described in connection with electrical control means).

It may also be noted that another advantageous feature or use for any of the removable magazine or cartridge type forms of this invention is provided by the ability to rapidly replace any jammed, maladjusted, defective or otherwise inoperative denomination unit without waiting for a service man with the resulting time loss during a busy working day in a store or other station for money handling transactions.

In this modification, the several individual elements, as well as their general interrelationships and their operation, are the same as in the above described FIGURES 1 to 9 except for the differences noted for this modification. Accordingly, the several elements carry reference numerals similar to those of FIGURES 1 to 9 plus the subscript 3. In order to avoid repetition these similar elements and their similar operation are not again described except as to the different features or operation of this magazine type modification.

In this first removable cartridge form, the marked advantages of the above discussed common drive and its interrelated common control circuitry are retained by having the required two different drives for the two drive directions (with their important differences in linear speeds between feeding and storing to give bill separation during both receiving and dispensing) are achieved by detachably intermeshing or unmeshing a pair of conventional gear (with one preferably recessed in the suitably slotted cartridge and the other forming part of the common drive) for each of the three drive connections for the two ends of the tapes of E and for the reversible drive from the reversing clutches directly to B.

FIGURES 5 or 8 should be compared with FIGURE 13 of this modification. It will be noted that the separable pair of gears $30_3$ and $28a_3$ provides for the removability permitting unclutching of the dispensing direction drive connection to the removable cartridge contained, rolling up storage reels $58_3$ and $59_3$ of means E.

The second disconnectable drive connection (or that for the receiving or storing action or direction of drive of the spiral tapes) is shown in FIGURE 14, which should be compared with FIGURE 9. In FIGURE 14, detachably meshed gears 105 and 106 (not having counterparts in FIGURE 9) provide for the removability permitting, disconnection of the receiving or storing direction drive, gear $30_3$ in the removable unit is not exposed but is reached through slot 129 to mesh with projecting gear $28a_3$. Slot 130 similarly gives access to gear 106 to mesh with 105.

The third disconnectable drive connection for the feed means B is provided by a similar set of three gears such as 173 fixed on shaft $12_3$ ahead of clutch-brake $73_3$, 174 which is free on shaft $22_3$ as indicated by its legend and is reached through slot 177, and 175 which is free on shaft $12_3$ but fixed to $8_3$ to drive it in both directions as by being on a common hub $8_3$. Accordingly, this drive connection does not affect reels $58_3$ or $59_3$. In contrast to FIGURES 2 to 9, the lower (and here smaller) feed roller $18_3$ is not directly gear driven but here is frictionally driven from the larger $8_3$ to increase the linear feed speed.

While such removability permitting, disconnectable gears or the like may be used in various relationships or arrangements and in combination with other desirable features of this invention, the presently preferred and illustrated arrangement provides for the common drive train being in a compact and simple form (like that of FIGURE 3) but underneath (or similarly on top of) the driven cartridges for the several denominations which are arranged side-by-side in a row (like FIGURE 3). Thus, common drive shafts $12_3$ and $90_3$ extend across the width of the row of cartridge units and are separately connected to each cartridge unit by the above noted separable gear pairs and with the dispensing and receiving operations of FIGURES 13 and 14 being controlled for each cartridge unit by their respective combined clutch-brake units $73_3$ and $73'_3$ all substantially as described above in connection with FIGURES 2 to 9 inclusive.

During the storing direction of drive, the brake at $73_3$ of FIGURE 13 is released and its clutch is also inactive due to nonenergization of their respective coils so that gears $28a_3$, $30_3$ and $28_3$ are free to turn. Gear $28_3$ is fixed to shaft $12'_3$ as by its key as shown, reel $58_3$ is fixed to this same shaft as by its key as shown, while the larger feed roller $8_3$ is also free on this same shaft, as noted above. The lower unrolling reel $59_3$ is fixed to the lower shaft $22'_3$ as by its key as shown while the lower (and, here, smaller diameter) feed roller $18_3$ is free to turn on the shaft $22'_3$ as indicated by its legend. As indicated $8_3$ and $18_3$ are suitably restrained against axial motion on this shaft by conventional means. Gear $30_3$ is also keyed to shaft $22'_3$.

Thus, in the storing direction of drive, with gears $28_3$ and $30_3$ and their connected elements free to turn as aforesaid, the clutch of $73'_3$ of FIGURE 14 is actuated to connect to the common drive shaft $40_3$ and drives the storing reel $57_3$ in its storing direction. Reel $57_3$, through tension in the flexible tapes, will drive $58_3$ and $59_3$ of FIGURE 13.

For dispensing, $51_3$–$44_3$ are shifted and $73_3$ is clutched on to drive gears $28a_3$, $30_3$ and $28_3$ and have connected reels $58_3$ and $59_3$.

It will be seen that each removable cartridge unit $M_3$ in the row received in the common housing or slide drawer $3_3$ is slidably guided and indexed into correspondingly shaped and sized recesses each designated as a whole by 132 in $3_3$ to thereby locate or index the separably meshed gears.

It will be understood that additional locking means or the like to replaceably retain these removable units $M_3$ may be provided to supplement the only frictional holding contemplated by the present drawings.

Partition walls $89_3$ and $88_3$ have the ledge or shelf forming projections 126 and 127 respectively to receive the bottom 132 of each preferably rectangular container or cartridge unit $M_3$. These units $M_3$ have tops 133, sides 134 and 135 and backs 137. The fronts 138 (which may be exposed at a suitable side face of the entire unit $3_3$ for easy access to the clerk or else for access by the customer) have bill slots 140 providing receiving stations for the paying in and the dispensing out of bills, preferably one at a time. These relatively narrow slots facilitate or encourage the insertion of bills only one at a time. The slots 140 are matched with, and feed directly into, the narrow space between guides like 10 and 17 of FIGURE 6 or else on to a shorter length of full width guide platform like 16 of FIGURE 6.

With slots 140 in units $M_3$, the front or active side of the outer or main casing such as $3_3$ should be open or else having matching slots such as 140'.

It is to be understood that the receiving stations A in the other forms of this invention may have such receiving stations. It will also be understood that the preferably rectangular boxlike units $M_3$ are to be made with conventional or suitable provisions for opening them up for access, repair and the like. It will be apparent that the operation of this modified form will be otherwise similar to that described above.

In many uses of removable cartridges under this invention, for example, where the nearly filled cartridge for bills of a given denomination is removed and sent as is to a bank or to a bookkeeping center (where it is inserted and hooked into the common drive and control system of another system made according to this invention) to dispense its bills, it is desirable to have each such cartridges carry a tamper-proof and always accurate (add and subtract or running balance type) record of the number of bills therein. While this may be in lieu of, it can also be in addition to, the hereinafter disclosed (see description of electrical controls) adding and subtracting counters forming part of the common or master control system for the several denominations of bills.

Accordingly, each of the several different forms of removable cartridge units of this invention are disclosed as including such a reversible counting means which is visible at least upon removal of the cartridge unit, and preferably, while it is in normal use in the whole system. To this end, a suitable or known type of selectively reversible electromagnetic counter unit, $Dr_3$, showing visible numerals for the recorded number at its outer end, is mounted in each cartridge unit to be visible through a hole or window through the most readily observed side of the cartridge. Where needed, corresponding openings or windows are provided in the most readily observed side of the main case $3_3$.

Thus, $D_3$ supplies only the detecting function while the electrically connected $Dr_3$ supplies an always observable count for each removable cartridge.

HANDLING

*Removal common shafts or separable magnetic clutches—Second form of removable cartridge units*

FIGURES 15, 16 and 17 show another of the numerous forms of commonly driven, removable cartridge units that are possible under this disclosure. In this form, the removable cartridge units are each disconnectably connected into the required two different and common drives (that is the drive in one direction for receiving and a separate drive in the other direction for dispensing, both as discussed above in connection with FIGURE 14) by the provision of separable drive parts in the magnetic clutches for each of these two drives. More particularly, the combined clutch-brake units $73_4$ and $73'_4$ (which are identical with 73 and 73' as described above and hence need not further be described) are formed in two parts with their main body portions suitably attached to the main casing designated as a whole by $3_4$ while only their clutch and brake armatures $75_4$ and $77_4$ are suitably mounted on the cartridge units to be removed therewith.

Preferably, but not necessarily, in this type of removable cartridge, the several cartridges in the row (See FIGURE 3) are all lined up and more closely indexed (together with their internal elements) by the two removable or common shafts $90a_4$ and $12a_4$ extending through the plurality of these cartridge units $M_4$ and through at least their rotary storage means E and their rotary feed means B to also align these internal rotary elements and to stiffen and strengthen them and the entire assembly.

As shown in these FIGURES 15, 16 and 17, each removable cartridge or magazine unit $M_4$ comprises a suitable and preferably, generally rectangular casing having the top $133_4$, sides $134_4$ and $135_4$, the bottom $132_4$, the front $138_4$ and the rear $137_4$. The front of each has the receiving station providing an entry or exit slot $140_4$ which is like 140 of FIGURE 12 and is similarly operably associated with, and leads matchingly and directly into the space between upper and lower, fixed guides like 10 and 17 of FIGURE 6, or else onto a shorter guide platform like 16 of FIGURE 6. The front $3f_4$ has matched openings therethrough (not shown here) to permit access to these entry slots.

The observance of each unit's count indicator $Dr_4$ (which is like $Dr_3$ as described in connection with FIGURES 12, 13 and 14 and is similarly actuated by the detector $D_4$, which is like the above described D) is provided for by matched openings 155' through a suitable wall of the common housing $3_4$ or through its top, as shown.

One side wall $135_4$ of each unit is inwardly recessed, as shown at $135_4$ in FIGURES 16 and 17 to provide for the countersunk and protected mounting of the hereinafter described clutch and brake armatures rotatably carried by unit $M_4$. The outer surfaces extending beyond the wall $135_4$ are shown by $88a_4$ and $89a_4$.

The main casing, such as the slide drawer unit or main casing designated as a whole by $3_4$ has a row of adjacent but spaced apart, recesses each designated as a whole by $132_4$, formed to engagably fit and hold the row of removable cartridge units $M_4$ and to locate and index their clutch and brake armatures $77_4$ and $75_4$ into the correct or aligned positions for coacting with the combined clutch-brake units $73_4$ and $73'_4$ (which are like the above described 73 and 73'). This important alignment of the operative parts of each clutch-brake unit is facilitated by the through or common shafts $90a_4$ and $12a_4$ which will force the desired alignment and, also, provides a locking of all of the units in place. It is to be understood that other suitable or conventional locking means for the several removable units may be provided.

The recesses $132_4$ of $3_4$ comprise the bottom wall $3d_4$, rear wall $88a_4$ (which may be like wall $88a$ of FIGURE 3 with the motor and the control circuit mounted behind it as indicated in FIGURE 3). The main casing $3_4$ also has a front wall $3f_4$ having entry and dispensing slots therein to match slots $140_4$. The sides $88_4$ and $89a_4$ of recesses $132_4$ engagingly fit the cartridge units $M_4$ but have openings such as 161' and 162' therethrough for the removable shafts and similar openings through $135_4$. Side wall $89a_4$ for the top and bottom of cartridge unit M is offset from the side wall $89_4$. Unit $3_4$ has an otherwise closed top, as shown. This top (or other suitable wall of unit $3_4$) is intended to be made removable in conventional fashion to permit access to all internal operating parts.

Like FIGURE 3, the chamber to the right in FIGURES 16 and 17 and between walls $89_4$ and $3s_4$, contains the common drive shaft $40_4$ with its two beveled gear drives as shown in FIGURES 16 and 17.

The clutch-brake units $73_4$ and $73'_4$ are like 73 and 73' as described above and are similarly nonrotatably mounted on the adjacent wall $89_4$. However, in this case, their clutch armatures and their brake armatures are not directly connected to their main body portions but are removably carried on the cartridge units $M_4$ by means such as the embracing bracket-like clips 178 of FIGURE 16 and 179 of FIGURE 17. These retaining clips permit rotation of the outer brake armatures $77_4$ but prevent outward axial movement thereof and hold it onto the side of $M_4$ in position to be indexed to the main body of the clutch-brake unit for normal operation. It will be understood that the thus held outer brake armature will, in turn, axially locate and retain the inner, clutch armature $75_4$ by the flange teeth $77b$, as shown and described in connection with FIGURES 7 and 7A.

Except for shafts $12a_4$ and $90a_4$, there are no shaft or like connections between the main body units of $73_4$ or $73'_4$ and their clutch and brake armatures, since they are separably connected for driving engagement or braking by the above described magnetically caused engagements and may, if desired, be further indexed into the correct axial positions by the above noted removable shafts.

As best shown in FIGURES 7 and 7A, the inner, clutch armatures $75_4$ of $73_4$ and $73'_4$ are similarly splined to their respective inner hubs $74_4$ to transmit rotation but permit axial sliding of $75_4$ limited by the adjacent wall and by the clips 178 and 179 acting through the outer brake armatures $77_4$ as described above. In FIGURE 17 this rotor $74_4$ is suitably connected to or, as shown, integral with the sleeve forming fixed hub for the reel $57_4$. This sleeve $74_4$ is suitably journaled in the walls $134_4$ and $135_4$, as shown. Preferably the full length splined, removable, common shaft $90a_4$ is freely rotatable in the sleeve $74_4$ (FIGURE 17) so that each reel $57_4$ is driven only by its associated clutch armature and held only by its associated brake armature or armatures.

The corresponding arrangement of FIGURE 16 is generally similar since the hub for $74_4$ of $73_4$ is here nonrotatably connected and forms a unit with the integral hub of gear $28_4$ and the integral center or hub of reel $58_4$. This connection is here shown as being by the axially extending pin $12'_4$ connecting these three hubs into a unit.

It will be noted that the arrangement of FIGURE 16 differs somewhat from that of the preceding figures since there is not only the one gear set but the upper, unrolling reel $58_4$ is between the driving end gear $28_4$ and the feed roller $8_4$ at the other end. As shown, reel $58_4$ is axially spaced from feed roller $8_4$ by the spacer 135 which is freely rotatable on the spline shaft. Feed roller $8_4$ has the internal splines 136 meshing with the splines of shaft $12a_4$ (so that it is driven thereby) while the other side of this reel is spaced from the casing end wall by spacing 136', which is freely rotatable on the spline shaft.

As shown, each unit $M_4$ has its own individual, short length, lower shaft $22'_4$ which is suitably journaled in its side walls as shown and is not splined or normally removable from its cartridge unit upon the removal of this cartridge unit. Neither spool or reel $59_4$ nor the lower gear $30_4$ are rotatably secured to the shaft $22'_4$. They are both freely rotatable on this shaft $22'_4$ and have their integral hubs nonrotatably secured together as by the pin 139'. Feed roller $18_4$ is axially spaced from reel $59_4$ by the spacer sleeve 138', which is freely rotatable on shaft $22'_4$. Feed roller $18_4$ is freely rotatable on shaft $22'_4$ since it is driven in either direction only by its frictional engagement with feed roller $8_4$ (through the flexible members and the bills). The other end of side of feed roller $18_4$ is axially spaced from the casing side wall $134_4$ by the spacer sleeve 141', which is freely rotatable on shaft $22'_4$. It will be understood that the other removable cartridges of the row (part of the drive to an adjacent one being indicated in FIGURES 16 and 17) are constructed in like fashion.

The money handling operation of these $M_4$ cartridge units is generally like the operation as described for FIGURES 12, 13 and 14 since the flexible tapes supply the drive from one to the other of the rotary storing means E and the rotary feeding means B and since the bill separation action in both directions of operation is provided by the difference in coil diameter between the storage roll 57 and coil diameter or effective diameters of the unrolling rolls 58 and 59, this action being in combination with the difference in diameters between feed rollers $8_4$ and $18_4$ ($8_4$ being of larger diameter) as described above for FIGURES 12 to 14. Without repeating the entire operation which is described above, it may be noted that the linear mechanical feeding speed is determined by the surface speed of the larger diameter and upper feed roller $8_4$ in either direction of bill travel, as is also true in FIGURES 12, 13 and 14. Further, here gears $28_4$–$30_4$ drive the unrolling or lower reel $59_4$ but not the smaller diameter and lower feeding roll $18_4$ (which is driven only by friction as noted above). In general, the other comments made with respect to the advantages and features of the FIGURES 12, 13 and 14 also apply to this form of FIGURES 15, 16 and 17. Here also the unequal gear ratios at $93_4$–$94_4$ as compared to $36_4$–$34_4$ help produce the bills separating speed difference.

It is to be noted here that only 84 is splined to the removable and common spline shaft $12a_4$ inside of $M_4$ while the inner rotor 85 of $73_4$ is also splined to this removable shaft $12a_4$ which ends as shown adjacent to the short shaft $12_4$ connecting 85 and gear $34_4$. In like manner $90a_4$ and $74_4$ is free on $57_4$ but splined to 85 of $73'_4$ as shown by its legend in FIGURE 17.

HANDLING

*Stacked or interconnected, parallel shafts arrangement and third form of removable cartridge units*

FIGURES 19 and 20 illustrate a modification teaching another one of the possible arrangements of adjacent, interconnecting commonly driven units each for the handling of one denominataion of paper money according to this invention and differing from the general arrangement of FIGURE 3 primarily by the fact that the axes or shafts for the rotary feed means and for the rotary bill storing means of each denomination unit are not coaxial or formed by unitary or through shafts but, in contrast, the axes for the several units are in parallel relation and with another form of common drive interconnecting them to drive each of them in the two directions and at the different speeds as described above. This modification of FIGURES 19 and 20 also teaches another form of the numerous types of removable cartridge units or the like possible under this invention.

In many of the different possible applications of this invention such as in automatic vending machines, floor space, counter area or the like is at a premium and it will be highly desirable to arrange the commonly driven, denomination units of this invention (whether individually removable or not) in a vertical array, stack or the like to thus best utilize such floor area. In such cases, it may be undesirable to have shafts like 12 and 90 of FIGURE 3 extending vertically. Further, there may be other reasons making it desirable to use interconnected parallel shafts as described above. For such purposes, the present stack or parallel shaft arrangement is provided.

Further, it will be apparent that the present modification teaches another form and arrangement of movable cartridge units under this invention which will be superior to the above described removable forms in certain applications.

Common casing or housing $3_5$ of FIGURES 19 and 20 may, if desired, be used remote from its change due computing and indicating means H or remote from the cash register such as 1 of FIGURE 2. In this case, the required electrical control is intended to be supplied by a suitable cable (like 2 with 2b of FIGURE 1) to the common control circuit to control the common drive with its interrelated electromechanical parts, all as described above and hence not further illustrated or described here.

As shown, the upper common chamber to the right of casing $3_5$ in FIGURE 19 contains the control system and other parts of FIGURES 1, 2 and 3 not illustrated here as well as the common drive including the illustrated common motor $41_5$, the drive shaft $40_5$, the bevel gears $94_5$ and $93_5$ driving the storing direction drive shaft $90_5$ (and also acting through the reversing clutches $44_5$ to drive the dispensing direction, drive shaft $12_5$). It may be noted that the arrangement of the motor $41_5$ and its drive connections is, for convenience, slightly different and more direct in this modification.

The plurality (here for $1, $5, $10 and $20 bills only as disclosed for convenience in all forms in this invention) of removable cartridge type slide drawer units $M_5$ are vertically stacked, each as an individual slide drawer which can be readily disconnected electrically and mechanically to permit it to be slid out from the front $3f$ of the common casing for removal, inspection and repair or for other purposes. It is to be noted that here as well as in all of the other removable cartridge forms disclosed under this invention, suitable or well known forms of readily removable electrical connections (such, for example, as the multi prong, male and female, electrical plug $2b$ of FIGURE 2) may provide for the convenient and, in fact, automatic disconnection or reconnection of the required electrical circuits upon the removal or reinsertion of each cartridge unit. Since this will be quite obvious to those skilled in this art, it is not further illustrated or described.

Along side of the upright common, common drive chamber designated as a whole by $149'$ in FIGURES 19 and 20 there is the upright wall $89_5$ extending from the top wall $138_5$ down to the bottom of $3_5$ and forming one side of an inner upwardly extending common chamber $151'$ containing the inner connecting drive such as the chain 142. The other side of $151'$ is defined by wall $153'$ extending from top to bottom of this common casing.

For the dispensing or unstoring drive to each denomination unit, each such unit M5 has suitably aligned short drive shaft $12'_5$ with reduced ends as shown suitably journaled and axially retained in the two walls $153'$ and $89_5$ by conventional means not shown here since it will be well understood from the foregoing disclosure and by those skilled in this art. Each such shaft $12'_5$ fixedly carries suitable positive driving or gear-like means such as the sprocket 141. In this connection it is to be noted that the several shafts $12'_5$ (and similarly for the corresponding shafts $90_5$ for the storing drive) may be interconnected and provided with a common drive from lower drive shaft such as $90_5$ by a stack of gears as well as by the illustrated chain 142 since either will provide positive or nonslip common drive trains as needed here.

Each short shaft $12'_5$ (fixedly carrying a sprocket 141) also extends into units $73_5$ as its input, it being noted that unit $73_5$ and the non-illustrated unit $73'_5$ (for the drive from chain 147 through each of the vertical stack of sprockets 146 from input shaft $90_5$) are all similar or identical in construction and function to like parts $73_4$ and $73'_4$ described above so that they need not be further described in detail here.

Thus, the clutch armature $75_5$ and the outer brake armature $77_5$ for each said unit $73_5$ and $73'_5$ are removably related to their associated clutch-brake units and are also rotatably held in place on the cartridge units $M_5$ in the same fashion as illustrated and described for FIGURES 15, 16 and 17. Accordingly, each removably disconnectable such drive or braking is transmitted to the hub for $74_5$ which is pinned to the hubs of gear $28_5$ and reel $58_5$, all as disclosed in more detail in FIGURE 16. The balance of the structure shown in FIGURE 20 and including the feed rollers $8_5$ and $18_5$, is also the same as described above for FIGURE 16. However, in this case the always visible reversible bill count indicator $Dr_5$ for each unit $M_5$ is located to the side $134_5$ of each unit $M_5$ as shown. The visible numerals at the outer end of $Dr_5$ are matched up with openings $157'$ in the side wall $3s_5$ of the common housing $3_5$ so that the count for each denomination of bills is visible during their normal operation in $3_5$ as well as while they are removed. As noted above, the operation chain 147 and its associated elements is otherwise essentially the same as described for the operation of FIGURES 15, 16 and 17, so that this need not be further described here.

*Electrical controlling and its operation, with mechanical interrelationships.—General*

Figure 18B:
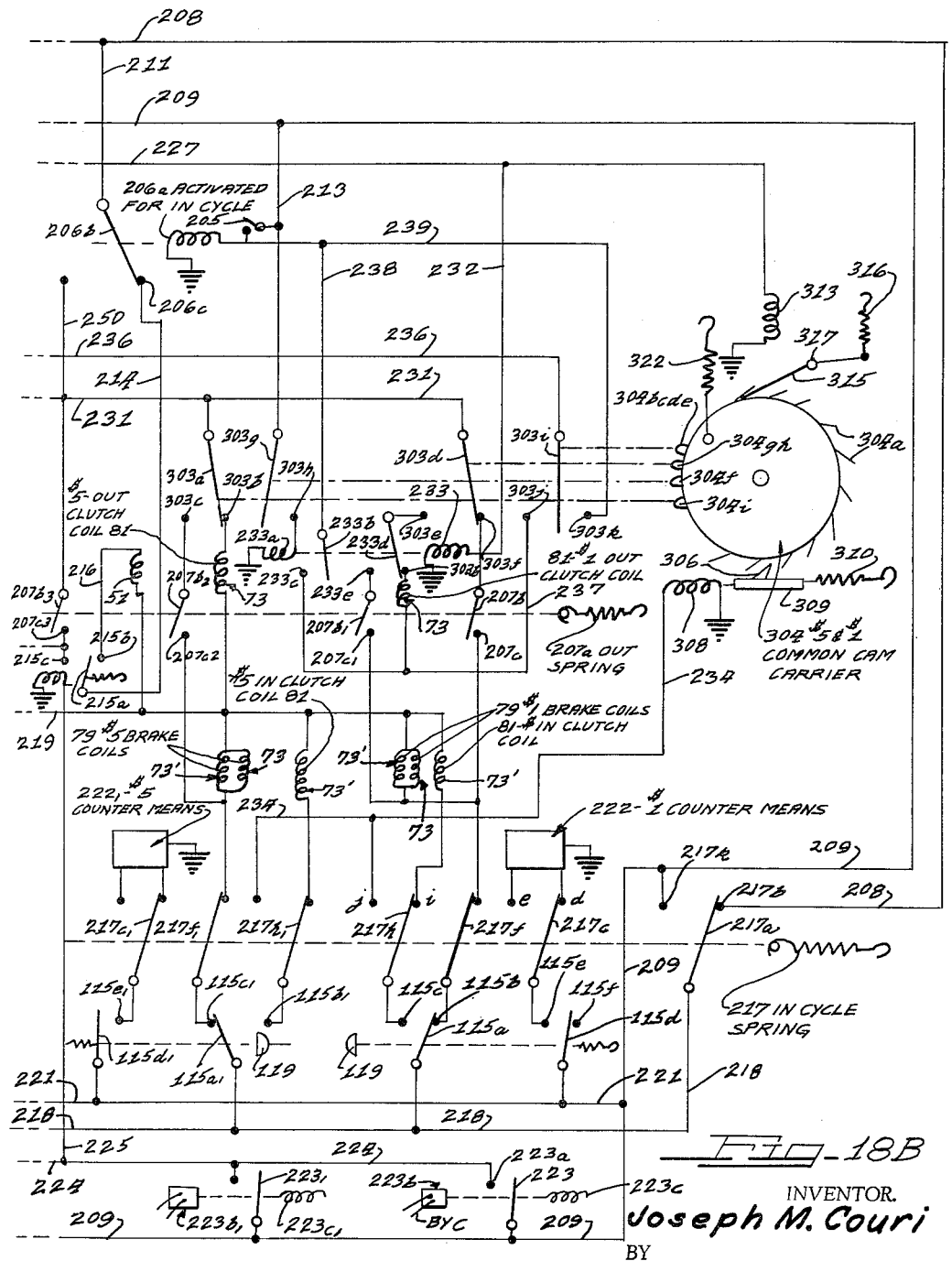

Turning now to the common and usually nonremovable electrical control circuit or system, its associated electromechanical elements (including those in the several denomination units and whose actions have been generally described and to the related operations, attention is directed to FIGURES 18A and 18B (to be treated as one and together schematically showing the general control circuit G) and also to interrelated FIGURES 21, 22, 23 and 24 which also relate to the controlling are to be considered here but which are impractical to include in FIGURES 18A and 18B.

While the illustrated and here described, specific control circuit of FIGURES 18A and 18B and its related figures, teach a preferred and novel controlling method and apparatus under this invention yet it is to be understood that many of the benefits of this invention may be retained with other or different types of controlling operations and apparatus providing generally functionally similar operations or even different operations in some instances. Accordingly, it is desired that this disclosure be considered as exemplary and as broadly embracing other types of controlling, such as by solid state devices and their circuitry or by other known types.

Referring particularly to the circuit and the electromechanical interconnections of FIGURES 18A and 18B (which circuit is intended to be considered as also operably connected into each of the several modifications of the invention as disclosed herein) the common power supply lines $L_1$ and $L_2$ for any available power, such as conventional 110 volt A.C., have a master switch means, schematically indicated by 201, to control in on-off fashion the energization of the above noted, common drive motor 41, which may be of any suitable type. Switch means 201 also controls the on-off energization of the entire control circuit of FIGURES 18A and 18B, here designated as a whole by 200, as well as the operation of its interconnected electromechanical parts as shown in the other figures hereof.

For convenience, the electrical circuit elements as well as the previously undesignated electromechanical parts are all designated by numbers in the 200 and 300 series. It will also be noted that while the following description refers only to the reference numerals for FIGURES 1 to 9 inclusive, yet the interrelations and operations described here apply with equal facility to each of the other modifications of this invention.

Generally and in most applications of this invention, it is desired to have master switch means 201 in its on condition, with motor 41 continuously running and with the controls conditioned to continuously drive rotary feed means B of each denomination unit in its receiving or storing direction (except for brief intervals for dispensing or for rejection). Since, in some applications, there may be appreciable idle periods during which it is unnecessary or undesirable to run motor 41 and to energize the circuit 200, means 201 includes a suitable or known time delay shutoff means to open this switch automatically at the end of a predetermined time period. Switch means 201 also is suitably connected and includes means so that it is switched back to its on position automatically upon any use of the cash register 1 or the like. Both of these functions are indicated by the legend for 201 and will be well understood by those skilled in this art from this brief reference to known arrangements.

As discussed above, it is desirable to have the separate and independently controlled brakes acting on each end of the spirally coiled tape or the preferred two tapes (such as tapes 55 and 56 with the brakes of 73 and $73'$ acting at each end of each) in cooperation with the clutches acting at each end of each tape or so controlled that as the leading end clutch (for either storing or dispensing) goes off then at least (for all spiral tape forms of this invention) the trailing end brake goes on to prevent loosening, overrun and the like. However, in the illustrated embodiments of this invention this objective is best obtained by having the two brakes for the leading, as well as the trailing end, go on together or simultaneously for the reasons as explained above in connection with the simultaneous reversal by 44–51. This is shown in circuit 200 by the brake coils 79 of both 73 and 73' being connected in parallel to be energized together. This arrangement simplifies the circuitry and controls.

CONTROLLING

Imput (replenishing or storage) cycle operation and details

Upon the closing of on-off switch 201 of FIGURES 18A and 18B the following actions take place:

(1) A suitably lowered control voltage, such as 24 v. A.C. flows from transformer 204, through line 209, through line 212, through switch assembly 206e and 206f (This DPDT latching type relay switch has been preset to the imput cycle position by service personnel who install the entire mechanism. This is accomplished by momentarily closing switch 205. Thereafter the electrical circuits will automatically shift the DPDT switches 206e and 206b from their imput to their output positions and vice versa.), through line 210 and through relay coil 207 activating it and thereby causing the seven PST ganged switches 207b, 207b$_1$, 207b$_2$, 207b$_3$, 207b$_4$, 207b$_5$, and 207b$_6$ to open their respective circuits. These seven open circuits are for the purpose of preventing a feed back between the imput circuits and the output circuits.

(2) The common motor 41 starts, thus driving its gear train (41, 43, 42, 40 to 94, 93, 90). However, all of the storing means E (57) remain motionless because;

(3) Simultaneously, through fuse 202, a suitably reduced unidirectional voltage (such as 90 v. D.C.) flows from resistance 203' of rectifier 203, (and through rectifier 203a on return), through line 208, through switch assembly 217b and 217a, through line 218, through switch assembly 115a and 115b (since these actions are the same in all four storage sections or units, only the $1 unit is described), through switch assembly 217f and 217g through the coils 79 for the two $1 electromagnetic brakes of 73 and 73' (activating both of them) through line 219, to return circuit line 220. The activation of the $1 brake coils applies both brakes and stops and holds motionless all the spools in the $1 denomination section. (These actions are the same for each of the $5, $10 and $20 sections.)

(4) Simultaneously, 90 v. D.C. flows from rectifier 203, through line 208, through line 211, through switch assembly 206b and 206c, through line 214, through switch assembly 215a and 215b, through line 216, through the common drive entry clutch coil 44 (activating it), through line 219, to return circuit line 220. Clutch 44 being activated starts the chain of feeding action (see the foregoing description of the mechanical HANDLING) which rotates the upper and lower pairs of feed rollers in all four denominational valued units. This rotation is clockwise for upper feed roller 8 in FIGURE 6 and counterclockwise for lower feed roller 18 in FIGURE 6.

With all storing means E (all four storage spools 57) held braked or motionless and with all four feed means B (all four pairs of feed rollers 8–18) in feeding motion, the entire system is now ready for its further input or storage actions.

(5) If needed, the operator can now proceed to load the four denominational valued storage sections. To illustrate: The operator may insert a $1 currency bill into and between the rotating upper and lower feed rollers 8 and 18 of the $1 section. The feed rollers then grip and advances this currency bill toward the interior. As the currency bill advances, its leading edge encounters lower end 118a, the swinging gate or arm 118 of detector D (FIGURE 6) and causes it to swing in an arc (about its pivot 118b) so that 118a then rests on, and slides along over, the top of the advancing bill.

The often wrinkled and flimsy bill A' being advanced by B is guided, flattened, held from swerving or in a straight path, and (particularly here) is effectively stiffened or braced at its leading edge by the (alongside B) guiding confinement of the smooth and suitably close together upper and lower fixed guides 10 and 17, which extend alongside B from (or slightly before or in front of the engagement point of feed rollers 8 and 18 as shown in FIGURE 6) to a point at or slightly inward from the start of the storing engagement and its flexible confinement between tapes 55 and 56 at pinch rollers 62 and 64. This effective stiffening of the leading edge of the bill by this guiding confinement is important with a mechanical edge detector and particularly a simple swinging arm type as disclosed and makes practical such mechanical detection of normal used paper money.

The flat cam or plate 119, which is suitably attached to the swinging gate or lever 118 of detector D, also pivots about 118b and in doing so, one end or the other of its flat surface 120 swings the upper end of the second or compounded lever 117a (in the same direction for stored or dispensed bills) about its lower pivot in clamp or clip 117. This in turn depresses the plunger pin 116 (located relatively close to pivot 117) which in turn alters the switching arrangement within the conventional microswitch unit 115. It will be noted that levers 118 and 117a provide a mechanical advantage increasing compound lever system through cam means 119–120 to decrease the force needed at detecting end 118a (or to increase the sensitivity). Thus, the advancing bill A' is little impeded (and even if flimsy is not wrinkled or crumpled due to this low engaging force and to its stiffening confinement) and acts to lift 118a to slide over the advancing bill. The action is the same in the other direction.

The suitable and conventional mircoswitch in the switch unit 115 is spring loaded so that its double poles maintain a normally closed position for one pair of terminals and a normally opened position for the other pair of its terminals. Such a double pole arrangement is shown for each section of FIGURES 18A and 18B. One of the normally closed terminals, 115f, is left vacant, so this DPDT type of microswitch as actually used in circuit 200 becomes a combination SPST (115d–115e) and SPDT (115a–115b–115c). The resulting two circuit actions are as follows:

(a) SPDT switch 115a breaks contact with the normally closed terminal 115b (and its accompanying $1 brake coils 79 for 73 and 73') and makes contact with the normally open terminal 115c. 90 v. D.C. now flows through switch assembly 115a and 115c, through switch assembly 217h and 217i through $1 storage clutch coil (81 of 73' activating 57 in its storage direction) and then through 219 to return circuit line 220.

The other sections or units are similarly actuated. The mechanical handling of the engaged bill and its flexible confinement as it is storingly engaged, have been noted above. This storing rotation of storage spool 57 spirally coils the two ribbons or tapes 55 and 56 (and the paper currency held or sandwiched between them) into a double turn, spirally coil storage arrangement on this storage spool 57.

As noted above, these double turns will give a difference in tension and a looseness in one tape tending to release the flexible and money holding confinement inward from 62–64 unless means such as a conventional differential gear (or equal pull-unequal travel permitting) drive to 59 and 58 from 73 or the above mentioned larger reel starting diameter of 61 are provided.

When the bill has advanced its length towards and into the flexible confinement of the two storage tapes inward from 62–64, its retreating edge releases the pivoted swinging gate D and attached cam 119, which are then free to be returned to their vertical position by the dual purpose, biasing spring. This in turn allows the spring loaded miscroswitch 115a to break contact with the $1 storage clutch circuit 115c and to remake contact with

41 the $1 breaking circuit 115b. Thus, the storage section again is motionless but remains poised to absorb the next bill (to be inserted into the entry rotating feed rollers) into storage. This imput action can be either continuous until the storage spool has reached its storage capacity (as determined by the length of the storage ribbons 55 and 56, FIGURES 2 and 6) or can be intermittenly and randomly interrupted by any required dispensing cycles..

(b) SPST switch 115d makes contact with 115e allowing 24 v. A.C. to flow from transformer 204 through line 209, through line 221, through switch assembly 115d and 115e, through switch assembly 217c and 217d, through the adding coils of the electromagnetic adding and subtracting number counter 222 and back to the transformer's secondary terminal. The activated coil of this counter 222 cocks the number wheel's advancing mechanism and advances the first number wheel 1/10 of a revolution. The numeral one appears in the viewing window of the number counter. In this manner the number counter keeps a running inventory of all the bills placed into storage or dispensed from storage since the counter's substracting coil is activated on the dispensing cycle. A description of the dispensing action is given in detail later.

After the currency bill has entered into storage and has released the swinging gate D, the biased or spring loaded microswitch 115d returns to off position. The 24 v. A.C. ceases to flow through the adding coil of counter 222 and the number wheel's advancing mechanism (being also spring loaded) returns to an uncocked position, ready for recocking by the next impulse.

CONTROLLING

*Rejection phase of imput cycle*

(5a) Again considering that the operator is proceeding to load the four denominational storage sections. To illustrate: The operator inserts a $1 bill into the narrow double belt conveyor 9 and 19 of FIGURE 2, which are driven by feed rollers 8 and 18 in an imput direction. The narrow double conveyor belt arrangement (or just rollers 8 and 18) engages and feeds the bill toward the interior alongside of and past the verifying means C (which, as noted above, may include a denominational identifying section, a thickness gauging section and others) to verify desired properties of the bill. If approved, the bill proceeds into the interior for storage as described above in section 5 of the imput cycle.

If the bill was counterfeit, of the wrong denomination (for that particular storage section), two bills clinging together and mistakenly inserted as one bill, or otherwise objectionable, detector means C notes the abnormal situation and closes switch 223 of circuit 200. Each such switch 223 is normally held open as by spring 223c and is moved to its closed position as by a solenoid 223b suitably controlled by C as noted by its legend. 24 v. A.C. then flows from transformer 204 through line 209, through switch assembly 223 and 223a, through line 224, through line 225, through relay switch coil 215, activating it, and then back to transformer 204. The activated coil 215 throws the SPDT switch 215a from contact 215b to 215c, thus shifting the 90 v. D.C. current flow from the common drive, entry clutch 44, FIGURE 4, to the common drive, exit clutch 51, causing a reversal in the rotation of the gear 35, shaft 12, feed rollers 8 and 18 and conveyor belts 9 and 19. This reversal of the rollers 8 and 18 (and belts 9 and 19 when used) reverses the bill's travel, so that the bill is ejected from the mechanism before it has even contacted the swinging gate detector D of FIGURE 6. This prevents the chain of storage action, as described in section 5 of the imput cycle. It will be noted that C preferably is located to act on a bill while its leading end is engaged (and being fed) by B

42 whether B consists of just rollers or includes belts or the like. Further, C need not be alongside of B if no belts are used in B since C can then extend across the entire bill width. In any case, C need not "see" the entire length of the bill simultaneously, but successively examines successive parts of its length. Further, if needed, provision may be made for the bill to pause under C and also for C to examine all of the bill at once, all as will be well understood as to such verifying detectors by those skilled in this or related arts.

CONTROLLING

*Intermediate action, between cycles*

As described for the imput cycle, the status of the entire mechanism is still one of readiness for the imput cycle.

The storage spools are all motionless but the feed rollers are rotating in an imput cycle, poised for placing currency into storage. The change over from the imput cycle to the output cycle may be considered as preceded by the following example transaction in a supermarket application of this invention. A customer brings her purchases to the checkout counter. The clerk or operator totalizes her purchases, which amount to $16.20. The customer pays with a $20 bill. The clerk enters this $20 amount into the keyboard of the change due computing type of cash register 1. The register's mechanism subtracts $16.20 from $20.00 and then discloses visually (in the viewing window) to the clerk and customer and mechanically and electrically (via gears 4 and 5 of FIGURES 21 and 22 and by electrical switching assembly 303 of circuit 200 to the control section G of the dispensing mechanism) that the change due is $3.80. The coin dispenser part of conventional B, G, ejects to 80¢.

The $3 change due data is forwarded to the currency dispenser as follows. The change value disclosing segment gear 4 of FIGURES 2, 21 and 22 (4 being a last stage gear in the register's disclosing mechanism) turns until the $3 valued gear tooth is in the disclosing position, and in so doing rotates the intermediate gear 5 (gear 5 transmits the mechanical action of gear sector 4 from the crowded interior of the register to the exterior where the remote part 6 of the currency control G can be conveniently installed on 1. Gear 5 turns segment gear 302 and its attached switch assembly 303 until the switch assembly 303 assumes a $3 valued position in relation to the $5 and $1 common cam carrier 304 of FIGURES 18A, 18B, 21 and 22. As the "Change Due" mechanism within the register completes its mechanical chain of action and becomes motionless, the momentary impulse type of switch 226 of circuit 200 is momentarily closed and the reset chain of action commences. This momentary actuation of 226 is shown by its legend in FIGURE 18A.

CONTROLLING

*Imput to output reset action*

The following six-fold reset action (in readiness for the dispensing cycle) takes place as the momentary impulse type of switch 226 makes contact with 226a:

(1) 24 v. A.C. flows from transformer 204, through the momentarily closed switch assembly 226 and 226a, through line 227, through electromagnetic coil 313, activating it and causes pawl 315 of FIGURES 18 and 21 to disenage momentarily from the ratchet teeth on the $5 and $1 common cam carrier 304. Cam carrier 304 (being spring loaded by spring 322) returns to its starting position resting against pin 311 of FIGURE 21. Pawl 315 (being spring loaded) reengages with the ratchet teeth when 24 v. A.C. current ceases to flow to coil 313.

(2) 24 v. A.C. flows from transformer through the momentarily closed switch 226–226a, through line 228, through coil $313_1$ of circuit 200, activating it and resetting the $20 and $10 common cam carrier $304_1$ to its starting position against its stop pin $311_1$ (there refer also to FIGURE 21).

(3) 24 v. A.C. flows through momentarily closed switch 226–226a, through line 227, through the relay coil 206 activating it and causing the DPDT switches 206e and 206b to shift from their imput cycle position to their output cycle position after which they remain latched in that position after the momentary 24 v. impulse ceases to flow through coil 206.

(4) The closed switch 206e–206g permits 24 volts A.C. to flow through line 229 through relay coil 217m activating it and causing the 9PDT and the 4PST switches to assume their dispensing cycle contact positions. In so doing, switch 217a breaks with the 217b contact and halts the flow of the 90 v. D.C. to the two electromagnetic brakes of each section via the circuits for the microswitches 115. Switch 217a making contact with its 217k permits 24 v. A.C. to flow from the transformer 204 through line 209, through closed switch 217k–217a, through line 218 to the four pairs of microswitches, 115a and 115d, $115a_1$ and $115a_2$ and $115d_2$ and $115a_3$ and $115d_3$. The four switches 115d, $115d_1$, $115d_2$ and $115d_3$ are in an off position, so there is no current flow to the four number counters 222, $222_1$, $222_2$ and $222_3$.

Switches 115a, $115a_1$, $115a_2$ and $115a_3$ are in contact with their contact points 115b, $115b_1$, $115b_2$ and $115b_3$, but switches 217f, $217f_1$, $217f_2$ and $217f_3$ are held in an off position by coil 217m and so no current flows to the brakes.

Thus, the 24 v. A.C., leading to these switching assemblies, is inactive but is ready for the action to be described shortly.

(5) Switch 206e breaks contact with its contact 206f in line 210 for relay coil 207. Coil 207 deactivates the spring loaded 7PST switch as of assembly 207b, $207b_1$, $207b_2$, $207b_3$, $207b_4$, $207b_5$ and $207b_6$ so that they make contact with their respective contact points and sub circuits and permit the two brakes (which had been deactivated in section 4 when switch 217a broke contact with its 217b contact) to be reactivated with no appreciable or effective loss of braking action. Now the various mechanism in the control section have been reset to a dispensing cycle status.

(6) 24 v. A.C. flowing momentarily through switch 226–226a through line 227, through line 232 and through relay coil 233 activates it and resets and latches the switches 233b and 233d into their dispensing cycle positions.

CONTROLLING

Dispensing action 90 v. D.C. from rectifier flows through line 208, through line 211, through closed switch 206b and 206d, through line 250 and from there dividing into the following five simultaneous circuits.

(1) 90 v. D.C. flows to and through the $20 switching assembly 303 $d_1$ and $303f_1$ (which are in the off position, due to the fact that the register has disclosed $3 as the change due and so the $20 and $10 switch assembly $303_1$ is in its zero position relative to its common cam carrier $304_1$), through switch assembly $207b_6$ and $207c_6$ through the $20 brake coils, activating them and maintaining the motionless status of the $20 section, then through line 219 to return circuit line 220.

(2) 90 v. D.C. flows through closed switch assembly $303a_1$ and $303c_1$ (off position) through closed switch $207b_4$ and $207c_4$, through the $10 brake coils, activating them and maintaining the motionless status of the $10 section, then through line 219 to return circuit line 220.

(3) 90 v. D.C. flows through the closed switch assembly $207b_3$ and $207c_3$, and through the common drive exit or dispensing clutch 51 activating it and then through line 219 and to the return circuit line 220. The activated clutch 51 causes all the feed rollers 8 and 18, in all four denominational valued sections of FIGURE 3 to rotate in their dispensing cycle directions. Thus, all four sections or units are ready for ejecting to the exterior any section's bills that have been set into motion by the cash register disclosing means 4 or via the switching mechanism shown in FIGURES 21 and 22.

(4) 90 v. D.C. flows through the closed switch assembly 303a and 303c (off position), through closed switch assembly $207b_2$ and $207c_2$ through the $5 brake coils activating them and then through line 219 to return circuit line 220. The activated $5 brakes maintain the motionless status of the $5 section.

(5) 90 v. D.C. flows through the closed switch assembly 303d and 303e (on position), through switch assembly 233d and 233f, through the $1 dispensing clutch 73 activating it and causing E of the $1 section to rotate in its dispensing direction. As the spool 58 of FIGURE 6, rotates counterclockwise and the spool 59 rotates clockwise in FIGURE 6, the ribbons 55 and 56 wind upon spools 58 and 59 and in so doing unwind from spool 57. The paper currency bills which have been sandwiches in spaced apart single file between ribbons 55 and 56 and stored in spiral storage upon spool 57, emerge from coiled storage and approaches the swinging gate of detector D and while in motion toward the exterior, swings the arm 118 of detector D and its attached cam 119. The cam swings lever arm 117a in FIGURE 6 and causes the DP switches 115a and 115d of circuit 200 to shift from their normal closed circuits to their normally open circuits. This permits the following two simultaneous electrical actions for controlled dispensing.

CONTROLLING

Dispensing (by single bills)

When cam 119 trips the microswitch 115 of FIGURE 6:

(1) Switch 115a makes contact with 115c, 24 v. A.C. flows from the transformer 204, through line 209, through closed switch assembly 217a and 217k, through line 218, through switch assembly 115a and 115c through closed switch assembly 217h and 217j through line 234, through the cam carrier's advancing coil 308 of circuit 200 and FIGURE 21 to activate it, causing the advancing mechanism 305, 306, 309 and 310 of 200 and FIGURES 21 and 22 to cock, ready for cam carrier advancing action.

As soon as the emerging paper bill has disengaged from the swinging arm detector D of FIGURE 6, causing the microswitch to return to its normally closed circuit 115a and 115b and current ceases to activate coil 308, the tension of spring 310 (FIGURES 18A, 18B, 21 and 22) will return the cocked mechanism to its original position and in so doing, spring 307 will cause tooth catcher 306 to engage in the ratchet teeth of cam carrier 304. This advances the cam carrier 304 one numerically valued position away from stop pin 311 and toward the preset switch assembly 303. Switch asembly 303 has previously been positioned in the $3 demanding cam position by 6 or the cash register gear mechanism 4 and 5. Stop pin 312 is so positioned in relation to the advancing tooth catcher 306 that as soon as the cam carrier 304 has advanced one numerical position, tooth catcher 306 would collide with the stop pin 312, causing 306 to swing on its axis 318 and thus disengage from the ratchet teeth of cam carrier 304 after it has advanced one numerical position. The new position alignment is cam carrier 304's number 2 valued position ($3—$1=$2) aligned with switch assembly 303. Pawl 315 prevents cam carrier 304 from undesired retrogression.

While the storage spools 57, 58 and 59 and ribbons 55 and 56 of FIGURE 6 are still in dispensing rotation, a second $1 bill emerges from storage and moves toward the exterior and repeats the above cycle. As a result, the cam carrier 304 advances another number position away from the stop pin 311 (FIGURE 21) and toward the switch assembly 303. Now the "1" numerical value position ($2—$1=$1) of cam carrier 204 is aligned with switch assembly 303. The spools and tapes still rotating, carry another $1 bill toward the exterior, thus the cycle repeats and a third time the cam carrier 304 advances toward the preset switch assembly 303. Now the zero valued cam position ($1—$1=0) is aligned with the switch assembly 303 and the cam in that position causes switch 303d (of FIGURES 18A', 18B and 22) to break from the $1 clutch circuit contact 303e and to make with $1 brake circuit contact 303f.

Instantly the clutch disengages and the brakes are applied, halting the issuance of any more $1 bills because the preset requirement of the register (the $3 change due demand and presetting of switch assembly 303 to the 3 valued numerical position relative to the cam carrier 304) has been fulfilled by the cam carrier's three separate advancements toward the switch assembly 303. Each advancement has been clocked off after each $1 bill emerges from storage.

(2) Switch 115d makes contact with 115e, 24 v. A.C. flows through the closed contacts 115d and 115e and through switch assembly 217c and 217e (the minus position), through the subtracting coil of the adding and subtracting type number counter 222 activating it and causing the inventory recorded in the viewing window to be lessened by one. Thus, as each individual bill emerges from storage the microswitch 115d momentarily contacts 115e and an electrical impulse activates the subtracting coil so that a running inventory is maintained on the bills still in storage.

This dispensing cycle as described for the one dollar section is essentially the same for the other three denominational valued sections, with only minor variations as shown by the following four tables.

*Table I*

DISPENSING CYCLE

[Odd Number Change Due Phase (Counts By Two's)]

| Change Due Demand | Countdown Movement of Cam Carrier 304₁ | Quantity and Denomination of Currency Issued | | $20 Circuits | | $10 Circuits | |
|---|---|---|---|---|---|---|---|
| | | $20 | $10 | Clutch | Brakes | Clutch | Brakes |
| $90 | 90—80 | 1-$20 | | On | Off | Off | On |
| $70 | 70—60 | 1-$20 | | On | Off | Off | On |
| $50 | 50—40 | 1-$20 | | On | Off | Off | On |
| $30 | 30—20 | 1-$20 | | On | Off | Off | On |
| $10 | 10 | "Off" | 1-$10 | Off | On | On | Off |
| $00 | 00 | "Off" | "Off" | Off | On | Off | On |

*Table Ia*

DISPENSING CYCLE

[Even Number Change Due Phase (Counts By Two's)]

| Change Due Demand | Countdown Movement of Cam Carrier 304₁ | Quantity and Denomination of Currency Issued | | $20 Circuits | | $10 Circuits | |
|---|---|---|---|---|---|---|---|
| | | $20 | $10 | Clutch | Brakes | Clutch | Brakes |
| $80 | 90—80 | 1-$20 | | On | Off | Off | On |
| $60 | 70—60 | 1-$20 | | On | Off | Off | On |
| $40 | 50—40 | 1-$20 | | On | Off | Off | On |
| $20 | 30—20 | 1-$20 | | On | Off | Off | On |
| $00 | 10—00 | "Off" | | Off | On | Off | On |

Table II
DISPENSING CYCLE
[Under $10 and Over $4 Phase (Counts By Ones)]

| Change Due Demand | Countdown Movement of Cam Carrier 304 | Quantity and Denomination of Currency Issued | | $5 Circuits | | $1 Circuits | |
|---|---|---|---|---|---|---|---|
| | | $5 | $1 | Clutch | Brakes | Clutch | Brakes |
| $9 | 9 | | 1-$1 | Off | On | On | Off |
| $8 | 8 | | 1-$1 | Off | On | On | Off |
| $7 | 7 | | 1-$1 | Off | On | On | Off |
| $6 | 6 | | 1-$1 | Off | On | On | Off |
| $5 | 5 | 1-$5 | "Off" | On | Off | Off | On |
| | 4 | "Off" | "Off" | Off | On | Off | On |
| | 3 | | | | | | |
| | 2 | | | | | | |
| | 1 | | | | | | |
| | 0 | | | | | | |

Table IIa
DISPENSING CYCLE
[$4 and Under Phase (Counts by Ones)]

| Change Due Demand | Countdown Movement of Cam Carrier 304 | Quantity and Denomination of Currency Issued | | $5 Circuits | | $1 Circuits | |
|---|---|---|---|---|---|---|---|
| | | $5 | $1 | Clutch | Brakes | Clutch | Brakes |
| | 9 | | | | | | |
| | 8 | | | | | | |
| | 7 | | | | | | |
| | 6 | | | | | | |
| | 5 | | | | | | |
| $4 | 4 | | 1-$1 | Off | On | On | Off |
| $3 | 3 | | 1-$1 | Off | On | On | Off |
| $2 | 2 | | 1-$1 | Off | On | On | Off |
| $1 | 1 | | 1-$1 | Off | On | On | Off |
| $0 | 0 | | "Off" | Off | On | Off | On |

These four tables give a visual picture of the dispensing transaction for all four dispensing sections and also serve as a very concise summary of the description of all the actions of this mechanism. The following gives one specific example of how to use these tables:

Assuming the change due data forwarded by the register is $70 (this is an odd number and it falls under the Odd Number operational phase of Table I) switch assembly $303_1$ (of FIGURES 21 and 22 and Table I) aligns with the 70 position on the cam carrier $304_1$. Then, as the countdown proceeds, the cam carrier $304_1$ moves two numerical positions at a time and momentarily pauses at each position during which pause a $20 bill is dispensed.

So we would read on Table I as follows:

For change due of $70, control switch $303_1$ cam carrier $304_1$ align together in the $70 position and commence dispensing a first $20 bill, cam carrier counts down two positions (70—20=50); another $20 is issued and then the cam carrier counts down two more positions (50—20=30); another $20 is issued and the cam carrier counts down two more positions (30—20=10). At this position the cams turn off the switches for the $20 dispensing circuits and turn the switches on for the $10 dispensing circuit. A $10 bill is issued and the cam carrier counts down to zero and the off position for both the $10 and $20 circuits (10—10=0). Thus, the $70 change due demand of the register has been fulfilled by the three separate $20 bill issuances and the one $10 bill issuance for a total of $70.

Any intermediate change due demand, such as $36, would read on the $30 of Table I and the $6 of Table II combined.

CONTROLLING

Cam carriers

The $5 and $1 single or common cam carrier 304 (of FIGURES 18A, 18B, 21 and 22 and Table II and Table IIa) control the issuance of both the $5 bills and the $1 bills. In counting off the bills as they are issued, the carrier 304 advances only one numerical valued cam position at a time relative to the preset demand switch assembly 303.

The $20 and $10 common cam carrier $304_1$ is essentially the same as 304 in FIGURES 21 and 22 and so is not shown in detail. The difference lies in the number of cams and location of the cams on the cam carrier. FIGURE 23 gives details for the cam positions and switching actions for both the $20 and $10 common cam carrier $304_1$ and for the $5 and $1 common cam carrier 304 and its cams and switches.

The major difference between the two cam carrier assemblies is that the $5 and $1 common cam carrier's advancing mechanism 306 and its stop pin 312 are so located as to advance the cam carrier 304 only one numerical position at a time, as previously described. In contrast the advancing mechanism of the $20 and $10 common cam carrier $304_1$ is adjusted to advance the cam carrier $304_1$ two numerical positions at a time and it has two different phases of operation. For example:

(a) For an odd number in the amount of change due (such as $90) the position change of carrier $304_1$ is by two numerical positions, as shown in Table I by its $90 to $70 to $50 to $30 to $10 (off for the $20 dispensing unit and on for the $10 dispensing unit) to $00 and off for both the $20 and $10 dispensing units.

(b) For an even number in the amount of change due (such as $80) the $20 and $10 common cam carrier $304_1$ position (Table Ia) relative to its switch assembly $303_1$ will change by two numerical positions as follows: $80 to $60 to $40 to $20 to $00 and off for the $20 dispensing mechanism.

It is believed that the foregoing description of the operation of cam carrier 304 of FIGURES 21 and 22 (designated as a whole by G and by 6 as in FIGURE 2) will also supply an adequate description of the relationship of the parts in these figures. It may be noted that the lowermost switch 303i of FIGURE 22 has a neutral position between two different closed positions in contrast to the balance of these switches.

CONTROLLING

$5 and $1 dispensing variations—prevention of undesired $1 issuance

The dispensing action for all four denominations sections is essentially the same as previously described for the $1 section with only one minor variation for the $1 and $10 circuits. The $1 section has two dispensing cycles (Tables II and IIa). The first is for change due under $5 (previously described) while the second is for change due over $5. As examples, $6 is a $1 bill plus a $5 bill; $7 is two $1 bills plus a $5 bill; $8 is three $1 bills plus a $5 bill, and $9 is four $1 bills plus a $5 bill.

This minor variation is the need to prevent the undesired issuance of four more $1 bills (due to the $4, $3, $2 and $1 cam positions of 304) after the cam carrier 304 and switch assembly 303 have already permitted the issuance of the desired number of $1 bills for the $9, $8, $7 or $6 change due. This prevention of undesired issuance is accomplished by cam 304f (of FIGURES 21 and 22) and by switch 303g and latching type relay switch assemblies 233, 233a, 233b and 233d. The preventive action is as follows:

Assume $7 as the change due date. Switch assembly 303 is aligned with the "seven" numerical value position relative to cam carrier 304 (FIGURE 21 and Table II). As the first $1 bill is dispensed, the cam carrier 304 counts down one position ($7—$1=$6) and the "six" numerical value position aligns with the switch assembly 303. As the second $1 bill is dispensed the cam carrier 304 counts down one more position ($6—$1=$5) and now the "five" numerical value position aligns with the switch assembly 303. The cam alignment and switching action is threefold and is (as shown in FIGURE 23) as follows:

(a) The $5 clutch circuit is activated by cam 304i and switch 303a and a $5 bill begins its journey the exterior, meanwhile.

(b) The negative cam position for 304gh (FIGURE 21) breaks contact with the $1 clutch circuit and makes contact with the $1 brakes circuit halting any further issuance of $1 bills.

(c) Cam 304f allows switch 303g to make contact with 303h. 24 v. A.C. flows through the closed switch 303g through relay coil 233a activating it and causing the DP switches 233b and 233d to make contact with points 233c and 233e, respectively.

Thus, switch 233d has realigned from the $1 clutch circuits to the $1 brake circuit while exiting $5 bill was being counted off. The cam carrier 304 stops its count-off movement with its "four" numerical position now in alignment with switch assembly 303. The cam and switch action in this position is fourfold (FIGURE 23) and is as follows:

(1) The $5 clutch is disengaged and the $5 brakes are applied because cam 304i causes switch 303a to break contact with 303b ($5 clutch circuit) and to make contact with 303c ($5 brake circuit).

(2) Cam 304f breaks contact between switch 303g and its contact 303h, but switch assembly 233, 233a, 233b and 233d (being a latching type relay) remains in its "$5 and over" position for the prevention of any undesired issuance of $1 bills (this prevention is accomplished by the switch 233d being in contact with the $1 brakes circuit 233e) which would have taken place because:

(3) Cam 304h now permits switch 303d to break with the $1 brakes circuit 303f and make contact with contact 303e (original clutch circuit, but now, due to switch 233d as in section 2 above) making contact with 233e which provides an alternate path to the $1 brake so that all undesired dispensing of $1 bills is prevented.

(4) Cam $304c$ (200 and FIGURE 21) causes the switch $303i$ to leave its neutral position and make contact with $303j$ (which is an "after the completion of the dispensing of $5 to $9 inclusive" circuit for resetting for dispensing cycle to imput cycle).

CONTROLLING

$20 and $10 dispensing variations prevention of undesired $10 issuance

The $20 and $10 control mechanism and circuits must meet the following requirements:

(a) Odd number change due demand of either $90, $70, $50, $30 or $10 (Table I).

(b) Even number change due demand of either $80, $60, $40 or $20. (Table Ia).

(c) The prevention of the undesired issuance of a $10 bill during the even number phase of operation (obviously a $10 bill is not necesary for either a $80 (four twenties), a $60 (three twenties), a $40 (two twenties) or a $20 (one twenty) change due demand). Although there is no scheduled interaction for the $10 cam and its SPDT switch $303a_1$ (200 and Table Ia) a momentary $10 cam action does take place as the cam carrier $304_1$ counts down from its $20 cam position to the $00 cam position. As the cam carrier flashes past the switch assembly $303_1$, the intervening $10 cam $304i_1$ momentarily closes the $10 control switch $303a_1$. This is undesirable, could cause complications and should be prevented (but in such a manner as to not conflict with the issuance of a $10 bill when required during the odd number change due phase of operation).

This prevention is accomplished as follows: Assume that $40 is the change due demanded. As previously described, this change due demand causes the cam carrier $304_1$ (FIGURES 18, 21, 22 and Table Ia) to align its "forty" value cam position with the switch assembly $303_1$. Cam $304j_1$ causes switch $303l_1$ to close with contact $303m_1$. 24 v. A.C. flows through the closed switch and activates the relay coil 241 which causes bistable switch $241a$ to shift from the $10 clutch circuit's contact $241c$ and close with the $10 brake circuits contact $241b$. Thus, the electrical switches and circuits are set up for no $10 bill dispensing even through the $10 cam, $304i_1$, momentarily closes the $10 operating switch $303a_1$ in the brief interval during which the cam carrier counts down from the 20 to 0 position (10 is the intervening cam position).

CONTROLLING

Antiprevention switching system

This $10 prevention switching system requires an antiprevention switching system so that when a $10 bill is needed for issuance (as during the odd number charge due phase of operation, Table I) it will not be prevented by the even number cams, as just described.

This antiprevention switching system action is as follows:

Assume the change due demand is $30. The cam carrier $304_1$ aligns its thirty value cam position with the switch assembly $303_1$, cam $304f_1$ closes switch $303g_1$ with contact $303h_1$, 24 v. A.C. flows through to relay coil 240, activating it and causes bistable switch $240a$ to break contact with its contact $240b$ and assume an off position, thus cutting off the 24 v. current source necessary for the $10 prevention switching system. This system is thus neutralized.

CONTROLLING

Output (dispensing) to imput, reset action

Closing switches $303i$ and $303j$ (as described in the immediately previous section 4 of PREVENTION OF UNDESIRED $1 ISSUANCE) permits 24 v. A.C. curruent to flow from transformer 204 through line 299, through switch assembly $206e$ and $206g$, through line 229, through line 230, through switch assembly $303i_1$ and $303j_1$, which are in the on position because cam carrier $304_1$ and switch assembly $303_1$ are in a zero position relative to each other. This relative zero position could be the result of a $7 change requirement (for a zero demand on the second decimal position to the left) or it could be the result of the completion of the issuance of any currency demanded of this second decimal position. For example, if the change due called for $37 and the one $20 and the one $10 bill had been dispensed, the cam carrier $304_1$ would have counted off their departures and would have ended in a zero position relative to its switch asembly $303_1$. Also cam $304i_1$ would have closed completion switch $303i_1$ with $303j_1$, through line 236, through switch assembly $303i$ and $303j$, through line 237, through switch assembly $233c$ and $233b$, through line 238, through latching type relay coil $206a$ to activate it and throwing DPDT switches $206b$ and $206e$ to their imput positions. They ($206b$ and $206e$) will remain latched in their imput positions even after current ceases to flow through coil $206a$ since switch $206e$ has broken contact with its $206g$ and interrupts the current flow.

This electrical action for imput cycle resetting can follow a second path. This path is used after completion of the dispensing issuance under $5. In this event, cam $304e$, causes switch $303i$ to make contact with $303k$. The 24 v. A.C. now flows through line 239 and through coil $206a$ activating it and causing the resetting of the switches $206b$ and $206e$ to their imput cycle positions.

Thus, after the completion of the dispensing of the desired quantities and denominations of currency (as demanded by H) the electrical control system automatically shifts from its dispensing cycle or phase condition to its replenishing cycle phase or condition.

The system is now ready to receive the currency bill or bills (with which the customer has paid the clerk) into the proper denominational valued storage sections.

It is to be remembered that this particular system and control circuit permits either a continuous series of imput actions, a continuous series of dispensing actions (until the currency supply is exhausted) or an intermittent and alternating series of imput an dispensing actions or an intermittent and random series of imput and dispensing actions.

CONTROLLING

Auxiliary requirements

In many applications, it is desirable or even a highly essential convenience for the operators using the system to provide for the following three auxiliary requirements:

(1) Means giving a perpetual inventory for each storage section.

(2) Means to detect when the amount of currency in storage has reached either a present maximum level or a preset minimum level.

(3) Means to alert the operator when:

(A) the maximum level has been reached and it is essential that:

(a) the clerk ceases to feed more currency into that particular denominational storage unit because it has reached its maximum capacity and will absorb no more bills into storage.

(b) the clerk removes the maximum loaded currency magazine or cartridge (several varieties of which are shown herein) and replaces it with a cartridge which is partly loaded (sufficiently loaded so that dispensing can proceed, but sufficiently depleted so that more bills of that denomination can be taken into its storage). In this manner a reserve supply of fully loaded currency storage cartridges can be accumulated and held in reserve for for future use when needed.

(B) the minimum level has been reached and it is essential that the operator replenishes the currency supply under the following two conditions:

(a) Minimum time delay in replenishment— The clerk could instantaneously replenish the currency supply by removing the depleted currency storage cartridge and replacing it with a fully loaded cartridge from reserve storage (just described in section 3, sub section A, sub-sub section *b*).

(b) When time is not critical as to replenishment, the clerk can proceed to directly replenish the depleted currency storage cartridge by inserting the required denomination of currency bills, singly, one at a time in between the rotating feed rollers (input cycle) until the cartridge is fully loaded or sufficiently loaded for dispensing usage.

Space is often at a premium in systems under this invention and it is also important to keep costs down to a minimum. To conserve space and limit costs, a single compact means is provided to achieve the various auxiliary requirements just listed. Such a single means may be either a mechanically actuated or an electromagnetically actuated bidirectional or reversible number counter of any suitable conventional type. Such counters are well known. Such a two way counter is necessary for the perpetual inventory. Each decimal or 10 place counter, gear, rotor or the like of each such counter should be suitably connected to drive a similar ten position switch arm such as 330 of FIGURE 24. This rather schematic view shows only one such arm and its legend indicates its drive to move it over the decimal contacts 331 of one such gear unit. Such a switching counter can then be read electrically (in addition to the visual readability of 222 of which this unit forms a part as shown.) These ten position switches such as 331 can then be connected to suitable circuits for a preset control, as schematically indicated in FIGURE 24, when the number counter of 222 indicates that 8 currency bills are in storage, the arm 330 aligns with the 8 position switch contact of 331. As shown when any number above 7 is so read electrically, then 24 volt current will flow to the suitable warning signal such as the coil of buzzer 334 to thus indicate by an audible warning to the operator that a maximum safe number of bills has been reached for the corresponding unit. Here it is intended that instead of 7, the actual number might be 47 for a 50 bill capacity or the like, the reading of 331 being on the highest value counter wheel or gear. Contacts 331 show a similar arrangement for the minimum safe number of bills in a given unit and actuate a similar buzzer 334'. It is to be understood that 331' is to be related to the lowest value counter wheel or gear. It will be apparent that suitable remote such signals including an indicator for each unit may be readily provided.

CONCLUSION

It is intended that the various specific mechanical and electrical elements and particular arrangements shown herein be considered as exemplary. It is also to be understood that they may be modified or changed within the spirit or teachings hereof. Similarly, it is intended that various useful combinations or subcombinations hereof may be employed for like or related purposes under these teachings, all as will be apparent to those skilled in this or related arts. Accordingly, all such variations as are within the spirit and scope hereof, and as defined in the appended claims, are intended to be considered as part of this invention.

I claim as my invention:

1. In combination,
   (a) reversible rotary means to move successive currency bills into and out of storage,
   (b) adjacent, moving means to cooperate therewith to separate such successive bills to prevent overlapping thereof at least while they are being mechanically moved towards storage, and
   (c) means to separately control and actuate said first two means.

2. In combination,
   (a) reversible means including at least one spirally coiled, elongated flexible member to move a succession of currency bills into and out of spiral storage, and
   (b) adjacent cooperating, reversibly rotating means to feed and to mechanically separate such bills in cooperation with said first reversible means at least while they are being mechanically moved towards storage.

3. In combination,
   (a) reversible means including at least one spirally coiled, elongated flexible member to move a succession of currency bills into and out of spiral storage therein,
   (b) a reversibly rotatable driving means for each end of said elongated member,
   (c) electrically controlled clutch means for each such driving means,
   (d) a drive common to said two driving means, and
   (e) common means electrically selectively controlling said two clutch means to mechanically drive said flexible member in tension from only one end thereof from said common drive.

4. In combination,
   (a) reversible means including at least one spirally coiled, elongated flexible member to move a succession of currency bills into and out of spiral storage therein,
   (b) a reversibly rotatable driving means for each end of said elongated member,
   (c) electrically controlled clutching and braking means for each such driving means,
   (d) a drive common to said two driving means, and
   (e) common means electrically and selectively controlling said two clutch means to mechanically drive said flexible member in tension from only one end thereof by clutching said end to said common drive while electrically controlling to brake at least the other end thereof upon the release of said clutching.

5. In a device for the handling and storing of currency bills,
   (a) at least one reversibly movable, elongated flexible member spirally coiled at one end to movably store currency bills,
   (b) rotary driving means to move said member in tension from its storing end at a certain speed, and
   (c) rotary driving means to reversibly move said member in tension from its opposite end at a different speed.

6. In a device for the handling and storing of currency bills,
   (a) at least one reversibly movable, elongated flexible member spirally coiled at one end to movably store currency bills,
   (b) associated means to move bills to or from said elongated member at a certain speed,
   (c) driving means to move said member in tension from one end at a speed materially higher than said certain speed, and
   (d) driving means to move said member in tension from its other end at a speed materially lower than said certain speed.

7. A device for the integrated controlling and reversible handling in receiving or dispensing of preselected numbers of different denominations of currency bills comprising
   (a) a unit for handling each denomination of bills used
   (b) said units being adjacent with each such unit including
   (c) a low inertia, rapidly accelerated rotary means to move a controlled succession of bills to and from storage and (d) having two different drive connections, each including electrically actuated clutch means close to each said rotary means to reduce its inertia to drive it in its two directions and (e) an adjacent cooperating but independently operable, reversible rotary bill feeding means having at least one drive connection including electrical actuated reversing clutch means common to all of said units but close to them to reduce its inertia to drive said feeding means in either direction, (f) a common electrical control for all of said electrically actuated clutch means and (g) a common drive for and extending to all of said drive connections to drive them selectively independently under said common control.

8. A device for the integrated controlling and reversible handling in receiving or dispensing of preselected numbers of different denominations of currency bills comprising (a) a unit for handling each denomination of bills used (b) said units being adjacent with each such unit including (c) a rotary means to move a controlled succession of bills to and from storage and (d) having two different drive connections each including electrically actuated clutch means to drive it in its two directions and (e) an adjacent cooperating but independently operable, reversible rotary bill feeding means having at least one drive connection including electrical actuatable means to drive it in either direction, (f) a common electrical control including means responsive to bills moved by each feeding means for all of said electrically actuated means, and (g) a common drive for all of said drive connections including only one unidirectional electric motor, (h) said two different drive connections of said rotary means being parallel but spaced apart with one of them coaxial and on a common shaft with said rotary bill feeding means to provide a simpler and more compact device.

9. A device for the reversible handling in receiving or dispensing of preselected number of different denominations of currency bills comprising (a) a unit for handling each denomination of bills used, (b) said units being adjacent in a line with each such unit including (c) a rotary means to move a succession of bills to and from storage and (d) having two different drive connections each including clutch means to drive it in its two directions and (e) an adjacent cooperating but independently operable, reversible rotary bill feeding means having to drive it in either direction and (f) a common drive for all of said drive connections comprising only two drive trains each extending across said line of units.

10. The combination of claim 9 in which said line is a row of removable such units with their rotary axes in line and wherein said drive trains include continuous parallel shafts extending across and alongside of said row and parallel to said rotary axes of said units.

11. The combination of claim 9 in which said line is a stack, said units have their rotary axes parallel but spaced, and said drive trains include gear-like members interconnected alongside of said stack.

12. The combination of claim 9 in which said drive trains include continuous shafts extending through said units.

13. The combination of claim 9 in which said units are removable and said drive trains include removable shafts extending through said units.

14. In combination, (a) reversible means including at least one spirally coiled, elongated flexible member to move a succession of currency bills into and out of spiral storage therein, (b) a reversibly rotatable driving means for each end of said elongated member (c) a combined electromagnetic clutch and brake unit having inner and outer concentric solenoid coils and inner and outer clutch and brake armatures to conserve axial space and for compactness for each such driving means, (d) a drive common to said two driving means and (e) common means electrically and selectively controlling said two magnetic clutches of said combined units to mechanically drive said flexible member in tension from only one end thereof from said common drive and electrically controlling said magnetic brakes of said combined units to brake at least the then trailing end of said elongated member when it is not being driven.

15. A combined electromagnetic clutch and brake unit comprising (a) a clutch armature, (b) a brake armature, (c) a casing enclosing (d) a rotary motion transmitting means, (e) concentric inner and outer clutch and brake solenoid coils respectively actuating (f) said clutch and brake armatures which are nonrotatably and axially slidably interconnected.

16. A combined electromagnetic clutch and brake unit comprising (a) an outer annular and axially movable brake armature having an outer brake coil to actuate it (b) a concentric inner and axially movable clutch armature having an inner clutch coil to actuate it, (c) an innermost rotor, (d) said rotor and clutch armature having axial motion permitting but rotation preventing splines therebetween and (e) said clutch armature and said brake armature having axial motion permitting but rotation preventing splines therebetween with said splines on one being extended alongside the other to axially retain it.

17. In combination, (a) reversible means including at least one spirally coiled, elongated flexible member to move a succession of currency bills into and out of spiral storage therein, (b) a reversibly rotatable driving means for each end of said elongated member, (c) separate electromagnetic clutches and electromagnetic brakes for each such driving means, (d) a drive common to said two driving means and (e) common means electrically and selectively controlling said two magnetic clutches to mechanically drive said flexible member in tension from said common drive and electrically controlling said magnetic brakes for braking when said flexible member is not driven.

18. A paper currency handling device comprising in combination, (a) a common and normally nonremovable drive including a plurality of removability permitting readily separable drive connections each having a generally nonremovable drive modifying means, (b) a common control for the receiving and dispensing of different amounts of currency by selectively actuating said different drive modifying means, and (c) a plurality of readily removable magazine units each for a different denomination of bills and each comprising (d) a bill storing spiral of at least one, elongated flexible member with
(e) rotary means at each end to drive it in tension in one of its two directions from one of said separable drive connections under said common control of its drive modifying means for each end thereof,
(f) each removable magazine unit also including adjacent moving means to cooperate with said flexible member to separate successive bills to prevent overlapping thereof at least while they are being mechanically moved toward storage and also having a separable drive connection to said common drive.

19. A paper currency handling device comprising in combination,
(a) a common and normally nonremovable drive including a plurality of removability permitting readily separable drive connections each having a generally nonremovable drive modifying means,
(b) a common control for the receiving and dispensing of different amounts of currency by selectively actuating said different drive modifying means, and
(c) a plurality of readily removable magazine units each for a different denomination of bills and each comprising
(d) a bill storing spiral of at least one, elongated flexible member with
(e) rotary means at each end to drive it in tension in one of its two directions from one of said separable drive connections under said common control of its drive modifying means for each end thereof,
(f) said common drive including only two elongated drive shafts extending alongside of said magazine units and
(g) each said drive modifying means being closely adjacent to its corresponding removable unit,
(h) each removable cartridge unit also including adjacent moving means to cooperate with said flexible member to separate successive bills to prevent overlapping thereof at least while they are being mechanically moved toward storage and also having a separable drive connection to one of said two drive shafts.

20. A paper currency handling device comprising in combination,
(a) a common and normally nonremovable drive including a plurality of removability permitting readily separable drive connections each having a generally nonremovable drive modifying means,
(b) a common control for the receiving and dispensing of different amounts of currency by selectively actuating said different drive modifying means, and
(c) a plurality of readily removable magazine units each for a different denomination of bills and each comprising
(d) a bill storing spiral of at least one, elongated flexible member with
(e) rotary means at each end to drive it in tension in one of its two directions from one of said separable drive connections under said common control of its drive modifying means for each end thereof,
(f) each said drive modifying means being closely adjacent to its corresponding unit and each being readily separable to provide said separable drive connections,
(g) each removable magazine unit also including adjacent moving means to cooperate with said flexible member to separate successive bills to prevent overlapping thereof at least while they are being mechanically moved toward storage and also having a separable drive connection to said common drive.

21. A paper currency handling device comprising in combination,
(a) a common and normally nonremovable drive including a plurality of removability permitting readily separable drive connections each having a generally nonremovable drive modifying means,
(b) a common control for the receiving and dispensing of different amounts of currency by selectively actuating said different drive modifying means, and
(c) a plurality of readily removable magazine units each for a different denomination of bills and each comprising,
(d) a bill storing spiral of at least one, elongated flexible member with
(e) rotary means at each end to drive it in tension in one of its two directions from one of said separable drive connections under said common control of its drive modifying means for each end thereof,
(f) each said drive modifying means being closely adjacent to its corresponding unit and
(g) said separable drives including removably meshed gear pairs,
(h) each removable magazine unit also including adjacent moving means to cooperate with said flexible member to separate successive bills to prevent overlapping thereof at least while they are being mechanically moved toward storage and also having a separable drive connection to said common drive.

22. A controlling and actuating electrical circuit and means for the reversibly receivingly storing or dispensing of different denominations of money by different units comprising
(a) a common power supply,
(b) a common actuating electrical circuit portion having generally in parallel parts for each denomination unit with each part including switching means to electrically actuate the reversible storing and unstoring of money in its unit and
(c) switching means to electrically reverse the electrically actuated associated moving of said money to or from said storing or unstoring and
(d) an interacting common controlling electrical circuit portion having generally in parallel parts for each denomination unit with each part including means responsive to individual pieces of money moving by said associated moving means in its unit to control at least one of said switching means,
(e) said common controlling portion also having switching means responsive to the total of all denominations to be dispensed by all said units to control first switching means and to stop said dispensing,
(f) all of said second switching means being connected to be reversed simultaneously while all of said first switching means are connected to be actuated one at a time.

23. The method of handling paper currency comprising
(a) transferring flat bils one after the other with a change in speed from one to the other of
(b) feeding and guiding them along a fixed and substantially linear path at a certain speed and
(c) moving them into and around a compact spiral storage path at a different speed, said change in speeds spacing said bills apart to prevent overlap.

24. A method of handling paper currency bills comprising
(a) feeding and guiding bills of a given denomination in flat condition one after the other into a substantially straight feed path,
(b) then moving said bills along said feed path at a certain substantially constant speed and
(c) thereafter compactly storing said bills by spirally rolling them up substantially tangentially from said feed path at a higher speed to space them apart.

25. The method of handling paper currency bills in financial transactions comprising
(a) transferring flat bills of a given denomination one after the other from one to the other of
(b) engaging across only part of the dimension of each of said bill transverse to its motion and thereby feeding said bills along a fixed and substantially linear path and
(c) engaging across only part of said transverse dimension of each said bill and thereby spirally moving said bills around a compact storage path while
(d) engaging each of said moving bills across only a part of its said transverse dimension different from, and alongside of, its said feeding engagement to thereby guide said moving bills along a substantially linear and fixed path during at least a substantial portion of said feeding and during said transferring.

26. The method of mechanically handling currency bills in financial transactions comprising
(a) engaging at least part of each of said bills and moving them in flat condition in succession one after the other spirally around a spiral path for compact storage,
(b) engaging at least part of each of said bills and thereby feeding said bills along an elongated feed path extending adjacent to, but spaced by a gap from, said spiral storage path and extending to an end station for personal handling with
(c) said spiral moving and said feeding being in either direction between said station for personal handling and said spiral storage and
(d) engaging at least part of each of said bills and thereby guiding said bills at least while transferring them across the said gap between said spiral moving and said feeding, said guiding engaging being alongside of said feeding engaging.

27. Apparatus for reversibly handling currency bills into and out of storage comprising
(a) means for transferring a succession of flat bills, with an increase in speed in both directions to separate them, from one to the other of
(b) means for engaging and feeding them while guiding them along a fixed path to
(c) means for engaging and moving them into or out of storage paths while guiding them,
(d) one of said engaging means being at least partially slipping and the other being relatively nonslipping to enhance said separating and
(e) said slipping engaging means comprising at least one spirally coiled elongated flexible member.

28. The apparatus of claim 27 in which said means for engaging and feeding has a materially higher bill engaging friction than said other engaging means and hence is relatively nonslipping.

29. In combination,
(a) reversible means including elongated flexible members spirally coiled in double turns to guidingly confine and to move a succession of currency bills into and out of spiral storage between said double turns,
(b) a reversibly rotatable driving means for each end of said elongated members,
(c) an electrically controlled clutch means for each such driving means,
(d) common drive means for said two driving means,
(e) an electrically controlled brake means for each such driving means, and
(f) means electrically and selectively controlling said clutch means to mechanically drive said flexible member in tension from only one end thereof from said common drive and selectively controlling said brake means to apply them both and hold them on when both clutch means are unclutched.

30. Apparatus for handling paper currency bills comprising
(a) means for transferring flat bills one after the other with a change in speed from one to the other of
(b) means for feeding and guiding them along a fixed and substantially linear path at a certain speed and
(c) means for moving them into and around a compact spiral storage path at a different speed, said change in speeds spacing said bills apart to prevent overlap,
(d) and controlling means starting said feeding means in advance of entry of bills thereinto.

31. Apparatus for handling paper currency bills comprising
(a) means for receiving the feeding in and guiding of bills of a given denomination in flat condition one after the other into a substantially straight feed path,
(b) means for then moving said bills along said feed path at a certain substantially constant speed,
(c) means for thereafter compactly storing said bills by spirally rolling them up substantially tangentially from said feed path at a higher speed to space them apart, and
(d) common driving means for said last two means.

32. Apparatus for handling paper currency bills in finanacial transactions comprising
(a) means for transferring flat bills of a given denomination one after the other from one to the other of
(b) means for engaging across only part of the dimension of each said bill transverse to its motion and thereby feeding them along a fixed and substantially linear path and
(c) means for engaging across only part of said transverse dimension of each of said bill and thereby spirally moving said bills around a compact storage and
(d) means for engaging each of said moving bills across only part of its said transverse dimension different from, and alongside of, its said feeding engagement to thereby guide said moving bills along a substantially linear and fixed path during at least a substantial portion of said feeding and during said transferring,
(e) said feed means being in motion prior to the entry of bills thereinto.

33. Apparatus for mechanically handling currency bills in financial transactions comprising
(a) means for engaging at least part of each of said bills and moving them in flat condition in succession one after another spirally around a spiral path compact storage,
(b) means for engaging at least part of each of said bills and feeding said bills along an elongated feed path extending adjacent to, but spaced by a gap from, said spiral storage path and extending to an end station for personal handling with said spiral moving and said feeding being in either direction between said end station for personal handling and said spiral storage and
(c) means for engaging at least part of each of said bills and thereby guiding the said bills at least while transferring them across said gap between said spiral moving and said feeding, said guiding engaging being alongside of said feeding engaging.

34. A paper currency storing and dispensing device including
(a) two elongated flexible tapes spirally wound in double turns to receive and flexibly confine currency bills between such turns on a storing reel,
(b) two parallel and adjacent unstoring reels each with a spiral for the other ends of said two tapes,
(c) means to selectively drive said storing reel or said unstoring reels and
(d) means to prevent looseness between said tapes and resulting failure of such flexible confinement due to the tape or bill thickness caused difference in the effective tensions of said two tapes by providing different tape speeds at their unstoring ends.

35. The device of claim 34 in which said looseness preventing means comprises the effective unstoring reel diameter for the outermost of said double turn tapes being larger than the corresponding unstoring reel diameter for the innermost tape.

36. In a paper money storing and dispensing device,
 (a) reversible rotary means to move a succession of currency bills into and out of storage including two parallel rotors,
 (b) adjacent but spaced reversible rotary feed means having at least one driving shaft,
 (c) one of said two rotors of said first means being coaxial with said rotary feed means and rotatably mounted on its shaft to provide a simpler and more compact device and
 (d) separate drives for each of said two parallel rotors and said rotary feed means.

37. In combination,
 (a) at least one elongated flexible storing means spirally coiled about a storage shaft having
 (b) drive means including a clutch to drive said elongated means in tension to store successive currency bills,
 (c) at least one adjacent parallel unrolling rotor having
 (d) drive means including a clutch to drive said elongated means in tension to dispense said bills and
 (e) at least one reversible feed roller to move bills into or out of said storage and having drive and reversing means,
 (f) said unrolling rotor and said feed roller being coaxial on a common shaft driving one of them.

38. In combination,
 (a) a plurality of adjacent units in a row for different denominations of currency bills
 (b) at least one elongated flexible bill storing means in each unit and
 (c) spirally coiled about a first common and storing shaft extending through said units and having
 (d) drive means including a clutch to individually drive each said elongated means in tension to store successive bills,
 (e) at least one adjacent parallel unrolling rotor in each unit each having
 (f) drive means including a clutch to individually drive each said elongated means in tension to dispense said bills,
 (g) at least one reversible feed roller in each unit to move bills into or out of said storage and having drive and reversing means,
 (h) said unrolling rotor and said feed roller of each unit all being coaxial on a second common shaft drivingly acting between said feed roller and its reversing means and driving said clutch of said unrolling rotor.

39. In a paper currency moving and storing device in combination;
 (a) two spaced unstoring reels
 (b) each having flexible elongated means secured to and spirally wound in coils thereon,
 (c) bill moving and storing means including a storage reel spaced from said unstoring reels
 (d) with said two flexible elongated means secured to and spirally wound thereon in inner and outer double spiral turns to provide a flexibly confining engagement of successive bills between said outer and said inner flexible means to move and store or unstore them,
 (e) means to selectively drive said storage reel for storing bills or at least one of said unstoring reels for unstoring bills and
 (f) means to maintain said flexibly confining engagement of said bills despite the effect of the thickness of said bills in said storage reel including means providing a looseness in said coils on said unstoring reel for said outer elongated flexible means relative to the tightness of the coils of said inner flexible means on said other unstoring reel.

40. In a paper currency moving and storing device in combination;
 (a) two spaced unstoring reels
 (b) each having flexible elongated tape means secured to and spirally wound in coils thereon,
 (c) bill moving and storing means including a storage reel spaced from said unstoring reels
 (d) with said two flexible elongated tape means secured to and spirally wound thereon in inner and outer double spiral turns to provide a flexibly confining engagement of successive bills between said outer and said inner flexible tape means to move and store or unstore them,
 (e) means to selectively drive said storage reel for storing bills or at least one of said unstoring reels for unstoring bills and
 (f) means to maintain said flexibly confining engagement of said bills despite the effect of the thickness of said bills in said storage reel and the thicknesses of said tapes including means providing for a higher speed of said outer tape at the coil surface of its unstoring reel.

References Cited by the Examiner
UNITED STATES PATENTS

| | | | |
|---|---|---|---|
| 650,410 | 5/1900 | Morin | 271—36 |
| 2,623,693 | 12/1952 | Holden | 235—61.11 |
| 2,704,186 | 3/1955 | Braun | 235—61.11 |
| 2,726,860 | 12/1955 | Luhn | 271—3 |
| 2,825,346 | 3/1958 | Gabrielsen | 133—2 |
| 2,957,690 | 10/1960 | Thompson | 271—3 |
| 2,975,789 | 3/1961 | Schmidt | 133—2 |
| 2,995,976 | 8/1961 | Weingart. | |
| 3,072,237 | 1/1963 | Simjian | 194—4 |

ROBERT R. REEVES, *Primary Examiner.*

DARYL W. COOK, RAPHAEL M. LUPO, SAMUEL F. COLEMAN, *Examiners.*